United States Patent
Clerckx et al.

(10) Patent No.: US 8,498,358 B2
(45) Date of Patent: *Jul. 30, 2013

(54) MULTIPLE ANTENNA COMMUNICATION SYSTEM INCLUDING ADAPTIVE UPDATING AND CHANGING OF CODEBOOKS

(75) Inventors: Bruno Clerckx, Yongin-si (KR); Sung Jin Kim, Suwon-si (KR); Ki Il Kim, Seongnam-si (KR); David J. Love, West Lafayette, IN (US); Taejoon Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 1085 days.

This patent is subject to a terminal disclaimer.

(21) Appl. No.: 12/429,937

(22) Filed: Apr. 24, 2009

(65) Prior Publication Data

US 2009/0268840 A1 Oct. 29, 2009

Related U.S. Application Data

(63) Continuation-in-part of application No. 12/109,440, filed on Apr. 25, 2008, now Pat. No. 8,160,125.

(30) Foreign Application Priority Data

Dec. 24, 2008 (KR) .................. 10-2008-0133560
Mar. 6, 2009 (KR) .................. 10-2009-0019277

(51) Int. Cl.
H04B 7/02 (2006.01)

(52) U.S. Cl.
USPC ........... 375/267; 375/260; 375/295; 375/299; 375/316; 375/340; 375/343; 375/347; 455/101; 455/132; 455/296; 455/500; 455/562.1; 370/210; 370/344; 370/464; 370/480; 341/173; 341/180

(58) Field of Classification Search
USPC ............... 375/260, 267, 295, 299, 316, 340, 375/343, 347; 455/101, 132, 296, 500, 562.1; 370/210, 344, 464, 480; 341/173, 180
See application file for complete search history.

(56) References Cited

U.S. PATENT DOCUMENTS

| | | | | |
|---|---|---|---|---|
| 7,948,959 B2* | 5/2011 | Wang et al. | .................... | 370/342 |
| 7,983,322 B2* | 7/2011 | Kent et al. | ...................... | 375/146 |
| 8,160,125 B2* | 4/2012 | Clerckx et al. | ................ | 375/219 |
| 8,259,835 B2* | 9/2012 | Kim | .............................. | 375/267 |
| 2009/0080549 A1* | 3/2009 | Khan et al. | ..................... | 375/260 |
| 2011/0080964 A1* | 4/2011 | Shamsi et al. | ................ | 375/260 |

FOREIGN PATENT DOCUMENTS

| KR | 10-2001-0036597 | 5/2001 |
| KR | 1020010036597 | 5/2001 |

(Continued)

OTHER PUBLICATIONS

International Search Report issued Nov. 25, 2011 in corresponding International Application No. PCT/KR2009/002100 (9 Pages).

(Continued)

*Primary Examiner* — Leon Flores
(74) *Attorney, Agent, or Firm* — NSIP Law

(57) ABSTRACT

Communication between a base station with multiple transmission antennas and a mobile station is provided. The base station and the mobile station may recognize or estimate, respectively, a channel between the base station and the mobile station, and update a previous codebook with a new codebook based on a variation of the channel. In this instance, the mobile station may provide feedback information to the base station using the new codebook, and the base station may generate a transmission signal for the mobile station using the new codebook and the feedback information.

49 Claims, 11 Drawing Sheets

FIG. 2

FOREIGN PATENT DOCUMENTS

| | | |
|---|---|---|
| KR | 1020040089748 | 10/2004 |
| KR | 1020070042099 | 4/2007 |
| WO | WO 01/43309 A2 | 6/2001 |
| WO | WO 01/43309 A3 | 6/2001 |
| WO | WO 2006/018689 A1 | 2/2006 |
| WO | WO 2007/024959 A2 | 3/2007 |
| WO | WO 2007/133564 A2 | 11/2007 |
| WO | WO 2008/043817 A1 | 4/2008 |

OTHER PUBLICATIONS

Amiri, K. et al., "Adaptive Codebook for Beamforming in Limited Feedback MIMO Systems (Extended Summary)," 42$^{nd}$ Annual Conference on Information Sciences and Systems, Mar. 19, 2008, pp. 994-998.

Leus, G. et al., "Quantized Feedback and Feedback Reduction for Precoded Spatial Multiplexing MIMO Systems," 9$^{th}$ International Symposium on Signal Processing and its Applications, Feb. 12, 2007, pp. 1-6.

Mondal, Bishwarup et al., "Channel Adaptive Quantization for Limited Feedback MIMO Beamforming Systems," IEEE, vol. 54, No. 12, pp. 4717-4729.

Samanta, Roopsha et al., "Codebook Adaption for Quantized MIMO Beamforming Systems," 2005, pp. 376-380.

\* cited by examiner

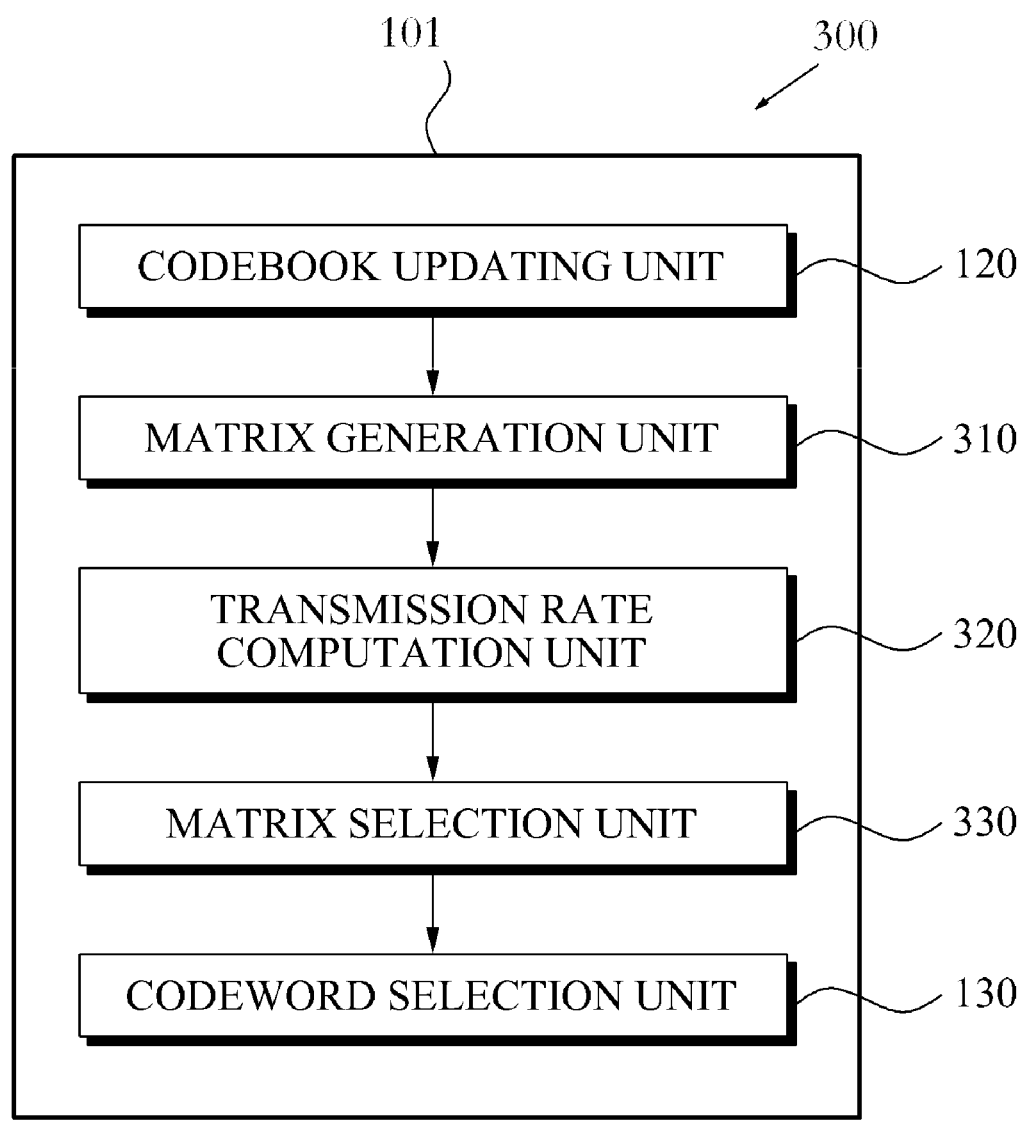

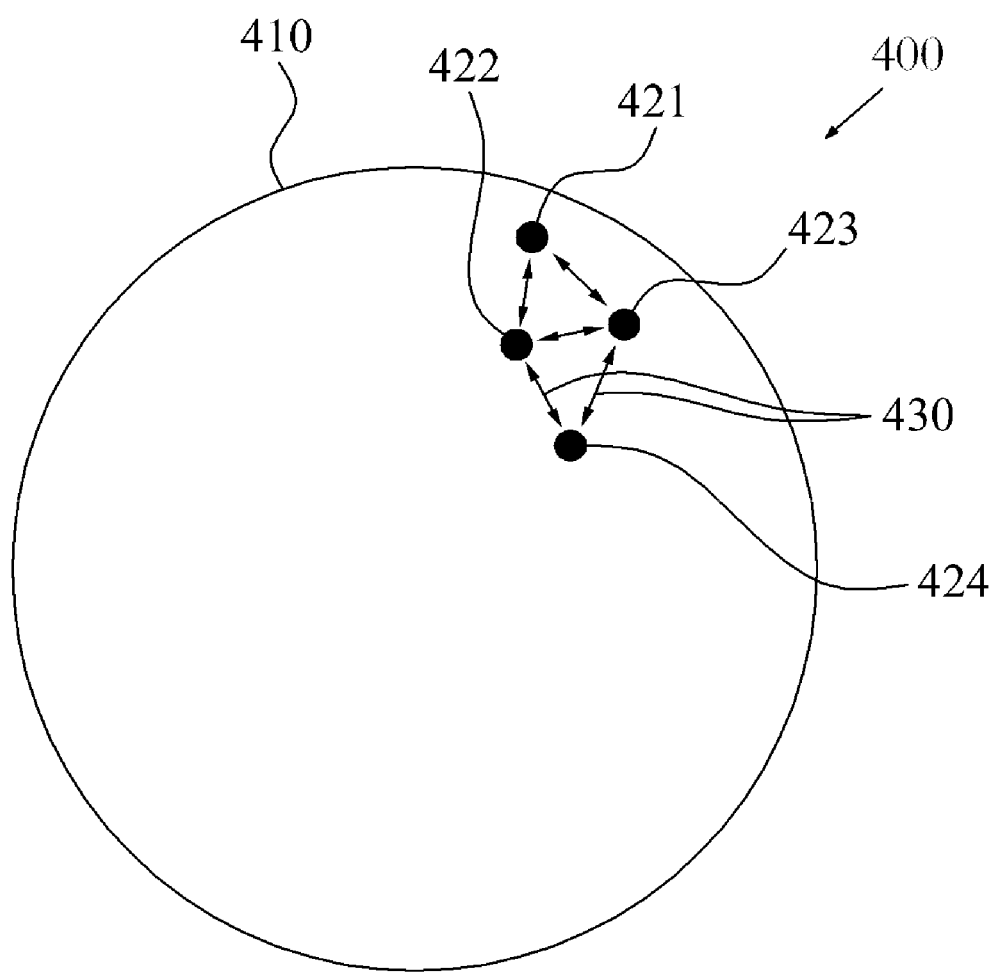

MULTIPLE ANTENNA COMMUNICATION SYSTEM INCLUDING ADAPTIVE UPDATING AND CHANGING OF CODEBOOKS

CROSS-REFERENCE TO RELATED APPLICATION

This application is a continuation-in-part of U.S. application Ser. No. 12/109,440 filed Apr. 25, 2008 and additionally claims the benefit under 35 U.S.C. §119(a) of Korean Patent Application No. 10-2008-0133560, filed on Dec. 24, 2008, and Korean Patent Application No. 10-2009-0019277 filed on Mar. 6, 2009, the entire disclosures of all three of which are herein incorporated by reference.

BACKGROUND

1. Field

The following description relates to a Multiple Input Multiple Output (MIMO) communication system, and particularly, to a technique for adaptively updating or changing a codebook, and using the updated or changed codebook.

2. Description of Related Art

Currently, radio communication technologies have been developed to provide various multimedia services in a radio communication environment. However, a high transmission rate is required to provide multimedia services having a relatively high quality. Thus, various studies have been undertaken to support high transmission rates including the study of MIMO technology.

MIMO technology may increase a channel capacity with limited frequency resources by using multiple antennas. In theory, MIMO technology may use multiple antennas in an environment having superior scattering environment to provide a channel capacity in proportion to the number of antennas.

However, the space and area in which antennas are able to be installed may be limited for MIMO technology. In addition, intervals between the antennas may adversely affect a communication performance. Specifically, because space and area are limited, there may be a higher correlation between radio channels along with a reduction in the interval between the antennas. In particular, there is a significantly high correlation between the radio channels when the antennas have an identical polarization. Radio channels having the high correlation are not perfectly independent from each other. As a result, the high correlation may prevent the increase of a sum data rate of a communication system using MIMO technology. In addition, interference generated between the radio channels may decrease reliability and the transmission rate of data communication.

MIMO technology performs advanced coding of data, such as preceding to provide effective transmission of data. A scheme in which a rule for preceding data is expressed as a matrix is referred to as a preceding matrix. The preceding matrix may be generated based on at least one of the codeword matrices included in a codebook.

A base station may precode data based on channel state information about a channel between the base station and a mobile station and transmit the precoded data to the mobile station. The mobile station may estimate the channel state of the channel from the base station to the mobile station and feedback information about the estimated channel state to the base station. There are a limited number of bits of the feedback information, which is a constraint on transmitting accurate information about the channel.

SUMMARY

In one general aspect, communication method between a base station, including a plurality of transmission antennas, and at least one mobile station includes: recognizing a channel between the base station and the at least one mobile station; and updating a previous codebook of the base station to a new codebook based on a variation of the channel.

Updating the previous codebook may include updating the previous codebook to the new codebook based on one of a time correlation coefficient of the channel and information corresponding to the time correlation coefficient.

Updating the previous codebook also may include determining the variation of the channel based on a state of the channel measured from at least two points in time.

Updating the previous codebook also may include updating the previous codebook to the new codebook based on statistics corresponding to the variation of the channel.

The statistics for the variation of the channel may be statistics for at least one of a variation speed of the channel, a variation quantity of the channel, and a pattern of the variation of the channel.

Updating the previous codebook also may include updating the previous codebook to the new codebook based on at least one codeword matrix included in the previous codebook.

The at least one codeword matrix may be used in performing preceding by the base station.

Updating the previous codebook to the new codebook also may include selecting any one of a plurality of candidate codebooks stored in a memory as the new codebook, based on the variation of the channel.

Updating the previous codebook to the new codebook also may include determining a new sub-set of a universal set of codeword matrices as the new codebook, the previous codebook including a previous sub-set of codeword matrices of the universal set.

Determining codeword matrices of the new-sub set may include selecting the new-codeword matrices based on a similarity to at least one of the codeword matrices of the previous sub-set.

Updating the previous codebook also may include updating the previous codebook to the new codebook that is smaller than or equal to a size of the previous codebook.

Recognizing the channel may include recognizing the channel based on feedback information about a state of the channel provided from the at least one mobile station.

A number of bits of the feedback information may be adjusted according to the new codebook.

The communication method also may include generating a preceding matrix using the new codebook.

The communication method also may include generating a transmission signal for the at least one mobile station using the generated preceding matrix.

Generating of the preceding matrix may include updating a previous preceding matrix based on the variation of the channel.

Generating of the preceding matrix also may include generating the preceding matrix based on the new codebook.

In another general aspect, a base station includes: a plurality of transmission antennas; a channel recognizing unit to recognize a channel between the base station including and at least one mobile station; and a codebook updating unit to update a previous codebook to a new codebook based on a variation of the channel.

The codebook updating unit may be configured to update the previous codebook with the new codebook based on one of a time correlation coefficient of the channel, information corresponding to the time correlation coefficient, and statistics for the variation of the channel.

The codebook updating unit may be configured to update the previous codebook to the new codebook based on at least one codeword matrix included in the previous codebook.

The codebook updating unit may be configured to update the previous codebook to the new codebook by selecting any one of a plurality of candidate codebooks stored in a memory as the new codebook, based on the variation of the channel.

The codebook updating unit may be configured to determine a new sub-set of a universal set of codeword matrices as the new codebook, the previous codebook including a previous subset of codeword matrices different from the new subset.

The codebook updating unit may be configured to update the previous codebook to the new codebook having a size that is smaller than or equal to a size of the previous codebook.

The base station also may include a preceding matrix generation unit to generate a preceding matrix based on the new codebook; and a transmission signal generation unit to generate a transmission signal to the at least one mobile station using the generated preceding matrix.

The preceding matrix generation unit may be configured to update the previous preceding matrix based on the variation of the channel.

The preceding matrix generation unit may be configured to generate the preceding matrix based on the new codebook.

In yet another general aspect, a communication method between a mobile station and a base station including a plurality of transmission antennas includes: estimating a channel between the mobile station and the base station; and updating a previous codebook of the mobile station to a new codebook based on a variation of the channel.

Updating the previous codebook may include updating the previous codebook to the new codebook based on one of a time correlation coefficient of the channel and information corresponding to the time correlation coefficient.

Updating the previous codebook may include updating the previous codebook to the new codebook based on statistics for the variation of the channel.

Updating the previous codebook also may include updating the previous codebook to the new codebook based on at least one codeword matrix included in the previous codebook.

Updating the previous codebook with the new codebook also may include selecting any one of a plurality of candidate codebooks stored in a memory as the new codebook, based on the variation of the channel.

Updating the previous codebook with a new codebook also may include determining a new sub-set of a universal set of codeword matrices as the new codebook, the previous codebook including a previous sub-set of codeword matrices of the universal set different from the new sub-set.

The communication method also may include receiving a transmission signal generated using the new codebook from the base station; and decoding the transmission signal using the new codebook In yet another general aspect, a mobile station includes: a channel estimating unit to estimate a channel between a base station including a plurality of transmission antennas and the mobile station; and a codebook updating unit to update a previous codebook to a new codebook based on a variation of the channel, The codebook updating unit may be configured to update the previous codebook to the new codebook based on at least one of a time correlation coefficient of the channel, information corresponding to the time correlation coefficient, and statistics for the variation of the channel In yet another general aspect, a computer readable medium stores instructions configured to cause a processor to: recognize a channel between the base station including a plurality of transmission antennas and at least one mobile station; and update a previous codebook of the base station to a new codebook based on a variation of the channel.

In yet another general aspect, a computer readable medium stores instructions configured to cause a processor to: estimate a channel between a mobile station and a base station including a plurality of transmission antennas; and update a previous codebook of the mobile station to a new codebook based on a variation of the channel.

In yet another general aspect, a mobile station includes: a channel matrix generation unit to generate a channel matrix with respect to channels ranging between a base station and mobile stations, the base station including a plurality of transmission antennas; a codebook updating unit to update a first codebook including a plurality of first codeword matrices to a second codebook including a plurality of second codeword matrices based on the generated channel matrix; a codeword selection unit to select at least one codeword matrix from among the second codeword matrices; a transmission unit to transmit an index of the selected codeword matrix to the base station; and a receiving unit to receive data transmitted from the base station based on the transmitted index.

The mobile station also may include a time correlation coefficient-generation unit to generate a time correlation coefficient of the channel by comparing a first channel matrix generated at a predetermined point in time and at least one second channel matrix generated at a point in time different from the predetermined point in time, wherein the codebook updating unit is configured to update the first codebook to the second codebook based on the generated time correlation coefficient.

The transmission unit may be configured to transmit one of the generated time correlation coefficient and information associated with the time correlation coefficient to the base station, and the receiving unit is configured to receive the data transmitted from the base station based on one of the time correlation coefficient and the information associated with the time correlation coefficient.

The mobile station also may include a codebook change unit to generate a third codeword matrix with respect to each of the first codeword matrices, wherein the codebook updating unit is configured to apply a singular value decomposition (SVD) to the third codeword matrix, and to update the first codebook to the second codebook based on an applied result of the SVD.

The mobile station also may include a codebook change unit to generate a third codeword matrix with respect to each of the first codeword matrices, wherein the codebook updating unit is configured to update the first codebook to the second codebook based on an inverse matrix of the third codeword matrix.

The mobile station also may include a candidate channel matrix generation unit to generate a plurality of candidate channel matrices based on the at least one second channel matrix and the second codeword matrices; and a candidate channel matrix selection unit to select a candidate channel matrix based on a difference between the plurality of candidate channel matrices and the first channel matrix, wherein the codeword selection unit is configured to select the at least one codeword matrix based on the selected candidate channel matrices.

The first codeword matrices may be equally spaced in a matrix space.

In yet another general a base station includes: a plurality of transmission antennas; a codebook updating unit to update a first codebook including a plurality of first codeword matrices with a second codebook including a plurality of second codeword matrices based on a channel matrix with respect to a channel between the base station and a mobile station; a receiving unit to receive an index of at least one codeword matrix of the second codeword matrices from the mobile station; a preceding matrix generation unit to generate a preceding matrix based on the second codeword matrix corresponding to the received index; and a transmission unit to generate a transmission signal using the generated preceding matrix and to transmit the generated transmission signal to the mobile station.

The transmission unit may be configured to transmit a pilot signal to the mobile station, and the channel matrix is generated based on the pilot signal.

The receiving unit may be configured to receive a time correlation coefficient associated with a variation of the channel from the mobile station, and the codebook updating unit is configured to update the first codebook to the second codebook based on the time correlation coefficient.

The base station also may include a codebook change unit to generate a third codeword matrix with respect to each of the first codeword matrices based on the time correlation coefficient, wherein the codebook updating unit is configured to apply a singular value decomposition (SVD) to the third codeword matrix and to update the first codebook with the second codebook based on an applied result of the SVD.

The base station also may include a codebook change unit to generate a third codeword matrix with respect to each of the first codeword matrices based on the time correlation coefficient, wherein the codebook updating unit is configured to update the first codebook to the second codebook based on an inverse matrix of the third codeword matrix.

The base station also may include a channel matrix updating unit to multiply the second codeword matrix corresponding to the received index by the channel matrix to update the channel matrix.

Other features and aspects will be apparent from the following detailed description, the drawings, and the claims.

BRIEF DESCRIPTION OF THE DRAWINGS

FIG. 3 is a block diagram illustrating an exemplary structure of a mobile station which selects a codeword matrix.

FIGS. 4A and 4B are conceptual diagrams in which first codeword matrices are equally dispersed within a matrix space.

Throughout the drawings and the detailed description, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Descriptions of well-known functions and constructions may be omitted for increased clarity and conciseness.

Figure 1:
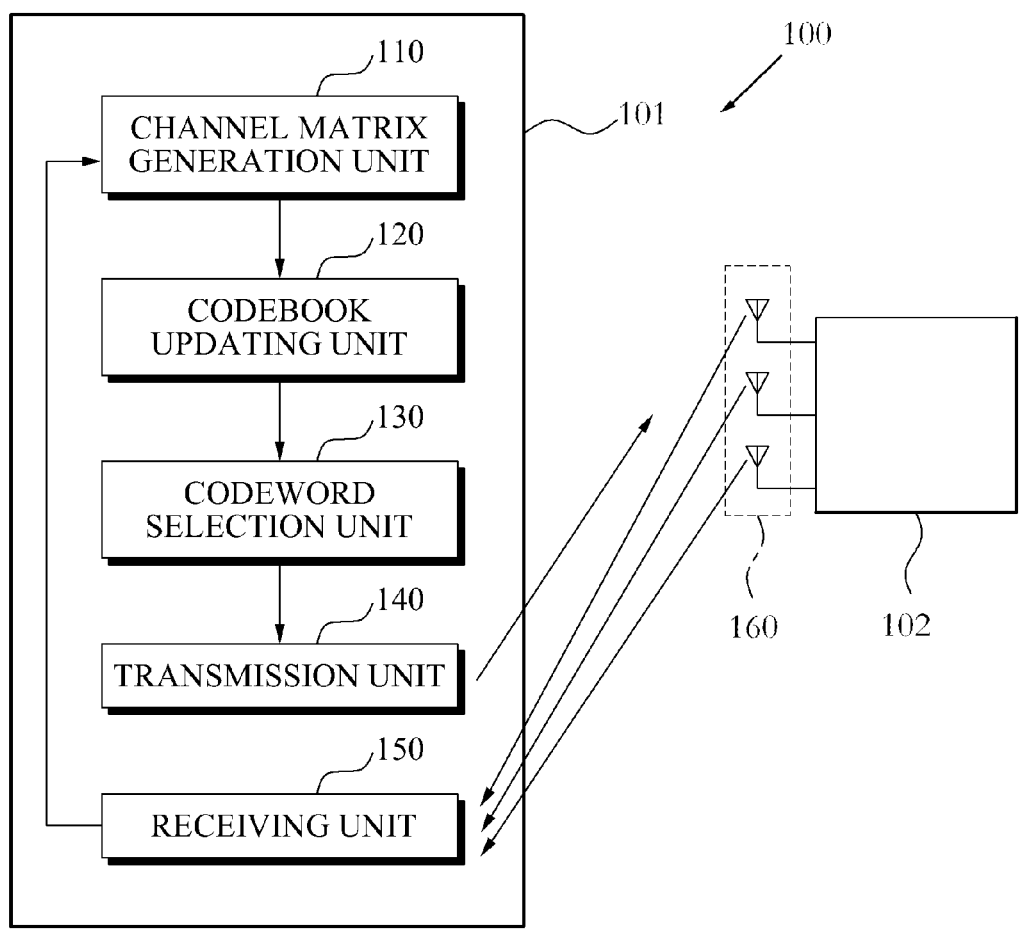
FIG. 1 is a block diagram illustrating an exemplary structure of a mobile station which transmits an index of a codeword matrix.

FIG. 1 is a block diagram illustrating an exemplary communication system 100. The communication system 100 includes a mobile station 101 which transmits an index of a codeword matrix to a base station 102. Referring to FIG. 1, the mobile station 101 may include a channel matrix generation unit 110, a codebook updating unit 120, a codeword selection unit 130, a transmission unit 140, and a receiving unit 150. Although not illustrated in FIG. 1, the mobile station 101 may include additional components, such as a memory for storing a codebook.

The codebook updating unit 120 described in further detail below, may adaptively update a previous codebook based on a variation of a channel. Here, the variation of the channel may be exhibited in a time domain or in a frequency domain. For convenience of descriptions, according to the present disclosure, a process of updating a codebook and a preceding matrix in accordance with the variation of the channel in the time domain will be described in detail.

In addition, the codebook updating unit 120 may store predictable updated codebooks in a memory in advance and select any one of the stored codebooks to update the previous codebook.

The channel matrix generation unit 110 estimates a channel from a base station 102 to the mobile station 101, and generates a channel matrix expressing the estimated channel.

When the base station 102 includes M transmission antennas 160 and the mobile station 101 includes N receiving antennas (not shown), the channel matrix has a size of M*N. However, the channel matrix may be a vector having a size of M*1 when the mobile station 101 includes a single receiving antenna.

The base station 102 may transmit a plurality of pilot signals to the mobile station 101 using the multiple transmission antennas 160. In this instance, the mobile station 101 may estimate the channels between the base station 102 and the mobile station 101 based on the plurality of transmitted pilot signals to generate the channel matrix.

The codebook updating unit 120 of the mobile station generates a second codebook based on a first codebook and the channel matrix. For example, the second codebook may be a codebook generated when the first codebook is updated according to the variation of the channel over time and designate as a codebook intended to be used in the future.

The first codebook and the second codebook are matrix sets including a plurality of matrices. The first codebook includes a plurality of first codeword matrices, and the second codebook includes a plurality of second codeword matrices. A number of the first codeword matrices included in the first codebook and a number of the second codeword matrices included in the second codebook may be the same.

Throughout the following description, terminology, such as first codeword matrices, second codeword matrices, and third codeword matrices may be used to identify codeword matrices included in a corresponding codebook. Specifically, the first codeword matrices may designate a plurality of codeword matrices included in the first codebook, the second codeword matrices may designate a plurality of codeword matrices included in the second codebook, and the third codeword matrices may designate a plurality of codeword matrices included in the third codebook.

According to one example, the mobile station 101 and the base station 102 may include an identical codebook. Specifically, the mobile station 101 and the base station 102 may store an identical first codebook and generate an identical second codebook based on the first codebook. Particularly, the mobile station 101 and the base station 102 may update the first codebook with the second codebook based on a variation of the channel over time or statistics for the variation of the channel, both of which are described in detail below.

The codeword selection unit 130 selects at least one codeword matrix from the second codeword matrices included in the second codebook. For example, the codeword selection unit 130 may select a codeword matrix to maximize the rate of data received by the mobile station 101.

The transmission unit 140 transmits an index of the selected codeword matrix to the base station 102. Here, the index may indicate a position within the second codebook in which a corresponding codeword matrix is located.

According to one example as pointed out above, the mobile station 101 and the base station 102 may include an identical codebook. Thus, when the mobile station 101 transmits only an index of the codeword matrix to the base station 102, the base station 102 is able to acquire all information with respect to the codeword matrix selected by the mobile station 101.

The base station 102 may transmit data to the mobile station 101 via the multiple transmission antennas 160 based on the index transmitted by the transmission unit 140 of the mobile station 101.

The receiving unit 150 receives data transmitted from the base station 102.

Figure 2:
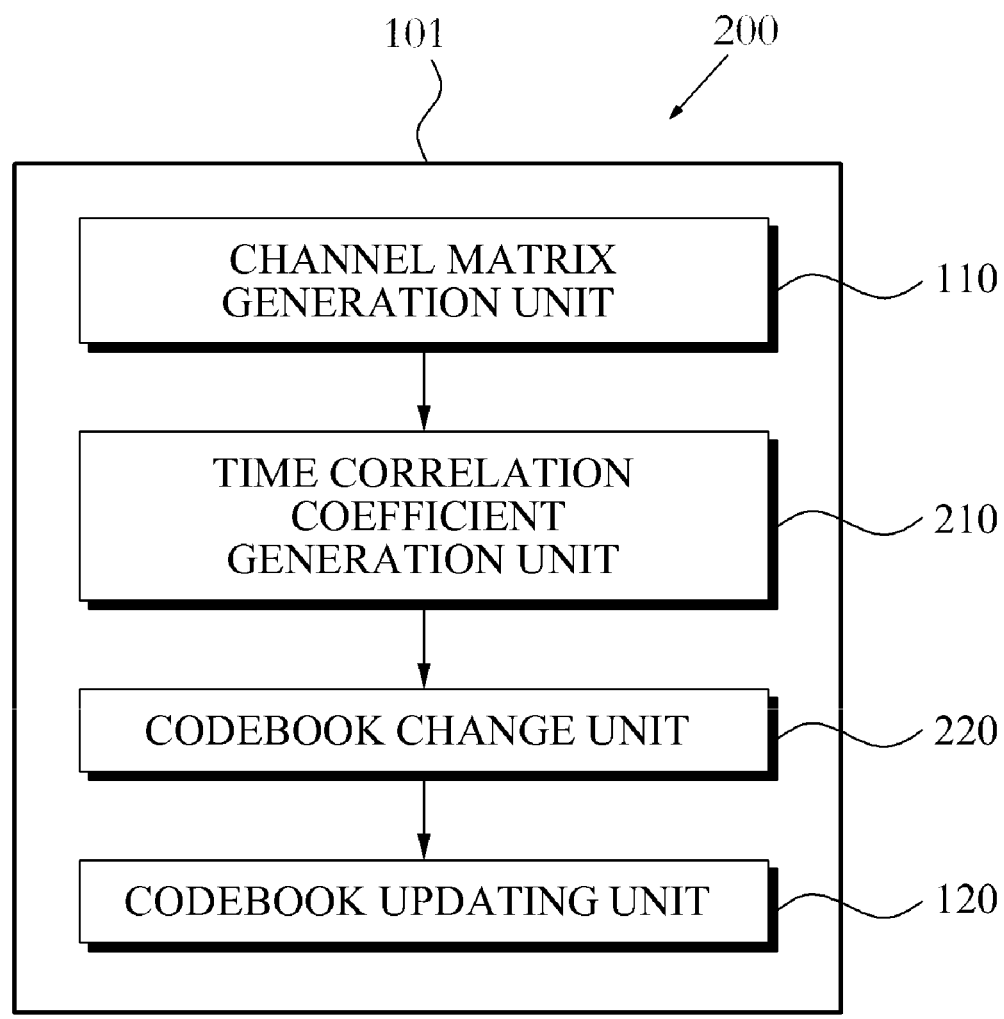
FIG. 2 is a block diagram illustrating an exemplary structure of a mobile station which updates a codebook based on a time correlation coefficient.

FIG. 2 is a block diagram illustrating an exemplary structure of a mobile station 101 which updates a codebook based on a time correlation coefficient according to example embodiments. Referring to FIG. 2, the mobile station 101 having exemplary structure 200 includes a channel matrix generation unit 110, a time correlation coefficient generation unit 210, a codebook change unit 220, and a codebook updating unit 120. The mobile station 101 also may include other components (not shown) including, for example, a memory and/or one or more of the elements shown above in FIG. 1.

According to one example, the channel matrix generation unit 110 may periodically or aperiodically, at a specific point in time, generate a channel matrix with respect to a channel from the base station 102 to the mobile station 101.

The time correlation coefficient generation unit 210 compares a first channel matrix generated at a specific point in time and a second channel matrix generated at one or more points in time being different from the specific point in time to thereby generate a time correlation coefficient. For example, the time correlation coefficient generation unit 210 may generate the time correlation coefficient based on channel matrices generated at a plurality of points in time. In addition, the time correlation coefficient generation unit 210 may replace the time correlation coefficient of the mobile station with a Doppler coefficient without having to calculate an actual time correlation coefficient. Specifically, the time correlation coefficient generation unit 210 may generate the actual time correlation coefficient, or values corresponding to the actual time correlation coefficient.

According to one example, the time correlation coefficient generation unit 210 may generate the time correlation coefficient based on a channel model with respect to a channel from the base station 102 to the mobile station 101.

In this example, the mobile station may provide to the base station 102 the generated actual time correlation coefficient and information concerning the time correlation coefficient, such as the Doppler coefficient. In this instance, the base station 102 may obtain the time correlation coefficient based on the information concerning the time correlation coefficient provided by the mobile station 101, and provide the obtained time correlation coefficient to the mobile station to enable the mobile station 101 to update its codebook.

For example, in a case of a single mobile station 101 connected with the base station 102, the time correlation coefficient generation unit 210 may model the channel between the base station 102 and the mobile station 101 according to the following equation:

$$H_\tau = \rho \cdot H_{\tau-1} + \Delta \quad \text{[Equation 1]}$$

wherein $H_\tau$ denotes a channel matrix generated at a τ-th point in time, ρ denotes a time correlation coefficient, Δ denotes conjugate noise having a regular distribution whose mean is "0" and whose variance is $1-\rho^2$. In addition, $H_\tau$ denotes a matrix having a size of M*N, when M transmission antennas are installed in the base station 102 and N receiving antennas are installed in the mobile station 101.

According to another example, when a plurality of mobile stations 101 each including a single receiving antenna are connected with the base station 102, the time correlation coefficient generation unit 210 may model the channel between the base station 102 and at least one of the plurality of mobile stations 101 according to the following equation:

$$h_\tau = \rho \cdot h_{\tau-1} + \sqrt{1-\rho^2} \cdot w_\tau, \quad \text{[Equation 2]}$$

wherein $h_\tau$ denotes a channel matrix generated at a τ-th point in time.

According to an example when the mobile station 101 includes only a single receiving antenna connected to the base station 102 including M transmission antennas, $h_\tau$ denotes a vector having a size of M*1, and $w_\tau$ denotes a noise vector having a size of M*1. In this case, an average of elements included in $w_\tau$ is "0," and a variation thereof is "1."

According to another example, when the mobile station 101 includes N receiving antennas connected to the base station 102 including the M transmission antennas, $w_\tau$ denotes a noise matrix having a size of M*N.

According to one example, the codebook updating unit 120 may update the second codebook based on the time correlation coefficient ρ. Although the updating of the second codebook is described in detail below, it is pointed out that the base station 102 and mobile station 101 may update a previous codebook with a new codebook based on the time correlation coefficient, where the time correlation coefficient indicates a variation of the channel over time.

The transmission unit 140 of the mobile station 101 may transmit the generated time correlation coefficient to the base station 102. For example, the transmission unit 140 may transmit a specific value (e.g., a Doppler coefficient and the like) corresponding to the time correlation coefficient. The base station 102 may generate the second codebook of the base station 102 based on the received time correlation coefficient and the first codebook of the base station 102. A second codebook of the mobile station 101 and the second codebook of the base station 102, each generated based on the first codebook and the time correlation coefficient, may be the same when the first codebook of the base station 102 and the first codebook of the mobile station 101 are the same and the base station 102 receives the time correlation coefficient transmitted by the mobile station 101 (or a specific value corresponding to the time correlation coefficient).

The base station 102 may transmit data using the second codebook of the base station 102 that is identical to the second codebook of the mobile station 101, and the mobile station 101 may successfully decode data transmitted from the base station 102 using the second codebook.

The codebook updating unit 120 may compare a first time correlation coefficient generated during a first time interval and a second time correlation coefficient generated during a second time interval and update the codebook according to the compared result. In one example, the first time interval may be adjacent to the second time interval. In addition, the codebook updating unit 120 may update the codebook using the time correlation coefficient transmitted from the base station 102, values corresponding to the time correlation coefficient, or using a candidate codebook previously stored in a memory.

As described above, the mobile station 101 may obtain the time correlation coefficient of the channel and inform the base station 102 of the obtained time correlation coefficient. In this instance, the mobile station 101 and base station 102 may each update their codebook using the time correlation coefficient of the channel. According to one example, the mobile station 101 may transmit channel characteristics information, such as a moving speed of the mobile station, the Doppler coefficient, and the like, to the base station 102. The base station 102 may calculate the time correlation coefficient based on the channel characteristics information and transmit the calculated time correlation coefficient to the mobile station 101.

According to one example, the codebook updating unit 120 may update the codebook when the time correlation coefficient is changed. However, when the time correlation coefficient has not changed, the state of the radio channel state between the base station 102 and the mobile station 101 may be determined to be unchanged. When the radio channel state between the base station 102 and the mobile station 101 is determined to be unchanged, the base station 102 may use an existing codebook as is without updating the existing codebook, thereby reducing the computational load of the mobile station 101.

According to one example, the codebook updating unit 120 may calculate a ratio of the first time correlation coefficient to the second time correlation coefficient, compare the calculated ratio to a predetermined threshold, and determine whether the time correlation coefficient has changed according to the compared result.

According to one example, the transmission unit 140 may transmit the time correlation coefficient to the base station 102 only when the time correlation coefficient has changed by a certain amount (e.g., a specific level or more). In this instance, the base station 102 may update its codebook based on the changed time correlation coefficient. However, when the time correlation coefficient has not changed, the base station 102 does not need to update the codebook. Accordingly, the mobile station 102 transmits the time correlation coefficient to the base station 101 only when the time correlation coefficient has changed to effectively reduce overhead resulting from feeding back the time correlation coefficient, or the specific value (e.g., Doppler coefficient) corresponding to the time correlation coefficient.

For example, the transmission unit 140 may transmit the time correlation coefficient to the base station 102 only when the time correlation coefficient is greater than the predetermined threshold. In this instance, the mobile station 101 may transmit the time correlation coefficient used for generating the second codebook to the base station 102, only when the time correlation coefficient is greater than the predetermined threshold, resulting in a more effective use of the transmission path between the mobile station 101 and the base station 102.

According to another example, the codebook change unit 220 may generate third codeword matrices of the third codebook based on the first codeword matrices of the first codebook. In this instance, the codebook updating unit 120 may generate second codeword matrices of the second codebook based on the third codeword matrices of the third codebook generated by the codebook change unit 220. Particularly, the codebook change unit 220 may generate the third codeword matrices of the third codebook based on the time correlation coefficient.

In one example, the codebook change unit 220 may generate the third codeword matrices of the third codebook according to the following equation:

$$\Theta'_i = [\rho \cdot I \sqrt{1-\rho^2} \cdot \Theta_i] \qquad \text{[Equation 3]}$$

wherein $\rho$ denotes a time correlation coefficient, $\Theta'_i$ denotes an i-th third codeword matrix of the third codebook, and $\Theta_i$ denotes an i-th first codeword matrix of the first codebook. In a case where M transmission antennas are installed in the base station 102, I denotes an identity matrix having a size of M*M. M left-side columns of the third codeword matrix of the third codebook are determined to correspond to each column of the identity matrix. The remaining columns of the third codeword matrix of the third codebook are determined to correspond to the first codeword matrix.

According to another example, the codebook change unit 220 may generate the third codeword matrices of the third codebook according to the following equation:

$$\Theta'_i = \rho \cdot I + \sqrt{1-\rho^2} \cdot \Theta_i, \qquad \text{[Equation 4]}$$

wherein $\rho$ denotes a time correlation coefficient, $\Theta'_i$ denotes an i-th third codeword matrix of the third codebook, $\Theta_i$ and denotes an i-th first codeword matrix of the first codebook. When M transmission antennas are installed in the base station 102, each of $\Theta'_i$ and $\Theta_i$ is a square matrix having a size of M*M. I denotes an identity matrix having a size of M*M.

The codebook change unit 220 also may generate the third codebook using other methods which are different from those used in association with Equation 3 and Equation 4 presented above. For example, the codebook change unit 220 may generate the third codebook using the following equation:

$$\Psi_i(\rho,\Theta_i) = R_t^x(\rho I + \sqrt{1-\rho^2}\Theta_i) = \rho R_t^x + \sqrt{1-\rho^2} R_t^x \Theta_i, \qquad \text{[Equation 4-1]}$$

wherein $\Psi_i(\rho,\Theta_i)$ denotes an i-th third codeword matrix found in the third codebook, which is another expression of $\Theta'_i$ of Equation 3 or Equation 4. $\rho$ denotes a time correlation coefficient, $R_t^x$ denotes a spatial correlation matrix in a transmission end, and x refers to an exponent and may be 1, ½ or something else. When Singular Value Decomposition (SVD) of $\Psi_i(\rho,\Theta_i)$ is denoted as $\Phi_i\Lambda_iB_i^*$ expressed by Equation 6 below, $\Phi_i$ is another expression of $U_i$ of Equation 6 below, and $B_i^*$ is another expression of a complex conjugate of $V_i$ of Equation 6 below.

Consequently, according to the examples herein, the third codebook of various types may be generated based on the first codebook, and the second codebook may be generated using the third codebook.

According to an example, the codebook updating unit 120 may apply a singular value decomposition to the third codeword matrix, and generate the second codeword matrices included in the second codebook based on an applied result.

For example, the codebook updating unit 120 may generate the second codeword matrix according to the following equation:

$$\tilde{\Theta}_i = U_i, \quad [\text{Equation 5}]$$

wherein $\tilde{\Theta}_i$ denotes an i-th second codeword matrix of the second codebook, and $U_i$ may be determined by the following equation:

$$SVD[\Theta'_i] = U_i \cdot \Lambda_i \cdot V_i^*, \quad [\text{Equation 6}]$$

wherein SVD[x] denotes an operator performing the singular value decomposition with respect to a matrix X, $U_i$ denotes a left singular vector with respect to $\Theta'_i$, $V_i$ denotes a right singular vector with respect to $\Theta'_i$, and $\Lambda_i$ denotes a diagonal matrix being composed of singular values of $\Theta'_i$.

According to another example, the codebook updating unit 120 may generate the second codeword matrix based on the left and right singular vectors with respect to the third codeword matrix of the third codebook. According to an example, the codebook updating unit 120 may generate the second codeword matrix according to the following equation:

$$\tilde{\Theta}_i = U_i \cdot V_i^*, \quad [\text{Equation 7}]$$

The second codeword matrices satisfying Equation 7 also may satisfy the Equation provided below. Thus, according to another example, the codebook updating unit 120 may generate the second codeword matrix according to the following equation:

$$\tilde{\Theta}_i = \arg\min \|\Theta'_i - \tilde{\Theta}_i\|_F, \quad [\text{Equation 8}]$$

wherein $\|d\|_F$ denotes a Frobenius norm with respect to a matrix x.

According to another example, the codebook updating unit 120 may generate the second codeword matrices included in the second codebook based on an inverse matrix of the third codeword matrix.

According to one example, the codebook updating unit 120 may generate the second codeword matrix according to the following equation:

$$\tilde{\Theta}_i = \Theta'_i \cdot [\Theta'^*_i \cdot \Theta'_i]^{-\frac{1}{2}}, \quad [\text{Equation 9}]$$

wherein $\tilde{\Theta}_i$ denotes an i-th second codeword matrix, and X* denotes a conjugate transpose matrix with respect to a matrix x.

According to one example, the codebook updating unit 120 may generate the second codebook based on the generated codeword matrix. For example, the codebook updating unit 120 may generate the second codebook according to the following equation:

$$\{\tilde{\theta}\} = \{\tilde{\Theta}_1, \tilde{\Theta}_2, \ldots, \tilde{\Theta}_K\}, \quad [\text{Equation 10}]$$

wherein { } denotes a matrix set being composed of matrices, $\tilde{\theta}$ denotes the second codebook, and K denotes a number of the second codeword matrices included in the second codebook.

FIG. 3 is a block diagram illustrating an exemplary structure 300 of a mobile station 101 to select a codeword matrix.

Referring to FIG. 3, the mobile station 101 with structure 300 includes a codebook updating unit 120, a matrix generation unit 310, a transmission rate computation unit 320, a matrix selection unit 330, and a codeword selection unit 130. The mobile station 101 also may include other components (not shown) including, for example, a memory and/or one or more of the elements shown above in FIG. 1.

The codebook updating unit 120 generates the second codeword matrices of the second codebook based on the first codeword matrices included in the first codebook.

The matrix generation unit 310 generates a plurality of candidate preceding matrices based on each of the second codeword matrices included in the second codebook. In particular, the matrix generation unit 310 may generate the plurality of candidate preceding matrices by multiplying the first preceding matrix (i.e., the preceding matrix previously used by the base station 102), by each of the second codeword matrices. In this instance, an initial preceding matrix used by the base station 102 may diversely vary depending on points in time when the mobile station 101 feeds back information about the channel to the base station 102. For example, the initial preceding matrix may be a matrix that is most similar to a channel matrix at a point in time when the mobile station 101 initially feeds back the information about the channel to the base station 102. The initial preceding matrix also may be a matrix that minimizes quantization error for the channel matrix. The initial preceding matrices may be used as a base matrix for executing an algorithm updating the codebook.

In this instance, the first preceding matrix previously used by the base station 102 may be generated at a previous point in time based on the stored second codeword matrices. For example, the first preceding matrix generated at the previous point in time may be any one of the stored second codeword matrices. The first preceding matrix also may be a product of the second codeword matrices to be consecutively updated with the channel matrix at an initial point in time.

The transmission rate computation unit 320 may compute virtual transmission rates based on each of the candidate preceding matrices, which are computed based on the second codeword matrices, in order to determine an index of the codeword matrix fed back to the base station 102. In this instance, the transmission rate computation unit 320 used for determining the index of the fed back codeword matrix may be an optional component of the mobile station 101, and the mobile station 101 may instead determine the index of the fed back codeword matrix based on the quantization error being different from the transmission rate.

According to one example, the transmission rate computation unit 320 multiplies each of the plurality of candidate preceding matrices by virtual data. The transmission rate computation unit 320 also may compute the transmission rate according to a product of each of the plurality of candidate preceding matrices and the virtual data, based on a radio channel reaching the mobile station 101.

The matrix selection unit 330 may select any one of the plurality of candidate preceding matrices to maximize the transmission rate for the virtual data. However, the matrix selection unit 330 need not maximize the transmission rate for the virtual data, and instead, for example, the matrix selection unit 330 may select any one of the plurality of candidate preceding matrices to minimize the quantization error.

According to one example, the codeword selection unit 130 may select at least one codeword matrix of the second codeword matrices based on the matrix selected from the plurality of candidate preceding matrices by the matrix selection unit 330. In this instance, an index of the selected at least one codeword matrix is fed back to the base station 102.

In addition, a spatial correlation matrix generation unit (not shown) also may be provided in the mobile station 101, to generate a spatial correlation matrix based on the channel matrix associated with a channel between the base station 102 and the mobile station 101.

In addition, an eigenvalue decomposition unit (not shown) also may be provided in the mobile station 101, to perform eigenvalue decomposition with respect to the spatial correlation matrix. According to one example, the spatial correlation matrix generation unit and the eigenvalue decomposition unit may generate and decompose the spatial correlation matrix according to the following equation:

$$R_t = E[H^* \cdot H] = V_t \cdot \Sigma_t \cdot V_t^*,$$ [Equation 11]

wherein $R_t$ denotes a spatial correlation matrix in a transmission end associated with a channel, H denotes a channel matrix with respect to the channel between the base station 102 and the mobile station, * denotes a conjugate transpose. And, E[X] denotes an operator adopting a time average with respect to a matrix X, $V_t$ denotes a matrix being comprised of eigenvectors of $R_t$, and $\Sigma_t$ denotes a diagonal matrix being comprised of eigenvalues of $R_t$. When M transmission antennas are installed in the base station, each of $R_t$, $V_t$, and $\Sigma_t$ is a square matrix having a size of M*M. When N receiving antennas are installed in the mobile station, H denotes a matrix having a size of N*M.

According to one example, a preceding matrix initially used by the base station 102 may be determined according to a result of the eigenvalue decomposition performed with respect to the spatial correlation matrix. For example, the preceding matrix initially used by the base station 102 may be determined as a dominant eigenvector from among a plurality of eigenvectors of the spatial correlation matrix.

In addition, the preceding matrix initially used by the base station 102 may be determined based on feedback information provided by the mobile station 101. In this instance, the feedback information may be information about a codeword matrix that is most similar to a channel matrix from among the codeword matrices included in a present codebook of the mobile station 101 or information about a codeword matrix that minimizes a quantization error. The feedback information may be information about a codeword matrix corresponding to a maximum data rate from among the codeword matrices included in a present codebook.

According to an example, a candidate channel matrix generation unit (not shown) also may be provided in the mobile station 101, which generates a plurality of candidate channel matrices with respect to a present channel matrix by multiplying a previous channel matrix by each of the second codeword matrices.

According to this example, the candidate channel matrix generation unit may generate candidate channel matrices according to the following equation:

$$\hat{h}_{\tau,i} = \tilde{\Theta}_i \hat{h}_{\tau-1},$$ [Equation 12]

wherein $\hat{h}_{\tau,i}$ denotes information about an i-th candidate channel matrix of the candidate channel matrices with respect to the channel matrix at a time of $\tau$, $\hat{h}_{\tau-1}$ denotes information about the channel matrix at a time of $\tau-1$, and $\tilde{\Theta}_i$ denotes an i-th second codeword matrix of the second codeword matrices included in the second codebook.

When the base station 101 includes M transmission antennas and the mobile station 102 includes N receiving antennas, $h_{\tau-1}$ has a size of M*N. Also, when the mobile station 102 includes only a single receiving antenna, $h_{\tau-1}$ has a size of M*1.

According to one example, the candidate channel matrix selection unit also may select a matrix that is most similar to the present channel matrix from among the plurality of candidate channel matrices. In this instance, the codeword selection unit 130 may select at least one of the second codeword matrices based on the selected candidate channel matrix. In addition, an index of the selected second codeword matrix is fed back to the base station 102.

Specifically, according to one example, the codeword selection unit 130 may select at least one of the second codeword matrices according to the following equation:

$$\hat{\Theta} = \arg\min \sin^2(\angle(h_\tau, \hat{h}_{\tau,i})),$$ [Equation 13]

wherein $\hat{\Theta}$ denotes the selected codeword matrix, $\angle$ denotes an angle between two vectors on a vector space, $h_\tau$ denotes the present channel matrix, and $\hat{h}_{\tau,i}$ denotes an i-th candidate channel matrix of the plurality of candidate channel matrices. As can be seen in Equation 13, a codeword matrix corresponding to the candidate channel matrix having the smallest angle with the present channel matrix is selected.

According to an example, the first codeword matrices included in the first codebook may be equally spaced in a matrix space.

Figure 4B:
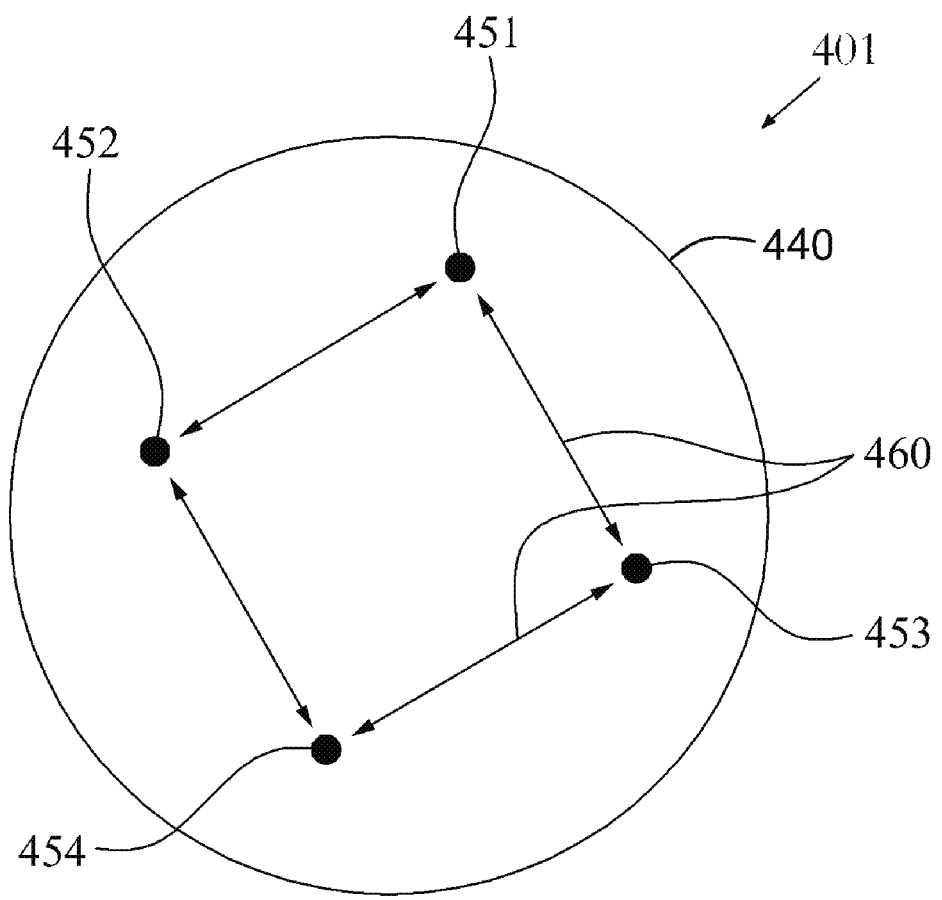

FIGS. 4A and 4B show conceptual diagrams 400 and 401, respectively, in which first codeword matrices are dispersed within matrix spaces.

Referring to FIG. 4A, matrix space 410 includes first codeword matrices 421, 422, 423, and 424 that are unequally spaced within the matrix space 410. Each of the first codeword matrices 421, 422, 423, and 424 are spaced within a specific area of the matrix space 410. In this example, respective distances 430 between the first codeword matrices 421, 422, 423, and 424 are significantly small.

Referring to FIG. 4B, the matrix space 440 includes first codeword matrices 451, 452, 453, and 454 that are equally spaced within the matrix space 440. Each of the first codeword matrices 451, 452, 453, and 454 is dispersedly spaced within the matrix space 440. Respective distances between the first codeword matrices 451, 452, 453, and 454 are significantly large.

According to one example, a first preceding matrix previously used by a base station 102 is updated based on the first codeword matrices 421, 422, 423, and 424. When the first codeword matrices 421, 422, 423, and 424 are located only in the specific area of the matrix space 410, for example, as illustrated in FIG. 4A, the plurality of candidate preceding matrices generated based on the first preceding matrix may be predictably similar to each other.

For example, the first preceding matrix may be selected by comparing only the candidate preceding matrices located in the specific area of the matrix space, when the first preceding matrix is updated from among the plurality of candidate preceding matrices that are similar to each other. However, even though the first preceding matrix is updated, the updated first preceding matrix may not be an optimized preceding matrix.

Accordingly, the plurality of candidate preceding matrices may need to be spaced equally over the entire area of the matrix space. For this purpose, it may be assumed that the first codeword matrices need to be spaced equally over the entire area of the matrix space. For example, the first codebook and the second codebook may have a diagonal unitary matrices structure to reduce the complexity of computation.

According to an example, the first codeword matrices may be generated based on a Discrete Fourier Transform (DFT) matrix according to the following equation:

$$\Theta_i = \Psi^i \cdot D,$$ [Equation 14]

wherein $\Theta_i$ denotes an i-th codeword matrix included in the first codebook, D denotes a DFT matrix, each column of which is a Fourier basis vector being orthogonal to each other, and $\Psi$ denotes a diagonal matrix determined by the following equation:

$$\Phi = \begin{bmatrix} e^{j\frac{2\pi m_1}{K}} & 0 & \cdots & 0 \\ 0 & e^{j\frac{2\pi m_2}{K}} & \cdots & 0 \\ \vdots & \vdots & \ddots & 0 \\ 0 & 0 & 0 & e^{j\frac{2\pi m_t}{K}} \end{bmatrix}$$ [Equation 15]

wherein K denotes a number of first codeword matrices included in the first codebook, and $m_1, m_2, \ldots, m_t$ denote integers arbitrarily selected between 1 to k.

According one example, so that the first codeword matrices are spaced equally within the matrix space, the first codebook may satisfy the following equation:

$$\{\theta\} = \arg\max_{\{\theta\} \subset U(M,M)} \min d(\Theta_i, \Theta_j),$$ [Equation 16]

wherein $\theta$ denotes a first codebook, $\Theta_i$ and $\Theta_j$ denote an i-th codeword matrix and j-th codeword matrix included in the first codebook, respectively, M denotes a number of transmission antennas installed in the base station 102, and U(M,M) denotes a unitary matrix having a size of M*M. A distance of d between two codeword matrices may be determined by the following equation:

$$d(\Theta_i, \Theta_j) = \sqrt{1 - \frac{1}{M} \cdot |tr(\Theta_i^* \cdot \Theta_j)|},$$ [Equation 17]

wherein X* denotes a conjugate transpose matrix with respect to a matrix X.

According to another example, the first codeword matrices may be generated by the following equation:

$$\Theta_i = \Psi^i,$$ [Equation 18]

wherein $\Theta_i$ denotes an i-th codeword matrix included in the first codebook, and $\Psi$ denotes a diagonal matrix determined by Equation 15 given above.

Figure 5:
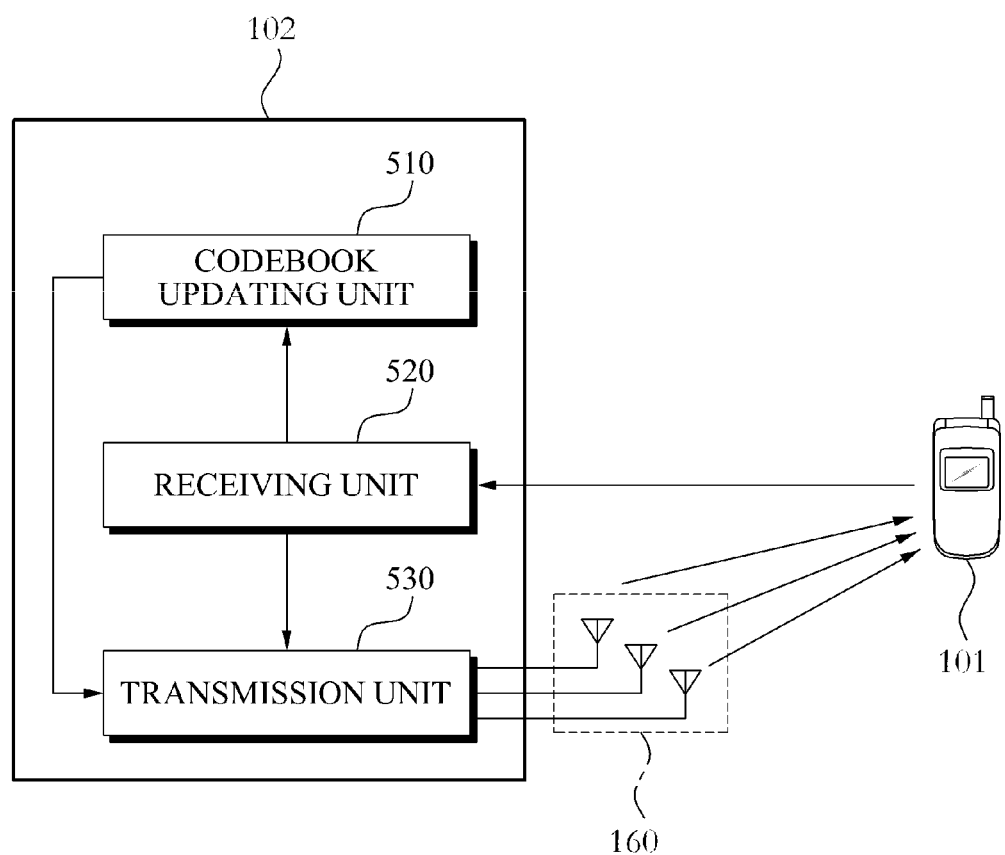
FIG. 5 is a block diagram illustrating an exemplary structure of a base station which receives an index of a codeword matrix.

FIG. 5 is a block diagram illustrating an exemplary structure of a base station 102 which receives an index of a codeword from a mobile station 101. Referring to FIG. 5, the base station 102 includes a codebook updating unit 510, a receiving unit 520, and a transmission unit 530, and multiple transmission antennas 160.

The transmission unit 530 transmits data to the mobile station 101 via the multiple transmission antennas 160.

The codebook updating unit 510 generates a second codebook based on a first codebook. The first codebook includes a plurality of first codeword matrices, and the second codebook includes a plurality of second codeword matrices. The number of first codeword matrices and second codeword matrices are the same. According to one example, the codebook updating unit 510 may generate the second codeword matrices of the second codebook based on the first codeword matrices of the first codebook. The codebook updating unit 510 also may generate the second codebook including the generated second codeword matrices. The codebook updating unit 510 may generate the second codebook based on the channel matrix with respect to a channel between the base station 102 and the mobile station 101. The codebook updating unit 510 also may generate a codebook based on information about a variation of a channel over time (e.g., Doppler coefficient) in addition to the channel matrix.

The receiving unit 520 may receive information about at least one codeword matrix of the plurality of second codeword matrices from the mobile station 101. For example, the information about the at least one codeword matrix may be an index of the second codeword matrix selected by the mobile station 101.

According to one example, the mobile station 101 and the base station 102 may include an identical second codebook. When the second codebook of the mobile station 101 and the second codebook of the base station 102 are the same, the mobile station 101 does not transmit all information about the second codeword matrices selected by the mobile station 101. Instead, the mobile station 101 transmits only an index of the selected second codeword matrix. As a result, the base station 102 may obtain all information about the second codeword matrix selected by the mobile station 101 using only the index transmitted by the mobile station 101.

The transmission unit 530 may transmit data to the mobile station 101 via the antennas 160 using the first codebook corresponding to the received index.

According to one example, the transmission unit 530 may transmit a plurality of pilot signals to the mobile station 101 via each of the multiple transmission antennas 160. The mobile station 101 may generate a channel matrix with respect to the channel between the base station 102 and the mobile station 101 based on the plurality of transmitted pilot signals. In return, the mobile station 101 may transmit the channel matrix or information about the channel matrix to the base station 102.

According to one example, the receiving unit 520 may receive the information about the channel matrix and reconstruct the channel matrix with respect to the channel between the base station 102 and the mobile station 101.

For example, the receiving unit 520 may receive a time correlation coefficient with respect to the channel matrix. The mobile station 101 may generate the time correlation coefficient by comparing a first channel matrix generated at a specific point in time and a second channel matrix generated at another point in time different from the specific point in time. In this instance, the time correlation coefficient designates the occurrence/nonoccurrence of change in the channel matrix over time. The receiving unit 520 may receive the time correlation coefficient from the mobile station 101. The codebook updating unit 510 may generate the second codebook based on the received time correlation coefficient.

Figure 6:
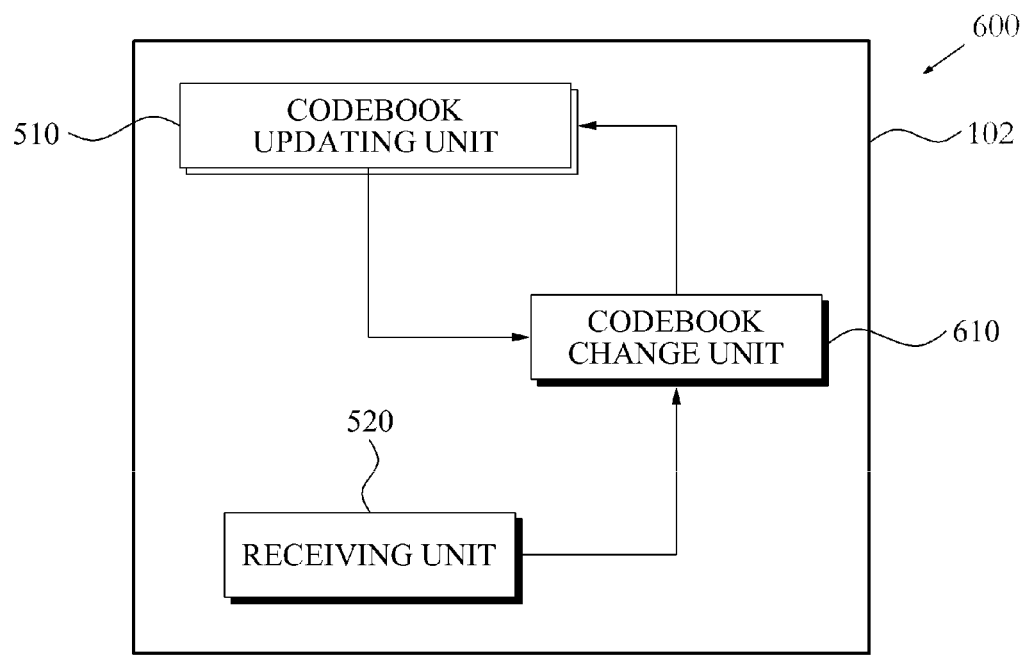
FIG. 6 is a block diagram illustrating an exemplary structure of a base station which changes a first codeword matrix to generate a third codeword matrix.

FIG. 6 is a block diagram illustrating an exemplary structure 600 of a base station 102 which changes a first codeword matrix to generate a third codeword matrix. Referring to FIG. 6, the base station 102 includes the codebook updating unit 510, a codebook change unit 610, and a receiving unit 520. The base station 102 also may include other components (not shown), such as memory devices, hardware and software, transmitting and receiving elements, and other components, for example, the elements shown in FIG. 5.

The receiving unit 520 may receive a time correlation coefficient with respect to a channel between the base station 102 and the mobile station 101 from the mobile station 101.

The codebook change unit 610 may generate a third codeword matrix with respect to each of the plurality of first codeword matrices based on the time correlation coefficient received by the receiving unit 520 and an identity matrix.

According to one example, the codebook change unit 610 may generate the third codeword matrices of the third codebook using the following equation:

$$\Theta'_i = [\rho \cdot I \sqrt{1-\rho^2} \cdot \Theta_i]$$ [Equation 19]

wherein $\rho$ denotes a time correlation coefficient, $\Theta'_i$ denotes an i-th third codeword matrix of the third codebook, and $\Theta_i$ denotes an i-th first codeword matrix of the first codebook. When the base station 102 includes M transmission antennas, for example, I denotes an identity matrix having a size of M*M. M left-sided columns of the third codeword matrix are determined to correspond to each column of the identity matrix. The remaining columns of the third codeword matrix are determined to correspond to the first codeword matrix.

According to another example, the codebook change unit 610 may generate the third codeword matrices of the third codebook according to the following equation:

$$\Theta'_i = \rho \cdot I + \sqrt{1-\rho^2} \cdot \Theta_i,$$ [Equation 20]

wherein $\rho$ denotes a time correlation coefficient, $\Theta'_i$ denotes an i-th third codeword matrix of the third codebook, and $\Theta_i$ denotes an i-th first codeword matrix of the first codebook. When the base station 102 includes M transmission antennas, for example, each of $\Theta'_i$ and $\Theta_i$ is a square matrix having a size of M*M. I denotes an identity matrix having a size of M*M.

The codebook change unit 610 also may generate the third codebook using other methods that are different from methods used in Equation 19 and Equation 20. For example, the codebook change unit 610 may generate the third codebook using the following equation:

$$\Psi_i(\rho,\Theta_i) = R_t^x(\rho I + \sqrt{1-\rho^2}\Theta_i) = \rho R_t^x + \sqrt{1-\rho^2} R_t^x \Theta_i,$$ [Equation 20-1]

wherein $\Psi_i(\rho,\Theta_i)$ denotes an i-th third codeword matrix of the third codebook, which is another expression of $\Theta'_i$ of Equation 3 or Equation 4. $\rho$ denotes a time correlation coefficient, and $R_t^x$ denotes a spatial correlation matrix in a transmission end. Also, when SVD of $\Psi_i(\rho,\Theta_i)$ is denoted as $\Phi_i \Lambda_i B_i^*$ through Equation 22, $\Phi_i$ is another expression of $U_i$ of Equation 22, and $B_i^*$ is another expression of a complex conjugate of $V_i$ of Equation 22.

The codebook updating unit 510 generates the second codebook based on the channel matrix with respect to the channel between the base station 102 and the mobile station 101, information about the variation of the channel over time, and the first codebook. The first codebook and the second codebook include a plurality of first codeword matrices and a plurality of second codeword matrices, respectively. In this instance, the number of the first codeword matrices and second codeword matrices are the same.

According to one example, the codebook updating unit 510 may generate each of the plurality of second codeword matrices based on a result of singular value decomposition (SVD) performed with respect to each of the third codeword matrices. For example, the codebook updating unit 510 may generate the second codeword matrix according to the following equation:

$$\tilde{\Theta}_i = U_i,$$ [Equation 21]

wherein $\tilde{\Theta}_i$ denotes an i-th second codeword matrix of the second codebook, and $U_i$ may be determined by the following equation:

$$SVD[\Theta'_i] = U_i \cdot \Lambda_i \cdot V_i^*,$$ [Equation 22]

wherein SVD[x] denotes an operator performing singular value decomposition with respect to a matrix X, $U_i$ denotes a left singular vector with respect to $\Theta'_i$, $V_i$ denotes a right singular vector with respect to $\Theta'_i$, $\Lambda_i$ and denotes a diagonal matrix comprised of singular values of $\Theta'_i$.

According to another example, the codebook updating unit 510 may generate the second codeword matrix based on a product of the right singular vector and the left singular vector with respect to the third codeword matrix of the third codebook. For example, the codebook updating unit 510 may generate the second codeword matrix according to the following equation:

$$\tilde{\Theta}_i = U_i \cdot V_i^*$$ [Equation 23]

The second codeword matrices satisfying Equation 23 are matrices satisfying Equation 24 given below. As a result, according to another example, the codebook updating unit 510 may generate the second codeword matrices according to the following equation:

$$\tilde{\Theta}_i = \arg\min \|\Theta'_i - \tilde{\Theta}_i\|_F,$$ [Equation 24]

wherein $\|x\|_F$ denotes a Frobenius norm with respect to a matrix x.

According to another example, the codebook updating unit 510 may generate each of the plurality of second codeword matrices based on inverse matrices of the third codeword matrices. According to an example, the codebook updating unit 510 may generate the second codeword matrix according to the following equation:

$$\tilde{\Theta}_i = [\Theta'^*_i \cdot \Theta'_i]^{-\frac{1}{2}} \cdot \Theta'_i,$$ [Equation 25]

wherein $\tilde{\Theta}_i$ denotes an i-th second codeword matrix, and X* denotes a conjugate transpose matrix with respect to a matrix X.

According to one example, the codebook updating unit 510 may generate the second codebook based on the respectively generated codeword matrices. For example, the codebook updating unit 510 may generate the second codebook according to the following equation:

$$\{\tilde{\theta}\} = \{\tilde{\Theta}_1, \tilde{\Theta}_2, \ldots, \tilde{\Theta}_K\},$$ [Equation 26]

wherein { } denotes a matrix set being comprised of matrices, $\tilde{\theta}$ denotes a second codebook, and K denotes the number of second codeword matrices included in the second codebook.

Figure 7:
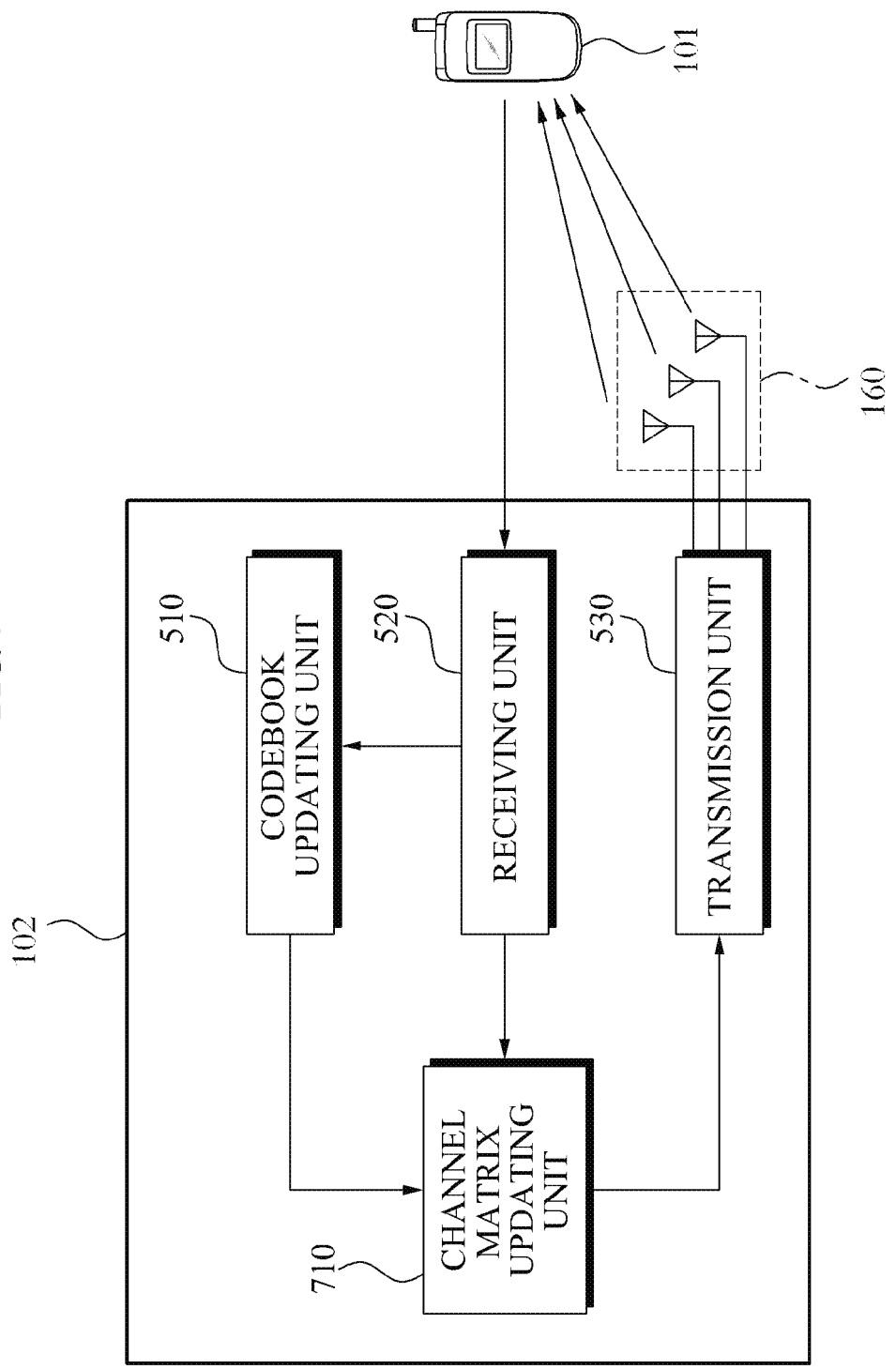
FIG. 7 is a block diagram illustrating an exemplary structure of a base station which updates a channel matrix based on an index received from a mobile station.

FIG. 7 is a block diagram illustrating an exemplary structure of a base station 102 which updates a channel matrix based on an index received from a mobile station 101. Referring to FIG. 7, the base station 102 includes a codebook updating unit 510, a receiving unit 520, a channel matrix updating unit 710, and a transmission unit 530. The base station 102 also may include other components (not shown), such as memory devices, hardware and software, transmitting and receiving elements, and other components, for example, the elements shown in FIG. 6.

The receiving unit 520 receives a channel matrix with respect to a channel between the base station 102 and the mobile station 101, or information about the channel matrix, from the mobile station 101.

It may be difficult for the base station 102 to collect the information about the channel between the base station 102 and the mobile station 101. For example, when the mobile station 101 estimates the channel to generate the channel matrix and transmits information about the generated channel matrix to the base station 102, bandwidth between the mobile station 101 and the base station 102 is wasted transmitting accuracy information about the channel.

Therefore, the mobile station 101 may transmit only an index of the codeword matrix excluding the channel matrix with respect to the channel between the base station 102 and the mobile station 101. The base station 102 may receive only the index of the codeword matrix and regenerate a channel matrix that is the same as the channel matrix generated by the mobile station 101. The base station 102 may transmit data to the mobile station 101 based on the regenerated channel matrix. Since the mobile station 101 does not transmit the entire channel matrix, but transmits the index of the codeword matrix, bandwidth between the mobile station 101 and the base station 102 may be conserved.

The codebook updating unit 510 generates the second codebook based on information on the first codebook and the channel matrix. The first codebook includes a plurality of first codeword matrices, and the second codebook includes a plurality of second codeword matrices. The number of the plurality of first codeword matrices and second codeword matrices are the same.

According to one example, the receiving unit 520 may receive an index of the second codeword matrix.

The channel matrix updating unit 710 updates the channel matrix with respect to the channel between the base station 102 and the mobile station 101. For example, the channel matrix updating unit 710 may update the channel matrix by multiplying the second codeword matrix, which corresponds to the index received by the receiving unit 520 from among the plurality of second codeword matrices included in the second codebook, by the channel matrix.

According to one example, the channel matrix updating unit 710 may update the channel matrix with respect to the channel between the base station 102 and the mobile station 101 according to the following equation:

$$\hat{h}_{i,\tau} = \tilde{\Theta}_{i,j} \hat{h}_{i,\tau-1},$$ [Equation 27]

wherein $\hat{h}_{i,\tau}$ denotes a channel matrix updated with respect to a channel between the base station 102 to an i-th mobile station, $\hat{h}_{i,\tau-1}$ denotes a channel matrix before being updated with respect to the channel between the base station 102 and the i-th mobile station 101, and $\tilde{\Theta}_{i,j}$ denotes a j-th second codeword matrix of the second codebook corresponding to an index transmitted by the i-th mobile station 101.

According to one example, the transmission unit 530 may transmit data to the respective mobile stations 101 based on the updated channel matrix. For example, the transmission unit 530 may generate a preceding matrix based on the updated channel matrix, and multiply each element of the generated preceding matrix by data transmitted via the multiple transmission antennas 160.

According to one example, the transmission unit 530 may generate the preceding matrix according to the following equation:

$$W = \frac{\hat{W}}{\|\hat{W}\|^2},$$ [Equation 28]

wherein W denotes a precoding matrix, and $\hat{W}$ denotes a precoding matrix which is not normalized. In this instance, $\hat{W}$ may be determined by the following equation:

$$\hat{W} = \hat{H} \cdot (\hat{H}^* \cdot \hat{H})^{-1},$$ [Equation 29]

wherein (A)* denotes a conjugate transpose matrix of a matrix A, $\hat{H}$ denotes a matrix being comprised of a channel matrix with respect to channels between the base station 102 and the respective mobile stations 101, which is determined by the following equation:

$$\hat{H} = [\hat{h}_1 \ldots \hat{h}_L],$$ [Equation 30]

wherein $\hat{h}_i$ denotes a channel matrix with respect to a channel between the base station 102 and an i-th mobile station 101 connected with the base station 102, and L denotes a number of mobile stations 101 connected with the base station 102.

According to another example, the transmission unit 530 may transmit data to the mobile station 101 based on the second codeword matrix included in the second codebook. For example, the transmission unit 530 may update the preceding matrix based on the second codeword matrix corresponding to an index received by the receiving unit 520.

According to one example, the base station 102 may adaptively update the preceding matrix as well as the codebook in response to the variation of the channel over time.

The base station 102 may use various methods of applying the variation of the channel over time to update the preceding matrix. For example, the base station 102 may use an updated new codebook to update the preceding matrix and apply the variation of the channel over time.

In one example, the base station 102 may update the preceding matrix by multiplying the second codeword matrix corresponding to the received index by the preceding matrix. For example, the base station may calculate a new preceding matrix $F_\tau$ using $\tilde{\Theta}_i$, when a preceding matrix used at $\tau-1$-th time is $F_{\tau-1}$. Specifically, $F_\tau$ may be represented using a previous preceding matrix $F_{\tau-1}$ and $\tilde{\Theta}_i$ as shown in the following equation:

$$F_\tau = \tilde{\Theta}_i F_{\tau-1},$$ [Equation 31]

In Equation 31, it is assumed that an initial preceding matrix is $F_0$, and $\tau = 1, 2, \ldots T_{max}$. When $\tau$ is $T_{max}+1$, a process of updating the precoding matrix is reset, and $\tau$ may be set as "0."

In addition, in Equation 31, $F_{\tau-1}$ is used to generate $F_\tau$. However, it is noted that Equation 31 is a method of generating $F_\tau$. That is, various methods of generating $F_\tau$ may exist. For example, $F_\tau$ may be calculated using the following equation:

$$F_\tau = \frac{\Psi_i(\rho, \Theta_i) F_{\tau-1}}{\|\Psi_i(\rho, \Theta_i) F_{\tau-1}\|},$$ [Equation 32]

wherein $\Psi_i(\rho, \Theta_i)$ denotes an i-th third codeword matrix of the third codebook, which is another expression of $\Theta'_i$ of Equation 3, Equation 4 or Equation 4-1, for example. Particularly, $\Psi_i(\rho, \Theta_i)$ may be any one of $\Theta'_i$ of Equation 3, Equation 4, or Equation 4-1. For example, $\Theta_i(\rho, \Theta_i)$ may be generated based on $R_t^x$ of a spatial correlation matrix in a transmission end as shown in Equation 4-1, which also may be expressed as $$\Psi_i(\rho, \Theta_i) = R_t^x(\rho I + \sqrt{1-\rho^2}\Theta_i) = \rho R_t^x + \sqrt{1-\rho^2} R_t^x \Theta_i$$

In another example, $F_\tau$ may be calculated using the following equation:

$$F_\tau = \frac{R_t^x \tilde{\Theta}_i F_{\tau-1}}{\|R_t^x \tilde{\Theta}_i F_{\tau-1}\|}, \quad \text{[Equation 33]}$$

wherein $\tilde{\Theta}_i$ denotes an i-th second codeword matrix of the second codebook, and may be generated based on the third codebook. For example, the third codebook may be generated based on $R_t^x$ of the spatial correlation matrix in the transmission end as shown in Equation 4-1, and may be expressed using the following equation:

$$\Psi_i(\rho, \Theta_i) = R_t^x(\rho I + \sqrt{1-\rho^2}\,\Theta_i) \quad \text{[Equation 34]}$$
$$= \rho R_t^x + \sqrt{1-\rho^2}\,R_t^x \Theta_i$$
$$\tilde{\Theta}_i = \underset{\tilde{\Theta}_i}{\operatorname{argmin}} \|\Psi_i(\rho, \Theta_i) - \tilde{\Theta}_i\|_F.$$

In addition, $\tilde{\Theta}_i$ used in a process of generating $F_\tau$ using Equation 33 may be generated according to the following equation:

$$\Psi_i(\rho, \Theta_i) = \rho I + \sqrt{1-\rho^2}\,\Theta_i \quad \text{[Equation 35]}$$
$$\tilde{\Theta}_i = \underset{\tilde{\Theta}_i}{\operatorname{argmin}} \|\Psi_i(\rho, \Theta_i) - \tilde{\Theta}_i\|_F.$$

Various other methods of generating $F_\tau$ also exist from the teachings provided herein. For example, a method using any one of $F_{\tau-1}$, $\tilde{\Theta}_i$, $\rho$, $R_t^x$ and $\Psi_i(\rho,\Theta_i)$ may be used to generate $F_\tau$. In general, $F_\tau$ may be generated based on a variation of the channel over time and is not limited to using any one of $F_{\tau-1}$, $\tilde{\Theta}_i$, $\rho$, $R_t^x$ and $\Psi_i(\rho,\Theta_i)$.

According to an example, the transmission unit 530 may multiply each element of the updated preceding matrix by data transmitted via the multiple transmission antennas 160, respectively, and transmit the multiplied data to the mobile station 101.

Figure 8:
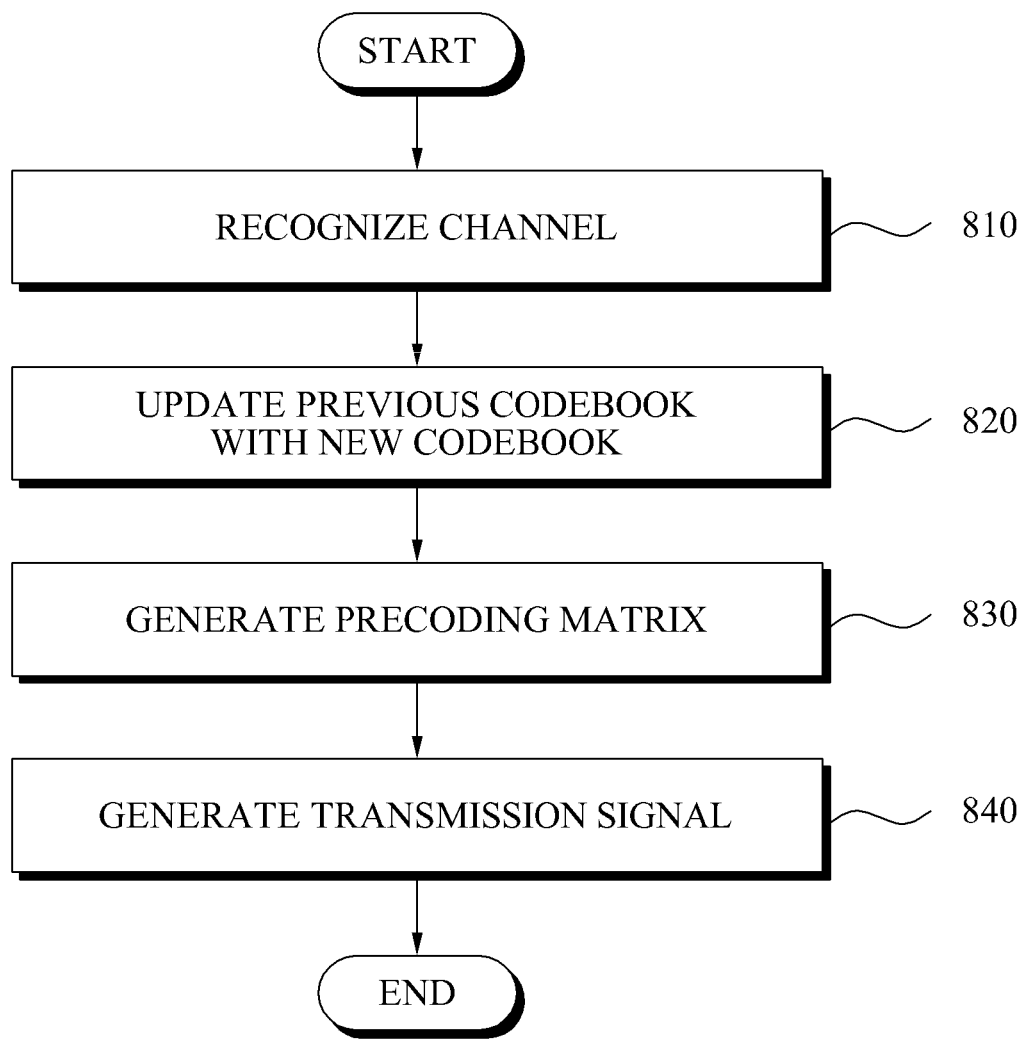
FIG. 8 is an operational flowchart illustrating an exemplary communication method of a base station.

FIG. 8 is an operational flowchart illustrating an exemplary communication method of a base station 102.

Referring to FIG. 8, the base station recognizes a channel generated between the base station and the mobile station (810).

Various methods in which the base station 102 recognizes the channel may exist. For example, the mobile station 101 may select any one of codeword matrices included in a codebook presently used based on an estimated channel to provide feedback information to the base station 102. The base station 102 may recognize the channel using the feedback information. In addition, when the base station 102 recognizes a channel at a previous point in time, a channel at the present point in time may be recognized using the feedback information, for example, indicating a Doppler effect and the like, occurring due to movement of the mobile station 101.

In addition, the base station 102 may generate statistics for the variation of a channel over time. For example, the statistics for the variation of the channel may be related to a variation speed of the channel, a variation quantity of the channel, and a pattern of the variation of the channel.

The base station updates a previous codebook with a new codebook based on a variation of the channel over time and statistics for the variation of the channel (820). For example, the base station 102 may update the previous codebook based on a time correlation coefficient indicating the variation of the channel over time, as described above. In this instance, the time correlation coefficient may be calculated based on channels measured at two or more points in time.

Various methods for updating the previous codebook with the new codebook may exist, as described herein.

For example, as described with reference to FIGS. 1 to 7, the base station 102 may generate the new codebook in real time using the variation of the channel over time and the statistics for the variation of the channel (e.g., time correlation coefficient).

In addition, the base station 102 may store a plurality of candidate codebooks in a memory in advance, and select a candidate codebook best indicating the variation of the channel over time as the new codebook. The candidate codebooks may be pre-generated in the same manner as described above with reference to FIGS. 1 to 7 by determining the codebooks using predetermined variations of a channel over time or the statistics for the variation of the channel. In this instance, the base station 102 may map indicators to the candidate codebooks, and retrieve an indicator best indicating the variation of the channel, thereby selecting the candidate codebook as the new codebook. For example, the base station 102 may use quantized time correlation coefficients as the indicators.

Furthermore, the base station 102 may generate the new codebook so that a size of the new codebook is smaller than or equal to that of the previous codebook. For example, a codeword matrix presently selected by the mobile station 101 may be predicted to be similar to a codeword matrix previously selected by the mobile station 101. In this instance, the base station 102 may select only codeword matrices that are similar to the codeword matrix previously selected by the mobile station 101 to generate the new codebook.

In addition, the base station 102 may select only a predetermined number of matrices from the plurality of codeword matrices to generate the new codebook. For example, if it is assumed that a universal set including the codeword matrices A, B, C, D, E, F, G, and H exists, a first sub-set including A, B, C, and D of the universal set is the previous codebook, and C is a codeword matrix previously selected by the mobile station, the base station 102 may determine a second sub-set of the universal set including B, C, D, and E as the new codebook.

The base station 102 also may generate the new codebook to reduce quantization error generated from quantizing the channel. For example, when the codeword matrix previously selected by the mobile station is A, the base station may again quantize a specific space area based on the variation of the channel and the codeword matrix A to thereby generate the new code matrices, and generate the new codebook based on the generated new code matrices. Particularly, when the variation of the channel over time is nearly insignificant, the base station may quantize a space area surrounding the codeword matrix A to generate the new codebook.

A specific method for updating the previous codebook with the new codebook other than the above described methods also may diversely exist. However, one basic element of methods outlined above is to obtain a more optimized codebook based on the variation of the channel or the statistics for the variation of the channel. This technical solution may be implemented in any number of various manners using the principles outlined herein, and thus further detailed descriptions of these specific methods are omitted.

Consequently, the base station 102 may update the previous codebook with the new codebook based on the variation of the channel or the statistics for the variation of the channel to obtain a more optimized codebook. In addition, the base station 102 may reduce the number of bits of the feedback information through use of the new codebook in addition to reducing the quantization error.

The base station 102 generates a preceding matrix based on the new codebook (830). For example, the base station 102 may easily update a previously used preceding matrix based on the new codebook as illustrated, for example, using Equation 31, to obtain a new preceding matrix. In this example, the updating based on the new codebook may include updating based on a variation of the channel for obtaining a new codebook or statistics with respect to the variation of the channel. That is, the base station 102 may easily update the previously used preceding matrix only based on the variation of the channel or the statistics with respect to the variation of the channel without updating the previous codebook to obtain the new preceding matrix.

Various methods of obtaining the new preceding matrix may exist. For example, the base station 102 may obtain the new preceding matrix using the new codebook and the previously used preceding matrix, as shown in Equation 31. In addition, the base station 102 may obtain a new preceding matrix intended to be used based on a preceding matrix at a specific point in time (e.g., "time=0") and information about the channel matrix (e.g., information about the variation of the channel or information about statistics with respect to the variation of the channel).

The base station 102 performs preceding with respect to a data stream using the new preceding matrix, and generates a transmission signal (840). The transmission signal is transmitted via multiple transmission antennas 160 installed in the base station 102. In this instance, since the mobile station 101 has an identical codebook to the new codebook of the base station 102, the mobile station 101 may decode the transmission signal based on its identical codebook.

Figure 9:
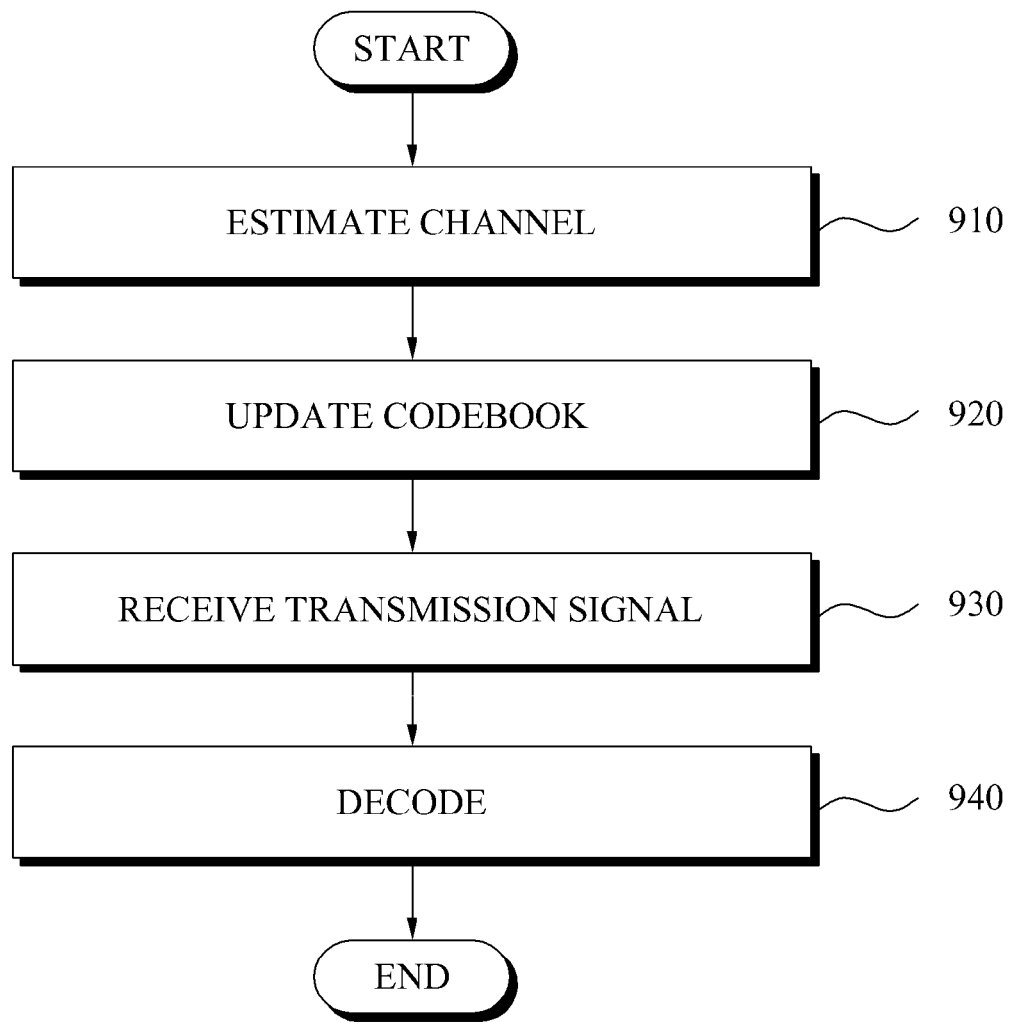
FIG. 9 is an operational flowchart illustrating an exemplary communication method of a mobile station.

FIG. 9 is an operational flowchart illustrating an exemplary communication method of a mobile station 101.

Referring to FIG. 9, the mobile station 101 estimates a channel generated between the base station and the mobile station (910).

The mobile station 101 updates a previous codebook with a new codebook based on the estimated channel (920). Descriptions in which the previous codebook is updated with the new codebook are the same as described above for the base station 102. Accordingly, the descriptions are applicable in the mobile station 101 as well as the base station 102, and thus are not repeated here for brevity.

The mobile station 101 receives a transmission signal generated by the base station 102 using the new codebook (e.g., using the new preceding matrix) (930). The mobile station 101 decodes the transmission signal based on the new codebook (940).

Figure 10:
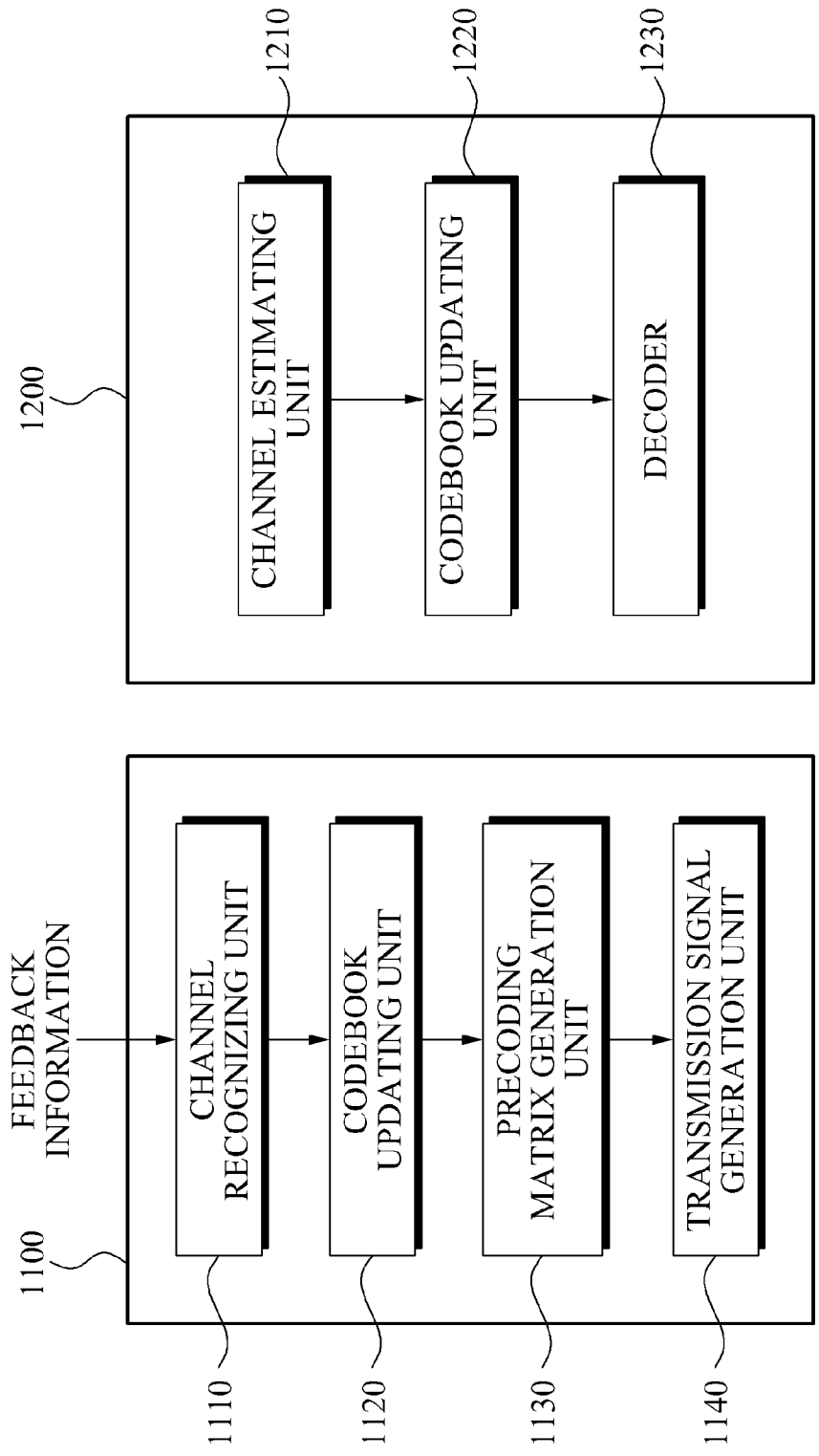
FIG. 10 is a block diagram illustrating an exemplary base station and an exemplary mobile station.

FIG. 10 is a block diagram illustrating an exemplary base station 1100 and an exemplary mobile station 1200.

Referring to FIG. 10, the base station 1100 includes a channel recognizing unit 1110, a codebook updating unit 1120, a preceding matrix generation unit 1130, and a transmission signal generation unit 1140.

The channel recognizing unit 1110 recognizes a channel between the base station 1100 where multiple transmission antennas are installed (not shown) and the mobile station 1200. In this instance, the channel recognizing unit 1110 may recognize the channel based on feedback information provided by the mobile station 1200. For example, the feedback information may include an index of the codeword matrix selected by the mobile station 1200, a time correlation coefficient of the channel, or information corresponding to the time correlation coefficient.

The codebook updating unit 1120 updates the previous codebook with the new codebook based on the variation of the channel over time or the statistics for the variation of the channel.

The preceding matrix generation unit 1130 generates a new preceding matrix using the new codebook, and the transmission signal generation unit 1140 generates a transmission signal using the new preceding matrix.

A channel estimating unit 1210 estimates a channel between the base station 1100 where multiple transmission antennas are installed and the mobile station 1200. In this instance, the channel estimating unit 1210 may estimate the channel using pilot signals transmitted from the base station 1100, as described above.

The codebook updating unit 1220 updates the previous codebook with the new codebook using the same or similar method used in the base station 1100. In addition, a decoder 1230 decodes the transmission signal transmitted from the base station 1100 based on the new codebook.

Descriptions of FIGS. 1 to 9 may be applicable in units illustrated in FIG. 10. For example, the units and methods described with regard to the mobile stations 101 and base stations 102 given above may be applicable to the units or provided in addition to the units provided. However, the detailed descriptions of these units and methods are not repeated for brevity.

On skilled in the art will appreciate that the various units and method described above may be implemented using various hardware and software. For example, the units describe above may be implemented using a processing device. The processing device may be any general-purpose or special purpose computer, such as, for example, a processor, a digital signal processor, a microcomputer, a field programmable array, a programmable logic unit, a microprocessor or any other device capable of performing calculations and/or responding to and executing instructions in a defined manner. The processing device may run one or more software applications that implement the various method and functions described above. The processing device also may access, store, manipulate, process, and create data in response to these applications. The software applications may include a computer program, a piece of code, an instruction, or some combination thereof, for independently or collectively instructing the processing device to operate as desired. In addition, hardwired logic or a combination of hardwired logic and software also may be used.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like.

Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, static dynamic memories, a DROM, a flip-flop, a register, a buffer, an SRAM, DRAM, PROM, EPROM, OPTROM, EEPROM, NOVRAM, or RAMBUS), such that if the media is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented. Examples of program instructions include machine code, such as produced by a compiler, and files containing higher level code that may be executed by the computer using an interpreter. The described hardware devices may be configured to act as one or more software modules or units in order to perform the operations and methods described above, or vice versa.

Hereinafter, examples of specific digits of the above described first codebook and second codebook are provided.

1. First Codebook (1) First Codebook in Which a Number of Transmission Antennas of a Base Station is 2, and Which Has an Identity Matrix $\Theta_1$=1.0000 0.0000+0.0000$i$ 0.0000−0.0000$i$ 1.0000

$\Theta_2$=0.5732+0.1150$i$ 0.5343+0.6105$i$ −0.7161+0.3814$i$ 0.5767+0.0958$i$ $\Theta_3$=−0.3396+0.1940$i$ 0.6153−0.6844$i$ 0.0883−0.9161$i$− 0.0867−0.3814$i$ $\Theta_4$=−0.0685+0.7437$i$ −0.4689+0qj0.4715$i$ −0.3493+ 0.5658$i$ 0.7073−0.2399$i$ $\Theta_5$=−0.3065−0.4181$i$ 0.5613+0.6452$i$ − 0.7872+0.3341$i$ −0.4587+0.2415$i$ $\Theta_6$=0.2983−0.2900$i$ 0.2784−0.8657$i$ −0.9078−0.0541$i$ 0.3783−0.1730$i$ $\Theta_7$=−0.6555−0.2242$i$ 0.4919+0.5274$i$ − 0.3710−0.6184$i$ −0.0344−0.6919$i$ $\Theta_8$=0.7811−0.1004$i$ 0.1436−0.5993$i$ −0.1963+ 0.5842$i$ −0.6088−0.4996$i$ (2) First Codebook in Which the Number of Transmission Antennas of the Base Station is 4, and a Size of the First Codebook is 3 Bits $\Theta_1$=−0.6803+0.0892$i$ 0.0633−0.5542$i$ 0.0453+ 0.3251$i$ −0.1839−0.2767$i$ −0.3529−0.1754$i$ − 0.2705+0.4943$i$ 0.5140−0.1299$i$ 0.2102−0.4493$i$ 0.0461−0.5327$i$ − 0.4408−0.2483$i$ − 0.1289− 0.4335$i$ − 0.4955−0.0899$i$ −0.0186−0.2962$i$ 0.3314+0.0743$i$ 0.6117+0.1799$i$ − 0.4164+0.4654$i$ $\Theta_2$=−0.1869−0.1021$i$ 0.8205+0.2228$i$ − 0.0164−0.1298$i$ 0.3427+0.3119$i$ − 0.7378+0.0553$i$ −0.0594+ 0.1503$i$ −0.3799−0.3789$i$ −0.2637−0.2628$i$ 0.4598+0.0162$i$ 0.4330+0.1787$i$ − 0.0266−0.1585$i$ −0.3889−0.6259$i$ 0.3395+0.2835$i$ −0.1215−0.1300$i$ − 0.0896−0.8131$i$ 0.0422+0.3191$i$ $\Theta_3$=−0.4316−0.1394$i$ 0.0140+ 0.0298$i$ −0.1265−0.0400$i$ −0.7521−0.4582$i$ − 0.4206−0.1383$i$ −0.1708−0.2940$i$ − 0.0015−0.7824$i$ 0.1548+0.2285$i$ − 0.5100+0.1417$i$ 0.7304−0.2057$i$ − 0.0514+0.2100$i$ 0.3060−0.0602$i$ 0.1749−0.5362$i$ 0.0119−0.5544$i$ − 0.5091+0.2535$i$ − 0.0792+ 0.2114$i$ $\Theta_4$=−0.4673+0.3364$i$ −0.1624+0.2575$i$ − 0.6056+ 0.041$i$ 0.2059+0.4061$i$ 0.1668−0.4510$i$ − 0.2554−0.1603$i$ −0.6373+0.3220$i$ − 0.0165−0.4096$i$ 0.3871−0.4778$i$ 0.2649+ 0.1881$i$ − 0.0615+0.1902$i$ 0.0572+0.6878$i$ − 0.1576+0.1852$i$ 0.5202−0.6635$i$ − 0.2004+0.2040$i$ − 0.3532+0.1535$i$ $\Theta_5$=−0.2393−0.3297$i$ 0.4015+0.4942$i$ 0.3469−0.0319$i$ 0.0121+0.5541$i$ 0.1616+0.5138$i$ − 0.4228−0.0200$i$ 0.5404−0.3456$i$ 0.0590+ 0.3402$i$ − 0.0491−0.5135$i$ − 0.4514−0.4165$i$ − 0.1600+0.0566$i$ 0.3298+0.4680$i$ − 0.3951+0.3487$i$ − 0.1235+0.1514$i$ − 0.6340− 0.1908$i$ − 0.3135+0.3841$i$ $\Theta_6$=−0.2804+0.4572$i$ 0.1772+0.3508$i$ 0.1574−0.3395$i$ 0.6280−0.1531$i$ −0.4265+0.4341$i$ − 0.4813−0.3806$i$ 0.2234−0.0753$i$ − 0.3279−0.3001$i$ −0.3793+0.4402$i$ 0.3539+0.0312$i$ −0.4783+0.4242$i$ − 0.1833+0.3063$i$ −0.0537−0.0386$i$ 0.1568+0.5641$i$ 0.4305+0.4586$i$ − 0.3125−0.3994$i$ $\Theta_7$=−0.1118−0.4653$i$ −0.5127−0.0525$i$ − 0.1783− 0.6202$i$ −0.1753−0.2412$i$ 0.2528+0.4106$i$ − 0.0039+0.2717$i$ 0.1759−0.0409$i$ − 0.6003−0.5484$i$ 0.6832−0.0908$i$ 0.0254+ 0.1641$i$ − 0.5716+0.0683$i$ 0.3370−0.2291$i$ 0.2212+0.1208$i$ − 0.7692−0.2033$i$ 0.0178+0.4682$i$ − 0.1591+0.2421$i$ $\Theta_8$=−0.0686−0.1582$i$ 0.4196−0.7630$i$ 0.0559− 0.0535$i$ − 0.4100+0.1946$i$ 0.5031−0.4084$i$ − 0.3834−0.1473$i$ −0.1624+0.3182$i$ − 0.3131−0.4309$i$ − 0.6568−0.1092$i$ 0.0656−0.1149$i$ − 0.5109+0.3864$i$ 0.1605−0.3210$i$ − 0.3053+0.1175$i$ − 0.2356− 0.0054$i$ 0.0230−0.6749$i$ − 0.3692−0.4951$i$ (3) First Codebook in Which the Number of Transmission Antennas of the Base Station is 4, and a Size of the First Codebook is 4 Bits $\Theta_1$=−0.3312+0.3014$i$ −0.0900−0.2264$i$ 0.1958+0.2537$i$ −0.0141−0.7983$i$ 0.5556−0.1959$i$ −0.1109−0.5460$i$ 0.5122−0.0583$i$ 0.2749−0.0349$i$ − 0.1313+0.0212$i$ −0.4334−0.6301$i$ − 0.4594+0.2746$i$ −0.1975+0.2681$i$ 0.6114−0.2467$i$ 0.0034+0.2129$i$ − 0.4682+0.3548$i$ − 0.0915−0.4081$i$ $\Theta_2$=−0.4942+0.4467$i$ −0.3094+0.3290$i$ 0.3818−0.0099$i$ 0.2750+0.3616$i$ 0.0378+ 0.1170$i$ − 0.5353+0.1020$i$ −0.7305−0.3485$i$ − 0.0664+0.1686$i$ −0.2905+0.0297$i$ 0.2148−0.5246$i$ − 0.3299+0.0812$i$ 0.6892+0.0538$i$ 0.1045+0.6670$i$ 0.2262− 0.3557$i$ − 0.1193+0.2634$i$ − 0.4377+0.3022$i$ $\Theta_3$=−0.3912−0.2975$i$ 0.4626+0.6589$i$ 0.1182− 0.2876$i$ − 0.1132−0.0269$i$ −10−0.7348− 0.2300$i$ − 0.2530−0.2332$i$ 0.2006+0.3965$i$ − 0.1119+0.2807$i$ 0.0667−0.0002$i$ − 0.0776−0.3106$i$ 0.4645−0.4610$i$ − 0.6739−0.1030$i$ 0.2153+0.3388$i$ 0.1322+ 0.3368$i$ − 0.0447+0.5250$i$ − 0.5846+0.2976$i$ $\Theta_4$=−0.2404−0.4930$i$ −0.5981−0.3638$i$ 0.0628−0.3392$i$ 0.2865−0.0893$i$ 0.3495−

0.4244i − 0.2322+0.3031i −0.1466+0.6729i
0.2649−0.0862i −0.1882−0.2429i −
0.1723+0.2080i 0.0332+0.0480i −
0.3614+0.8359i 0.0093+0.5499i −
0.5138−0.1645i 0.5234+0.3597i 0.0008+0.0558i $\Theta_5$=−0.0005+0.3696i −0.4368+0.0836i − 0.6835−
0.0259i 0.3856−0.2216i 0.7462+0.1571i −
0.4519−0.0897i 0.2134−0.0769i −
0.0444+0.3908i − 0.1034+0.4513i − 0.0039+
0.6626i 0.3816−0.4289i − 0.0080−0.1301i −
0.2562+0.0421i −0.0173+0.3881i −
0.3403+0.1880i −0.3163+0.7283i $\Theta_6$=0.3010−0.3296i 0.0810+0.1585i −0.4800−0.3468i
0.4901−0.4222i 0.2416+0.1233i −
0.7048+0.0952i −0.2640−0.2650i −
0.5187−0.1077i 0.7690−0.0743i 0.2644−
0.4559i − 0.0835+0.2285i − 0.2081+0.1515i
0.2250−0.2824i 0.2301+0.3630i 0.6285−
0.2352i − 0.3355−0.3494i $\Theta_7$=0.2529+0.3952i 0.3371−0.1562i −0.2872−0.6917i
0.0780−0.2736i −0.2609−0.4381i −
0.1627−0.1810i −0.1602−0.1052i
0.7323−0.3282i −0.4753−0.2968i
0.7175−0.3189i −0.0584+0.0512i −
0.2449+0.0598i −0.3895−0.2327i −
0.3809+0.2030i −0.2998−0.5536i −
0.3022+0.3467i $\Theta_8$=−0.0240+0.1337i −0.0312−0.1950i
0.6585+0.0913i −0.0616−0.7048i −
0.1118−0.0623i −0.1253−0.3728i −
0.1273+0.6473i −0.6160+0.1195i −
0.3812+0.7506i 0.4990+0.0416i 0.0112−
0.0306i − 0.1406+0.1406i − 0.2545−0.4378i
0.4475−0.5961i 0.2290−0.2632i 0.0835+0.2433i $\Theta_9$=−0.3377+0.1461i −0.1515−0.2893i
0.1949−0.0972i −0.1072−0.8361i −
0.5653+0.3530i 0.0596−0.1848i −
0.6943+0.0254i 0.0859+0.1674i 0.4277−
0.0404i − 0.2322+0.3516i − 0.5515−0.3140i
0.2900−0.3887i − 0.4835−0.0454i − 0.4835+
0.6666i 0.1863+0.1799i 0.1281+0.0505i $\Theta_{10}$=0.1723−0.4277i −0.1044+0.6635i
0.3884+0.2694i 0.3228−0.0935i 0.2166+
0.1575i − 0.2290−0.4353i 0.6836+0.0578i −
0.0890−0.4559i −0.2748−0.5781i −
0.3312−0.3370i −0.3310−0.0626i
0.2995−0.4048i − 0.5495−0.0632i − 0.2227−
0.1846i 0.4355−0.0532i 0.2143+0.6099i $\Theta_{11}$=−0.1555−0.4281i 0.4376−0.3127i
0.3437+0.5730i 0.1692+0.1682i 0.1304+
0.0652i − 0.1479+0.6690i 0.4351+0.1310i
0.5497+0.0267i −0.1896+0.7436i
0.2260−0.0482i 0.3267+0.3280i 0.0491−
0.4600i − 0.5439+0.391 1i − 0.3079−0.1676i
0.2335+0.0568i − 0.6966−0.2759i
0.0131−0.4852i 0.1587−0.3464i $\Theta_{12}$=0.0165−0.5535i −0.7550−0.1559i
0.1671+0.1530i −0.2176+0.0183i −
0.0571+0.1988i −0.4150−0.2194i −
0.2346−0.2553i 0.7477+0.2399i −
0.3514+0.2928i − 0.1325−0.3095i
0.4314−0.4456i − 0.1163−0.5284i
0.5682−0.3443i 0.1261+0.2367i 0.3712−0.5532i
0.2067−0.0149i $\Theta_{13}$=0.1982−0.5178i 0.0389−0.5462i 0.3778−
0.4051i − 0.2678−0.1190i 0.1324−0.1334i −
0.4253+0.5053i 0.1263+0.1035i −
0.4858−0.5156i 0.0609−0.3478i 0.3423+
0.3637i − 0.3420−0.4573i 0.4006−0.3733i
0.7165−0.1384i − 0.0988−0.0691i − 0.5726+
0.1119i −0.1785+0.2839i $\Theta_{14}$=0.2144+0.6242i −0.3358−0.1603i
0.2764−0.1750i 0.4934−0.2746i −
0.2927+0.0938i −0.2325+0.7364i
0.5269+0.0150i −0.1655+0.0624i −
0.2954−0.4799i −0.0936−0.3243i
0.3825−0.6282i 0.0395−0.1614i −
0.3895+0.0246i 0.3844+0.0588i −
0.0199+0.2716i 0.0903−0.7837i $\Theta_{15}$=−0.6050+0.2462i 0.1949+0.0686i − 0.2169+
0.1520i −0.6241−0.2665i 0.5874+0.4713i
0.0594+0.1253i − 0.1271−0.1067i − 0.0693−
0.6175−0.0566i −0.0438i 0.5385−0.2835i
0.7017−0.3102i − 0.0697−0.1759i − 0.0310−
0.0135i − 0.6300−0.4133i 0.3958+0.3962i −
0.1217−0.3205i $\Theta_{16}$=0.3464+0.2971i −0.1407−0.4063i − 0.6469+
0.4006i 0.0511+0.1589i − 0.5370−0.5366i −
0.4650−0.2161i 0.2803+0.1133i −
0.0732−0.2530i 0.1696+0.0448i −
0.0875+0.2207i − 0.3943+0.0319i − 0.2383−
0.8364i 0.1405+0.4061i − 0.0208−0.7038i
0.3146−0.2722i − 0.3269+0.1988i (4) First Codebook in Which the Number of Transmission Antennas of the Base Station is 4, and a Size of the First Codebook Having the Identity Matrix is 3 Bits $\Theta_1$=1.0000−0.0000i 0.0000+0.0000i −0.0001−
0.0000i − 0.0000−0.0000i 0.0000−0.0000i
1.0000+0.0000i −0.0000+0.0000i
0.0001−0.0000i −0.0001+0.0000i −
0.0000−0.0000i 1.0000−0.0000+0.0000i −
0.0000+0.0000i 0.0001+0.0000i −
0.0000−0.0000i 1.0000

$\Theta_2$=0.2910+0.2782i −0.5782−0.0829i 0.5258+0.1240i
0.1540−0.4257i 0.1985+0.4154i −
0.2663+0.4522i −0.0527+0.0734i −
0.1548+0.6930i −0.2357+0.2983i −
0.1714−0.0801i −0.3179−0.7170i
0.4202−0.1669i −0.3560−0.5956i −
0.5331+0.2520i −0.1844+0.2254i
0.2932−0.0136i $\Theta_3$=0.5104−0.0950i 0.4122+0.4457i 0.0404+0.141 1i
0.3611+0.4582i 0.3031−0.3825i −
0.4229+0.2610i −0.5515+0.1562i
0.1469−0.4057i −0.2483−0.5905i −
0.1367−0.1746i −0.2681−0.1657i −
0.1569+0.6453i 0.0093−0.2860i −
0.5210+0.2528i 0.7221−0.1701 0.1801−0.0001i $\Theta_4$=0.5886+0.1353i 0.3506+0.1673i 0.4232−
0.2865i − 0.4288−0.1983i −0.5745+0.1817i −
0.2035−0.1798i 0.1991−0.1217i −
0.7117+0.0469i 0.3267+0.3280i 0.0491−
0.4600i − 0.5439+0.391 1i − 0.3079−0.1676i
0.2335+0.0568i − 0.6966−0.2759i
0.0131−0.4852i 0.1587−0.3464i $\Theta_5$=0.1616−0.0807i 0.0822−0.7382i −0.3381−
0.0594i − 0.3813−0.3905i 0.4219−0.0133i
0.1287+0.5991i −0.4452−0.0642i −
0.4911−0.0532i −0.0517+0.6772i
0.1546−0.2005i −0.0981−0.3010i −
0.2012+0.5777i 0.3357+0.4637i 0.0925−0.0137i
0.4633+0.6041i −0.1922−0.2168i $\Theta_6$=0.0664−0.7110i −0.0230+0.0214i −
0.5949+0.1664i − 0.3200−0.0721i
0.0960−0.3301i −0.3110+0.7107i
0.3827−0.2101i −0.0635+0.2919i −
0.3214+0.0445i 0.0624+0.1664i 0.2450−
0.1352i − 0.5230−0.7150i − 0.2069−0.4732i −
0.0407−0.6032i 0.3788−0.4540i 0.0003+0.1350i $\Theta_7$=−0.0867+0.6490i 0.2861−0.2181i −
0.1907+0.1783i 0.4746+0.3853i 0.1890−
0.0942i − 0.1900−0.4353i 0.5403−0.2322i −
0.1125+0.6094i 0.0286+0.6011i −
0.6591+0.3073i 0.0252+0.0583i −
0.3216+0.0385i −0.3483+0.2077i
0.1843+0.2868i 0.7473−0.1533i 0.2517−0.2721i $\Theta_8$=−0.0746−0.1014i −0.1222+0.4263i − 0.0712−
0.3443i 0.8143−0.0281i − 0.0304−0.2396i
0.4014+0.4963i 0.3211−0.5008i −
0.4123+0.1011i 0.2235−0.2733i −
0.5107−0.2142i − 0.3487−0.5664i − 0.2567−
0.2455i 0.8627+0.2385i 0.1930+0.2279i −
0.2778+0.0522i 0.0220+0.1710i (5) First Codebook in Which the Number of Transmission Antennas of the Base Station is 4, and a Size of the First Codebook Having the Identity Matrix is 4 Bits $\Theta_1$=1.0000 0.0000−0.0000i −0.0000+0.0000i −
0.0000+0.0000i 0.0000+0.0000i 1.0000+
0.0000i − 0.0000+0.0000i 0.0000+0.0001i −
0.0000−0.0000i − 0.0000−0.0000i
1.0000−0.0001i+0.0000i − 0.0000=0.0000i
0.0000−0.0001i − 0.0001−0.0000i 1.0000

$\Theta_2$=0.2345+0.5093i 0.0710−0.1613i −0.5599−
0.3206i − 0.4835−0.0669i 0.1248−0.3603i
0.1195−0.0899i 0.3867−0.4896i −
0.4611+0.4799i 0.3584−0.0083i −
0.7321+0.4322i 0.0416−0.3476i 0.1121−
0.1166i − 0.5598−0.3137i − 0.4676−0.0714i −
0.1958+0.1833i −0.5217−0.1432i $\Theta_3$=−0.2840+0.2036i −0.0482−0.2558i − 0.3197+
0.6799i −0.4323+0.2426i 0.3537−0.4401i
0.2661−0.0081i 0.0165+0.6220i 0.2938−
0.3699i − 0.5263−0.3729i 0.1497−0.1631i −
0.1030−0.0172i 0.5579+0.4612i −
0.1222−0.3580i − 0.8114+0.3923i − 0.1563+
0.1146i 0.0200−0.0815i $\Theta_4$=0.0979+0.4428i −0.3465+0.1727i −
0.1084+0.7806i 0.0942−0.1206i 0.6779+
0.2144i − 0.0967−0.3529i − 0.2463−0.2200i −
0.3461−0.3629i 0.2421−0.3300i −
0.0275+0.4333i − 0.3076−0.1315i
0.5891−0.4301i 0.2546−0.2375i 0.4284−0.5866i
0.0177+0.3971i 0.4157+0.1425i $\Theta_5$=0.3515+0.0167i −0.1554+0.1117i 0.0386+
0.2929i − 0.6705+0.5501i −0.4836+0.1506i −
0.2138−0.6278i 0.2294+0.4721i 0.0464+0.1608i
0.7730−0.0887i 0.0390−0.4240i −
0.0937+0.2664i 0.3482−0.1104i 0.0523−
0.1062i − 0.1601−0.5627i − 0.1443−0.7326i −
0.1560+0.2489i $\Theta_6$=0.0157+0.0106i −0.3825+0.1709i 0.4178+
0.0436i − 0.6451−0.4812i −0.3924+0.6839i
0.2337−0.0749i 0.1400−0.4785i 0.0870−
0.2489i − 0.4873−0.1883i −0.5361−0.0966i −
0.5783−0.2922i −0.1002−0.0222i
0.2439+0.2134i − 0.6684+0.1438i
0.3365−0.2051i 0.4463+0.2704i $\Theta_7$=−0.1484−0.6909i −0.5976−0.1255i − 0.2197−
0.1921i 0.1260+0.1630i 0.4980−0.1609i 0.0538+
0.6937i 0.1318−0.0756i 0.2942+0.3638i 0.2783+
0.2876i − 0.2132−0.2287i −0.3228+0.2323i
0.7335−0.2141i −0.2306+0.1152i −
0.1937−0.0875i 0.7945−0.3202i 0.3806−0.0997i $\Theta_8$=0.0167−0.5145i 0.3110−0.4278i −0.1853+
0.0053i − 0.5452+0.3516i −0.3835−0.5844i −
0.1035+0.1825i −0.4601−0.0298i
0.1926−0.4666i 0.3207+0.0490i −
0.7369−0.2643i − 0.1650+0.2279i − 0.3629−
0.2666i 0.3435−0.1519i 0.2496−0.0338i −
0.0637+0.8185i 0.3485−0.0061i $\Theta_9$=−0.5688−0.0120i −0.3898+0.2975i − 0.3493+
0.0604i −0.1820+0.5264i −0.3039−0.0476i
0.1928−0.1487i 0.5434−0.5795i 0.2284+
0.4034i − 0.3365+0.3560i 0.6043−0.3477i −
0.1999+0.0494i − 0.4809−0.0159i −
0.3121−0.4942i 0.1682−0.4311i −
0.1826+0.4092i 0.4929+0.0219i $\Theta_{10}$=−0.3930+0.1272i 0.1383−0.5915i
0.6426+0.0499i −0.1626+0.1355i
0.4393+0.3725i 0.4381−0.1760i −
0.0303+0.1562i 0.5067+0.4041i 0.2293+0.5314i
0.1544+0.3313i 0.4033+0.0137i −
0.1122−0.5968i 0.3684+0.1638i −
0.5052−0.1390i −0.0042+0.6297i −
0.3747+0.1619i $\Theta_{11}$=−0.2373+0.0490i −0.6173+0.5692i
0.4226+0.0197i − 0.1270−0.2027i −
0.3278−0.2836i −0.2696+0.1643i −
0.4266−0.1075i −0.0345+0.7195i
0.4137−0.1395i − 0.0639−0.0419i
0.5764−0.2381i 0.4628+0.4476i 0.6550−
0.3655i − 0.0578+0.4314i −0.3151+0.3732i
0.0127−0.0963i $\Theta_{12}$=0.2417+0.1763i 0.0450+0.2953i 0.2078−0.4861i
0.5801+0.4530i −0.0820−0.4701i
0.5723−0.3346i 0.0930+0.3083i 0.1824+
0.4424i − 0.3244−0.0925i −0.3863+0.0475i −
0.7244+0.0567i 0.1373+0.4336i 0.6554+
0.3734i − 0.1363−0.5489i − 0.1929+0.2273i
0.0541+0.1393i $\Theta_{13}$=0.3348+0.2001i −0.5934+0.2450i − 0.5398+
0.0970i −0.3558−0.0914i 0.3233+0.2147i −
0.5011−0.1514i 0.4454+0.2845i 0.5079+
0.1952i − 0.5250−0.2586i − 0.4139−0.0765i
0.3692+0.3400i − 0.4036−0.2559i
0.3373+0.4909i 0.3681−0.0348i 0.3008+
0.2783i − 0.2955−0.5033i $\Theta_{14}$=−0.2795−0.2884i 0.0154+0.6932i
0.0028+0.3217i −0.1104−0.4920i
0.2550−0.0730i −0.0510−0.2703i
0.2359+0.8828i −0.0799+0.1121i
0.2400+0.5271i − 0.4736+0.4282i
0.0362−0.0025i − 0.4443+0.2416i −
0.6298+0.1907i − 0.0845+0.1692i −
0.0729+0.2342i 0.4251+0.5390i $\Theta_{15}$=0.4995+0.4688i −0.3954−0.3825i
0.1135+0.2966i 0.2189−0.2817i −
0.2746+0.0992i −0.2530+0.6514i
0.0345+0.3733i 0.5337−0.0295i 0.2411+
0.5303i − 0.0982+0.4310i −0.5151−0.3534i −
0.2623+0.0790i −0.0352−0.3240i −
0.0016−0.1165i − 0.5692−0.2106i
0.3326−0.6335i $\Theta_{16}$=−0.0246−0.1239i −0.1148−0.4967i
0.7805+0.0955i −0.0974−0.3103i
0.3017−0.2799i 0.0232−0.3740i −
0.0315−0.3722i 0.6925+0.2666i −
0.2235−0.4672i −0.4954+0.0779i
0.0580+0.4264i −0.0101+0.5430i −
0.5613−0.4811i 0.5716−0.1464i −
0.0689−0.2284i −0.2050+0.0803i (6) First Codebook in Which the Number of Transmission Antennas of the Base Station is 4, and a Unitary Discrete Fourier Transform (DFT) Vodebook is 4 Bits $\Theta_1$=0.4619+0.1913i 0.4619+0.1913i 0.4619+0.1913i
0.4619+0.1913i 0.1913+0.4619i −
0.4619+0.1913i −0.1913−0.4619i
0.4619+0.1913i 0.0000+0.5000i −
0.0000−0.5000i 0.0000+0.5000i −
0.0000−0.5000i −0.5000+0.0000i
0.0000+0.5000i 0.5000−0.0000i −
0.0000−0.5000i $\Theta_2$=0.3536+0.3536i 0.3536+0.3536i 0.3536+0.3536i 0.3536+0.3536i −0.3536+0.3536i − 0.3536−0.3536i 0.3536−0.3536i 0.3536+ 0.3536i − 0.5000+0.0000i 0.5000−0.0000i − 0.5000+0.0000i 0.5000−0.0000i 0.5000− 0.0000i − 0.0000−0.5000i − 0.5000+0.0000i 0.0000+0.5000i $\Theta_3$=0.1913+0.4619i 0.1913+0.4619i 0.1913+0.4619i 0.1913+0.4619i −0.4619−0.1913i 0.1913−0.4619i 0.4619+0.1913i − 0.1913+0.4619i −0.0000−0.5000i 0.0000+0.5000i −0.0000−0.5000i 0.0000+0.5000i −0.5000+0.0000i 0.0000+0.5000i 0.5000−0.0000i − 0.0000−0.5000i $\Theta_4$=−0.0000+0.5000i −0.0000+0.5000i − 0.0000+ 0.5000i −0.0000+0.5000i −0.0000−0.5000i 0.5000−0.0000i 0.0000+0.5000i − 0.5000+0.0000i 0.5000−0.0000i − 0.5000+0.0000i 0.5000−0.0000i − 0.5000+0.0000i 0.5000−0.0000i − 0.0000−0.5000i − 0.5000+0.0000i 0.0000+0.5000i $\Theta_5$=−0.1913+0.4619i −0.1913+0.4619i − 0.1913+ 0.4619i −0.1913+0.4619i 0.4619−0.1913i 0.1913+0.4619i − 0.4619+0.1913i − 0.1913− 0.4619i 0.0000+0.5000i − 0.0000−0.5000i 0.0000+0.5000i − 0.0000−0.5000i − 0.5000+ 0.0000i 0.0000+0.5000i 0.5000−0.0000i − 0.0000−0.5000i $\Theta_6$=−0.3536+0.3536i −0.3536+0.3536i − 0.3536+ 0.3536i −0.3536+0.3536i 0.3536+0.3536i − 0.3536+0.3536i − 0.3536−0.3536i 0.3536−0.3536i − 0.5000+0.0000i 0.5000−0.0000i − 0.5000+0.0000i 0.5000−0.0000i − 0.0000−0.5000i − 0.5000+0.0000i 0.0000+0.5000i $\Theta_7$=−0.4619+0.1913i −0.4619+0.1913i − 0.4619+ 0.1913i −0.4619+0.1913i −0.1913+0.4619i − 0.4619−0.1913i 0.1913−0.4619i 0.4619+ 0.1913i − 0.0000−0.5000i 0.0000+0.5000i − 0.5000+0.0000i 0.0000+0.5000i − 0.5000+0.0000i 0.0000+0.5000i 0.5000− 0.0000i − 0.0000−0.5000i $\Theta_8$=−0.5000−0.0000i −0.5000−0.0000i − 0.5000− 0.0000i −0.5000−0.0000i −0.5000+0.0000i − 0.0000−0.5000i 0.5000−0.0000i 0.0000+0.5000i 0.5000−0.0000i − 0.5000+0.0000i 0.5000−0.0000i − 0.5000+0.0000i 0.5000−0.0000i − 0.0000−0.5000i − 0.5000+ 0.0000i 0.0000+0.5000i $\Theta_9$=−0.4619−0.1913i −0.4619−0.1913i −0.4619− 0.1913i −0.4619−0.1913i −0.1913−0.4619i 0.4619+0.1913i 0.1913+0.4619i − 0.4619+0.1913i 0.0000+0.5000i − 0.0000−0.5000i 0.0000+0.5000i − 0.0000−0.5000i − 0.5000+0.0000i 0.5000−0.0000i − 0.0000−0.5000i $\Theta_{10}$=−0.3536−0.3536i −0.3536−0.3536i −0.3536− 0.3536i −0.3536−0.3536i 0.3536−0.3536i 0.3536+0.3536i − 0.3536+0.3536i − 0.3536−0.3536i −0.5000+0.0000i 0.5000−0.0000i − 0.5000+0.0000i 0.5000−0.0000i − 0.0000−0.5000i − 0.5000+0.0000i 0.0000+0.5000i $\Theta_{11}$=−0.1913−0.4619i −0.1913−0.4619i −0.1913− 0.4619i −0.1913−0.4619i 0.4619+0.1913i − 0.1913+0.4619i −0.4619−0.1913i 0.1913−0.4619i −0.0000−0.5000i 0.0000+0.5000i −0.0000−0.5000i 0.0000+0.5000i −0.5000+0.0000i 0.0000+0.5000i 0.5000−0.0000i − 0.0000−0.5000i $\Theta_{12}$=0.0000−0.5000i 0.0000−0.5000i 0.0000−0.5000i 0.0000−0.5000i 0.0000+0.5000i − 0.5000+0.0000i −0.0000−0.5000i 0.5000−0.0000i 0.5000−0.0000i 0.5000−0.0000i − 0.5000+0.0000i 0.5000−0.0000i − 0.5000+0.0000i 0.5000−0.0000i − 0.0000−0.5000i −0.5000+0.0000i 0.0000+0.5000i $\Theta_{13}$=0.1913−0.4619i 0.1913−0.4619i 0.1913−0.4619i 0.1913−0.4619i −0.4619+0.1913i − 0.1913−0.4619i 0.4619−0.1913i 0.1913+0.4619i 0.0000+0.5000i − 0.0000−0.5000i 0.0000+0.5000i − 0.0000−0.5000i − 0.5000+ 0.0000i 0.0000+0.5000i 0.5000−0.0000i − 0.0000−0.5000i $\Theta_{14}$=0.3536−0.3536i 0.3536−0.3536i 0.3536−0.3536i 0.3536−0.3536i −0.3536−0.3536i 0.3536−0.3536i 0.3536+0.3536i − 0.3536+0.3536i −0.5000+0.0000i 0.5000−0.0000i − 0.5000+0.0000i 0.5000−0.0000i − 0.0000−0.5000i −0.5000+0.0000i 0.0000+0.5000i $\Theta_{15}$=0.4619−0.1913i 0.4619−0.1913i 0.4619−0.1913i 0.4619−0.1913i 0.1913−0.4619i 0.4619+ 0.1913i − 0.1913+0.4619i −0.4619−0.1913i − 0.0000−0.5000i 0.0000+0.5000i − 0.0000−0.5000i 0.0000+0.5000i − 0.5000+0.0000i 0.0000+0.5000i 0.5000− 0.0000i − 0.0000−0.5000i $\Theta_{16}$=0.5000+0.0000i 0.5000+0.0000i 0.5000+0.0000i 0.5000+0.0000i 0.5000−0.0000i 0.0000+ 0.5000i − 0.5000+0.0000i −0.0000−0.5000i 0.5000−0.0000i −0.5000+0.0000i 0.5000−0.0000i −0.5000+0.0000i 0.5000−0.0000i −0.0000−0.5000i − 0.5000+0.0000i 0.0000+0.5000i (7) First Codebook in Which the Number of Transmission Antennas of the Base Station is 4, and the Unitary DFT Codebook Having the Identity Datrix is 4 Bits $\Theta_1$=1.0000+0.0000i −0.0000+0.0000i − 0.0000+0.0000i 0.0000+0.0000i − 0.0000−0.0000i 1.0000+0.0000i − 0.0000+0.0000i 0+0.0000i −0.0000−0.0000i − 0.0000−0.0000i 1.0000+0.0000i − 0.0000+0.0000i 0.0000−0.0000i 0−0.0000i − 0.0000−0.0000i 1.0000+0.0000i $\Theta_2$=0.0766+0.5766i −0.0000+0.1913i 0.3853+0.1147i 0.4619−0.5000i 0.4619−0.5000i 0.0766+0.5766i 0.0000+0.1913i 0.3853+0.1147i 0.3853+0.1147i 0.4619−0.5000i 0.0766+0.5766i 0.0000+ 0.1913i − 0.0000+0.1913i 0.3853+0.1147i 0.4619−0.5000i 0.0766+0.5766i $\Theta_3$=0.0000+0.3536i 0.2500−0.2500i −0.1464+0.0000i 0.6036+0.6036i 0.6036+0.6036i 0+0.3536i 0.2500−0.2500i −0.1464+0.0000i − 0.1464−0.0000i 0.6036+0.6036i 0.0000+0.3536i 0.2500−0.2500i 0.2500−0.2500i − 0.1464−0.0000i 0.6036+0.6036i 0+0.3536i $\Theta_4$=−0.3853−0.1147i 0.1913+0.5000i 0.5766+ 0.0766i − 0.0000+0.4619i −0.0000+0.4619i − 0.3853−0.1147i 0.1913+0.5000i 0.5766+0.0766i 0.5766+

0.0766i −0.0000+0.4619i −0.3853−0.1147i
0.1913+0.5000i 0.1913+0.5000i 0.5766+
0.0766i − 0.0000+0.4619i −0.3853−0.1147i $\Theta_5$=0.5000−0.0000i −0.0000−0.0000i 0.0000+
0.5000i − 0.5000+0.5000i −0.5000+0.5000i
0.5000−0.0000i −0.0000−0.0000i
0.0000+0.5000i −0.0000+0.5000i −
0.5000+0.5000i 0.5000−0.0000i −
0.0000−0.0000i 0.0000−0.0000i 0+0.5000i −
0.5000+0.5000i 0.5000−0.0000i $\Theta_6$=−0.1147+0.3853i 0.0000+0.4619i −
0.0766+0.5766i −0.1913−0.5000i −
0.1913−0.5000i −0.1147+0.3853i
0.0000+0.4619i − 0.0766+0.5766i − 0.0766+
0.5766i −0.1913−0.5000i −0.1147+0.3853i
0.0000+0.4619i 0.0000+0.4619i −
0.0766+0.5766i − 0.1913−0.5000i − 0.1147+
0.3853i $\Theta_7$=0.0000+0.3536i −0.1036+0.1036i −
0.8536+0.0000i 0.2500+0.2500i 0.2500+0.2500i
0.0000+0.3536i − 0.1036+0.1036i − 0.8536+
0.0000i −0.8536+0.0000i 0.2500+0.2500i
0.0000+0.3536i − 0.1036+0.1036i − 0.1036+
0.1036i − 0.8536+0.0000i 0.2500+0.2500i
0.0000+0.3536i $\Theta_8$=−0.5766+0.0766i −0.4619+0.5000i
0.1147−0.3853i −0.0000+0.1913i
0.0000+0.1913i −0.5766+0.0766i −
0.4619+0.5000i 0.1147−0.3853i 0.1147−0.3853i
0.0000+0.1913i − 0.5766+0.0766i − 0.4619+
0.5000i −0.4619+0.5000i 0.1147−0.3853i
0.0000+0.1913i − 0.5766+0.0766i $\Theta_9$=−0.0000−0.0000i −0.5000−0.5000i
0.0000−0.0000i −0.5000+0.5000i −
0.5000+0.5000i −0.0000−0.0000i −
0.5000−0.5000i 0.0000−0.0000i 0.0000−
0.0000i − 0.5000+0.5000i − 0.0000−0.0000i −
0.5000−0.5000i −0.5000−0.5000i
0.0000−0.0000i − 0.5000+0.5000i − 0.0000−
0.0000i $\Theta_{10}$=−0.5766−0.0766i 0.0000−0.1913i
0.1147+0.3853i −0.4619−0.5000i −
0.4619−0.5000i −0.5766−0.0766i
0.0000−0.1913i 0.1147+0.3853i 0.1147+
0.3853i − 0.4619−0.5000i −0.5766−0.0766i
0.0000−0.1913i 0.0000−0.1913i 0.1147+
0.3853i − 0.4619−0.5000i −0.5766−0.0766i $\Theta_{11}$=0.0000−0.3536i 0.2500−0.2500i −
0.8536+0.0000i −0.1036−0.1036i −
0.1036−0.1036i 0.0000−0.3536i 0.2500−
0.2500i − 0.8536+0.0000i − 0.8536+0.0000i −
0.1036−0.1036i 0.0000−0.3536i 0.2500−0.2500i
0.2500−0.2500i − 0.8536+0.0000i − 0.1036−
0.1036i 0.0000−0.3536i $\Theta_{12}$=−0.1147−0.3853i −0.1913+0.5000i −0.0766−
0.5766i −0.0000−0.4619i −0.0000−0.4619i −
0.1147−0.3853i −0.1913+0.5000i −
0.0766−0.5766i −0.0766−0.5766i −
0.0000−0.4619i − 0.1147−0.3853i − 0.1913+
0.5000i − 0.1913+0.5000i −0.0766−0.5766i −
0.0000−0.4619i − 0.1147−0.3853i $\Theta_{13}$=0.5000−0.0000i −0.5000−0.5000i − 0.0000−
0.5000i 0.0000−0.0000i 0.0000−0.0000i 0.5000−
0.0000i − 0.5000−0.5000i −0.0000−0.5000i −
0.0000−0.5000i 0.0000−0.0000i 0.5000−
0.0000i − 0.5000−0.5000i − 0.5000−0.5000i −
0.0000−0.5000i 0.0000 0.5000−0.0000i $\Theta_{14}$=−0.3853+0.1147i 0.0000−0.4619i
0.5766−0.0766i 0.1913−0.5000i 0.1913−
0.5000i − 0.3853+0.1147i 0.0000−0.4619i
0.5766−0.0766i 0.5766−0.0766i 0.1913−
0.5000i − 0.3853+0.1147i 0.0000−0.4619i
0.0000−0.4619i 0.5766−0.0766i 0.1913−
0.5000i − 0.3853+0.1147i $\Theta_{15}$=−0.0000−0.3536i 0.6036−0.6036i − 0.1464+
0.0000i 0.2500+0.2500i 0.2500+0.2500i −
0.0000−0.3536i 0.6036−0.6036i −
0.1464+0.0000i − 0.1464+0.0000i
0.2500+0.2500i − 0.0000−0.3536i
0.6036−0.6036i 0.6036−0.6036i −
0.1464+0.0000i 0.2500+0.2500i −
0.0000−0.3536i $\Theta_{16}$=0.0766−0.5766i 0.4619+0.5000i 0.3853−
0.1147i − 0.0000−0.1913i −0.0000−0.1913i
0.0766−0.5766i 0.4619+0.5000i 0.3853−0.1147i
0.3853−0.1147i −0.0000−0.1913i
0.0766−0.5766i 0.4619+0.5000i 0.4619+0.5000i
0.3853−0.1147i −0.0000−0.1913i
0.0766−0.5766i 2. Second Codebook (1) Second Codebook in Which a Number of Transmission Antennas of a Base Station is 2, and Which Has a Time Correlation Coefficient of 0.95 and an Identity Matrix.

$\tilde{\Theta}_1$=1.0000−0.0000−0.0000i 0.0000−0.0000i 1.0000

$\tilde{\Theta}_2$=0.9755+0.0380i 0.1647+0.1407i −0.1744+0.1283i 0.9757+0.0328i $\tilde{\Theta}_3$=0.9525+0.1066i 0.0918−0.2701i −0.0866−0.2718i 0.9544−0.0882i $\tilde{\Theta}_5$=0.9524+0.2575i −0.0360−0.1589i 0.0011+0.1630i 0.9855−0.0477i $\tilde{\Theta}_5$=0.9471−0.1233i 0.2410+0.1727i −0.2387+0.1757i 0.9485+0.1113i $\tilde{\Theta}_6$=0.9667−0.1139i 0.1663−0.1576i −0.1941−0.1219i 0.9702−0.0783i $\tilde{\Theta}_7$=0.9899−0.0591i 0.1252−0.0299i −0.1287+0.0032i 0.9720−0.1967i $\tilde{\Theta}_8$=0.9963−0.0376i 0.0762−0.0134i −0.0771+0.0065i 0.9729−0.2177i (2) Second Codebook in Which the Number of Transmission Antennas of the Base Station is 4, the Time Correlation Coefficient is 0.95, and a Size of the Second Codebook is 3 Bits $\tilde{\Theta}_1$=0.9865+0.0191i 0.0723−0.1059i −0.0059−
0.0487i − 0.0204−0.0845i −0.0588−0.1220i
0.9595+0.1759i 0.1370−0.0519i −
0.0448−0.0815i 0.0026−0.0141i −
0.1452−0.0458i 0.9636−0.1309i −
0.1757+0.0110i 0.0268−0.0846i 0.0424−0.0837i
0.1745+0.0068i 0.9578+0.1883i $\tilde{\Theta}_2$=0.9546−0.0412i 0.2516+0.0644i −0.0837+0.0119i
0.0120+0.1113i −0.2548+0.0534i
0.9535+0.0595i −0.1128−0.0523i −
0.0093−0.0629i 0.0845+0.0189i 0.1185−0.0413i
0.9580−0.0589i − 0.0511−0.2299i − 0.0044+
0.1087i 0.0033−0.0638i 0.0477−0.2321i 0.9611+
0.0651i $\tilde{\Theta}_3$=0.9612−0.0715i 0.0934−0.0490i 0.0420+
0.0292i − 0.1620−0.1759i −0.1005−0.0448i
0.9683−0.0633i −0.1229−0.1641i
0.0094−0.0642i −0.0419+0.0248i
0.1263−0.1622i 0.9673+0.0960i 0.0976+0.0301i
0.1590−0.1766i −0.0112−0.0695i −
0.0996+0.0226i 0.9622+0.0480i $\tilde{\Theta}_4 = \begin{matrix} 0.9659+0.0955i & -0.0608-0.0595i & -0.1652-0.0691i & 0.0516+0.1260i \\ 0.0721-0.0399i & 0.9634-0.0532i & -0.1290+0.0564i & -0.0990-0.1804i \\ 0.1660-0.0517i & 0.1436+0.0598i & 0.9608+0.0504i & 0.0339+0.1373i \\ -0.0727+0.1246i & 0.0997-0.1661i & -0.0370+0.1455i & 0.9560+0.0724i \end{matrix}$ $\tilde{\Theta}_5 = \begin{matrix} 0.9555-0.1145i & 0.0389+0.2014i & 0.0505-0.0689i & 0.0633+0.1433i \\ -0.0409+0.1991i & 0.9512-0.0242i & 0.1794-0.1219i & 0.0276+0.0736i \\ -0.0415-0.0769i & -0.1721-0.1285i & 0.9560+0.0495i & 0.1629+0.0571i \\ -0.0734+0.1398i & -0.0342+0.0721i & -0.1637+0.0492i & 0.9544+0.1694i \end{matrix}$ $\tilde{\Theta}_6 = \begin{matrix} 0.9659+0.1574i & 0.1055+0.1383i & 0.0575+0.0209i & 0.0866-0.0266i \\ -0.1013+0.1340i & 0.9741-0.1273i & -0.0535-0.0027i & -0.0505+0.0359i \\ -0.0512+0.0005i & 0.0372-0.0034i & 0.9714+0.1494i & -0.1098+0.1342i \\ -0.1022-0.0303i & 0.0561+0.0112i & 0.1003+0.1320i & 0.9695-0.1340i \end{matrix}$ $\tilde{\Theta}_7 = \begin{matrix} 0.9614-0.1100i & -0.1270+0.0627i & -0.1536-0.1221i & -0.0682-0.0220i \\ 0.1306+0.0567i & 0.9804+0.0748i & -0.0150+0.0250i & 0.0175-0.1081i \\ 0.1496-0.1247i & 0.0038+0.0446i & 0.9757-0.0427i & 0.0488+0.0626i \\ 0.0697-0.0251i & -0.0143-0.1042i & -0.0639+0.0527i & 0.9869+0.0502i \end{matrix}$ $\tilde{\Theta}_8 = \begin{matrix} 0.9722-0.0220i & -0.0100-0.1952i & 0.1217-0.0238i & -0.0197+0.0191i \\ 0.0071-0.1977i & 0.9733-0.0317i & -0.0507+0.0053i & -0.0194-0.0976i \\ -0.1081-0.0472i & 0.0234+0.0287i & 0.9636+0.1467i & 0.0211-0.1850i \\ 0.0003+0.0359i & 0.0050-0.1098i & -0.0230-0.1773i & 0.9610-0.1762i \end{matrix}$ (3) Second Codebook in Which the Number of Transmission Antennas of the Base Station is 4, the Time Correlation Coefficient is 0.9, and a Size of the Second Codebook is 3 Bits $\tilde{\Theta}_1 = \begin{matrix} 0.9731+0.0152i & 0.1079-0.1457i & -0.0146-0.0766i & -0.0263-0.1151i \\ -0.0800-0.1774i & 0.9102+0.2650i & 0.1814-0.0665i & -0.0740-0.1437i \\ 0.0087-0.0098i & -0.2026-0.0532i & 0.9281-0.1823i & -0.2477+0.0092i \\ 0.0368-0.1163i & 0.0894-0.1286i & 0.2491+0.0076i & 0.8991+0.3002i \end{matrix}$ $\tilde{\Theta}_2 = \begin{matrix} 0.8995-0.0688i & 0.3614+0.1038i & -0.1153+0.0345i & 0.0332+0.1710i \\ -0.3636+0.0809i & 0.9022+0.0869i & -0.1490-0.0927i & -0.0106-0.0942i \\ 0.1318+0.0504i & 0.1597-0.0564i & 0.9103-0.0922i & -0.0831-0.3277i \\ 0.0017+0.1660i & -0.0118-0.0911i & 0.0616-0.3374i & 0.9173+0.0697i \end{matrix}$ $\tilde{\Theta}_3 = \begin{matrix} 0.9039-0.1208i & 0.1494-0.0905i & 0.0372+0.0507i & -0.2540-0.2636i \\ -0.1742-0.0862i & 0.9240-0.0683i & -0.1769-0.2526i & 0.0090-0.0930i \\ -0.0545+0.0486i & 0.2009-0.2350i & 0.9267+0.1608i & 0.1141+0.0373i \\ 0.2298-0.2693i & -0.0086-0.1242i & -0.1230+0.0341i & 0.9164+0.0554i \end{matrix}$ $\tilde{\Theta}_4 = \begin{matrix} 0.9208+0.1155i & -0.0991-0.0989i & -0.2497-0.0944i & 0.0660+0.2088i \\ 0.1259-0.0728i & 0.9206-0.0860i & -0.1783+0.0595i & -0.1475-0.2584i \\ 0.2454-0.0683i & 0.2025+0.0635i & 0.9199+0.0595i & 0.0364+0.1976i \\ -0.1144+0.1994i & 0.1631-0.2318i & -0.0475+0.2035i & 0.9003+0.1121i \end{matrix}$ $\tilde{\Theta}_5 = \begin{matrix} 0.8990-0.1745i & 0.0653+0.3109i & 0.0662-0.0793i & 0.0858+0.2061i \\ -0.0493+0.3082i & 0.8862-0.0515i & 0.2688-0.1735i & 0.0399+0.1031i \\ -0.0424-0.1080i & -0.2545-0.1862i & 0.9022+0.0873i & 0.2353+0.1010i \end{matrix}$ $\tilde{\Theta}_6 = \begin{matrix} 0.9250+0.2390i & 0.1585+0.2134i & 0.0497+0.0206i & 0.1114-0.0366i \\ -0.1570+0.2051i & 0.9392-0.1933i & -0.1032-0.0015i & -0.0457+0.0312i \\ -0.0409-0.0017i & 0.0818+0.0021i & 0.9319+0.2298i & -0.1681+0.2054i \\ -0.1314-0.0406i & 0.0554-0.0035i & 0.1520+0.2053i & 0.9334-0.2036i \end{matrix}$ $\tilde{\Theta}_7 = \begin{matrix} 0.9159-0.1266i & -0.1915+0.0871i & -0.2279-0.1929i & -0.1008-0.0396i \\ 0.1920+0.0892i & 0.9565+0.1012i & -0.0554-0.0403i & 0.0133-0.1589i \\ 0.2348-0.1801i & 0.0288+0.091\,1i & 0.9377+0.0758i & 0.0743+0.1129i \\ 0.1068-0.0366i & -0.0182-0.1457i & -0.1096+0.0954i & 0.9706+0.0496i \end{matrix}$ $\tilde{\Theta}_8 = \begin{matrix} 0.9395-0.0136i & -0.0127-0.2932i & 0.1712-0.0234i & -0.0327+0.0072i \\ 0.0121-0.2945i & 0.9377-0.0306i & -0.0772-0.0145i & -0.0454-0.1572i \\ -0.1487-0.0750i & 0.0127+0.0328i & 0.9162+0.2267i & 0.0320-0.2813i \\ -0.0214-0.0451i & 0.0008-0.1801i & -0.0398-0.2675i & 0.9069-0.2637i \end{matrix}$ (4) Second Codebook in Which the Number of Transmission Antennas of the Base Station is 4, the Time Correlation Coefficient is 0.95, and a Size of the Second Codebook is 4 Bits $\tilde{\Theta}_1 = \begin{matrix} 0.9570+0.1426i & -0.1063-0.0662i & 0.0393+0.0471i & -0.1026-0.1839i \\ 0.1170-0.0632i & 0.9542-0.1590i & 0.1611-0.1223i & 0.0685+0.0300i \\ -0.0517+0.0320i & -0.1642-0.1249i & 0.9598+0.1361i & 0.0557+0.1048i \\ 0.1043-0.1776i & -0.0588+0.0497i & -0.0533+0.1133i & 0.9625-0.0978i \end{matrix}$ $\tilde{\Theta}_2 = \begin{matrix} 0.9564+0.1518i & -0.0627-0.0792i & 0.1257-0.0142i & 0.0103+0.1897i \\ 0.0716+0.1033i & 0.9671+0.0162i & -0.1547-0.1435i & -0.0542-0.0358i \\ -0.1100-0.0022i & 0.1726-0.1536i & 0.9574-0.0006i & 0.1291+0.0360i \\ -0.0329+0.1825i & 0.0242-0.0190i & -0.1442+0.0459i & 0.9669+0.0823i \end{matrix}$ $\tilde{\Theta}_3 = \begin{matrix} 0.9698-0.0648i & 0.2017+0.0622i & 0.0071-0.0449i & -0.0632-0.0685i \\ -0.2025+0.0848i & 0.9672-0.0389i & 0.0391+0.0238i & -0.0497+0.1007i \\ -0.0178-0.0521i & -0.0480+0.0103i & 0.9837-0.1084i & -0.1055+0.0641i \\ 0.0431+0.0470i & 0.0387+0.1202i & 0.1067+0.0716i & 0.9712+0.1423i \end{matrix}$ $\tilde{\Theta}_4 = \begin{matrix} 0.9515-0.1856i & -0.1551-0.1389i & 0.0142-0.0929i & 0.0516+0.0727i \\ 0.1515-0.1431i & 0.9497+0.1056i & 0.0107+0.1572i & 0.1354-0.0171i \\ -0.0200-0.0840i & -0.0164+0.1459i & 0.9559+0.0084i & -0.1249+0.2038i \\ -0.0456+0.0848i & -0.1468-0.0202i & 0.1311+0.1879i & 0.9572-0.0032i \end{matrix}$ $\tilde{\Theta}_5 = \begin{matrix} 0.9587+0.1224i & -0.2068+0.0394i & -0.0977+0.0358i & 0.0981-0.0334i \\ 0.2106+0.0537i & 0.9549-0.0461i & 0.0605+0.1036i & -0.0177+0.1556i \\ 0.0737+0.0536i & -0.0618+0.1185i & 0.9772-0.1250i & 0.0564+0.0058i \\ -0.0944-0.0383i & 0.0108+0.1543i & -0.0640+0.0083i & 0.9488+0.2476i \end{matrix}$ $\tilde{\Theta}_6 = \begin{matrix} 0.9680-0.0802i & -0.0413+0.0475i & -0.1864-0.0597i & 0.0603-0.1037i \\ 0.0335+0.0366i & 0.9722+0.0545i & -0.0849-0.1349i & -0.1365+0.0732i \end{matrix}$ $\tilde{\Theta}_7$=0.9696+0.0997i 0.0850−0.0880i 0.0221−0.1423i 0.0802−0.0882i −0.1012−0.0842i 0.9626−0.0683i −0.1429−0.0567i 0.1666−0.0055i −0.0339−0.1454i 0.1210−0.0640i 0.9751−0.0077i 0.0117−0.0896i −0.0595−0.0821i −0.1860−0.0220i 0.0035−0.0693i 0.9703+0.0910i $\tilde{\Theta}_8$=0.9561+0.0074i 0.0069−0.0369i 0.1732+0.1290i 0.0315−0.1917i −0.0181−0.0324i 0.9566−0.1604i −0.0967−0.1152i − 0.1761−0.0647i −0.1675+0.1443i 0.1103+0.1003i 0.9606−0.0512i − 0.0549−0.0209i −0.0339−0.1854i 0.1691−0.0835i 0.0653−0.0322i 0.9602+0.0410i $\tilde{\Theta}_9$=0.9855+0.0263i 0.0481+0.0061i −0.0637−0.0166i 0.0661−0.1304i −0.0429−0.0076i 0.9834−0.0530i −0.0740+0.0477i 0.0903+0.1107i 0.0546−0.0278i 0.0817+0.0386i 0.9872−0.1099i 0.0366−0.0103i − 0.0618−0.1364i −0.0891+0.1078i − 0.0347−0.0091i 0.9781−0.0081i $\tilde{\Theta}_{10}$=0.9660−0.1219i −0.0515+0.1531i 0.0957−0.0574i 0.1156−0.0070i 0.0678+0.1388i 0.9551−0.1427i 0.1858−0.0506i 0.0099−0.0803i − 0.1040−0.0677i −0.1822−0.0359i 0.9704+0.0251i −0.0316−0.0830i − 0.1119−0.0143i −0.0074−0.0827i 0.0322−0.0849i 0.9681+0.1867i $\tilde{\Theta}_{11}$=0.9559−0.1414i 0.0362−0.0574i 0.0833+0.2160i 0.0899+0.0085i −0.0389−0.0518i 0.9642+0.2166i 0.0568−0.0292i 0.0915+0.0815i − 0.0816+0.2203i −0.0320−0.0329i 0.9593+0.1457i −0.0316−0.0136i − 0.0752+0.0359i −0.1070+0.0717i 0.0190−0.0214i 0.9856−0.0654i $\tilde{\Theta}_{12}$=0.9678−0.1744i −0.0825−0.0025i 0.0775+0.0583i −0.1229−0.0400i 0.1001−0.0158i 0.9798−0.0968i − 0.0124−0.0847i 0.0804+0.0813i − 0.0729+0.0587i 0.0190−0.0860i 0.9708−0.1242i − 0.0682−0.1444i 0.1112−0.0390i − 0.0936+0.0856i 0.0678−0.1439i 0.9718−0.0147i $\tilde{\Theta}_{13}$=0.9639−0.1398i −0.0373−0.1043i 0.0593−0.1053i −0.1504−0.0444i 0.0372−0.1080i 0.9634+0.1883i − 0.0564+0.0834i −0.0910−0.0698i − 0.0550−0.1027i 0.0611+0.0783i 0.9551−0.1742i 0.1816−0.0331i 0.1509−0.0451i 0.0920−0.0758i − 0.1796−0.0227i 0.9599+0.0827i $\tilde{\Theta}_{14}$=0.9630+0.1863i −0.0271+0.0189i 0.0874−0.0956i 0.1349−0.0420i 0.0139+0.0237i 0.9537+0.2624i 0.1079−0.0516i − 0.0785+0.0175i −0.0896−0.1041i − 0.0963−0.0595i 0.9691−0.1681i 0.0279+0.0071i − 0.1315−0.0302i 0.0857+0.0165i − 0.0269+0.0265i 0.9550−0.2463i $\tilde{\Theta}_{15}$=0.9815+0.0994i −0.0814+0.0774i − 0.0070+0.0212i −0.1148−0.0207i 0.0811+0.0612i 0.9684+0.0174i − 0.0944−0.0520i 0.0987−0.1740i 0.0128+0.0306i 0.1014−0.0544i 0.9877−0.0783i − 0.0533+0.0333i 0.1162−0.0426i − 0.1156−0.1507i 0.0631+0.0469i 0.9633−0.1206i $\tilde{\Theta}_{16}$=0.9613+0.0863i 0.0790−0.1703i − 0.1275+0.0996i −0.0408+0.0727i − 0.0729−0.1655i 0.9604−0.1078i 0.0310+0.0572i − 0.0177−0.1696i 0.1380+0.0999i − 0.0322+0.0597i 0.9595+0.0249i −

0.1092−0.1822i 0.0428+0.0691i 0.0127−0.1613i 0.0999−0.1959i 0.9567−0.0591i (5) Second Codebook in Which the Number of Transmission Antennas of the Base Station is 4, the Time Correlation Coefficient is 0.9, and a Size of the Second Codebook is 4 Bits $\tilde{\Theta}_1$=0.8988+0.2338i −0.1449−0.0976i 0.0480+0.0647i −0.1439−0.2825i 0.1757−0.0893i 0.9015−0.2139i 0.2418−0.1723i 0.1135+0.0404i −0.0700+0.0312i −0.2433−0.1927i 0.9010+0.2320i 0.0774+0.1615i 0.1638−0.2569i −0.0906+0.0802i −0.0897+0.1777i 0.9164−0.1143i $\tilde{\Theta}_2$=0.9008+0.2168i −0.0961+0.1116i 0.1928−0.0355i 0.0055+0.2852i 0.1135+0.1669i 0.9261+0.0077i − 0.2227−0.2036i −0.0904−0.0494i − 0.1514−0.0032i 0.2549−0.2345i 0.9060−0.0190i 0.1850+0.0401i − 0.0522+0.2740i 0.0183−0.0189i − 0.2104+0.0709i 0.9282+0.1032i $\tilde{\Theta}_3$=0.9341−0.0629i 0.2972+0.0938i 0.0070−0.0637i −0.1059+0.1050i −0.3063+0.1244i 0.9271−0.0265i 0.0560+0.0412i − 0.0821+0.1376i −0.0261−0.0811i − 0.0775+0.0070i 0.9670−0.1340i − 0.1604+0.0895i 0.0553+0.0621i 0.0466+0.1856i 0.1565+0.1167i 0.9270+0.2431i $\tilde{\Theta}_4$=0.8920−0.2790i −0.2255−0.2057i 0.0051−0.1308i 0.0840+0.0951i 0.2111−0.2132i 0.8896+0.1547i 0.0122+0.2361i 0.1965−0.0113i − 0.0175−0.1153i −0.0329+0.2026i 0.9085+0.0105i −0.1684+0.3006i − 0.0645+0.1365i −0.2215−0.0188i 0.1826+0.2609i 0.9090−0.0146i $\tilde{\Theta}_5$=0.9111+0.1710i −0.3029+0.0595i − 0.1481+0.0294i 0.1386−0.0577i 0.3186+0.0831i 0.8903−0.0829i 0.1057+0.1471i − 0.0336+0.2411i 0.0888+0.0703i − 0.1012+0.1920i 0.9497−0.1784i 0.0788+0.0017i − 0.1283−0.0540i 0.0195+0.2402i − 0.1016+0.0162i 0.8858+0.3569i $\tilde{\Theta}_6$=0.9363−0.1032i −0.0665+0.0641i − 0.2553−0.0805i 0.1013−0.1491i 0.0572+0.0408i 0.9295+0.1127i − 0.1177−0.2029i −0.2168+0.1283i 0.2903−0.0545i 0.0946−0.1872i 0.9019+0.1007i − 0.2126−0.0053i −0.0642−0.1281i 0.2543+0.0791i 0.2212−0.0285i 0.9168−0.1350i $\tilde{\Theta}_7$=0.9413+0.1281i 0.1106−0.1179i 0.0280−0.1992i 0.1151−0.1328i −0.1430−0.1113i 0.9246−0.1064i −0.2033−0.0661i 0.2349+0.0031i −0.0564−0.2031i 0.1622−0.0826i 0.9502−0.0282i 0.0096−0.1368i −0.0761−0.1199i −0.2717−0.0259i 0.0172−0.0997i 0.9398+0.1092i $\tilde{\Theta}_8$=0.9068−0.0087i 0.0079−0.0501i 0.2562+0.1719i 0.0409−0.2796i −0.0287−0.0393i 0.9028−0.2492i −0.1358+0.1729i − 0.2572−0.0772i −0.2371+0.2175i 0.1686+0.1307i 0.9138−0.0945i − 0.0796−0.0267i −0.0576−0.2615i 0.2407−0.1296i 0.0966−0.0566i 0.9162+0.0389i $\tilde{\Theta}_9$=0.9674+0.0228i 0.0509+0.0045i −0.1173−0.0169i 0.0981−0.1933i −0.0482−0.0241i 0.9672−0.0745i −0.1178+0.0634i 0.1336+0.1426i 0.1004−0.0523i 0.1253+0.0392i 0.9665−0.1728i 0.0774−0.0019i − 0.0997−0.1948i −0.1337+0.1458i − 0.0627+0.0133i 0.9527−0.0337i $\tilde{\Theta}_{10}$=0.9295−0.1627i −0.0701+0.2370i
0.1414−0.0808i 0.1482+0.0010i 0.1028+0.1993i
0.9008−0.1968i 0.2889−0.0737i 0.0002−0.1028i − 0.1538−0.1177i −0.2748−0.0555i
0.9259+0.0764i −0.0465−0.1365i − 0.1471−0.0099i −0.0042−0.1004i
0.0642−0.1318i 0.9358+0.2663i $\tilde{\Theta}_{11}$=0.9077−0.2013i 0.0503−0.0923i 0.1151+0.3114i
0.1192−0.0037i −0.0452−0.0746i
0.9205+0.3110i 0.1044−0.0606i 0.1321+0.1275i − 0.1171+0.3211i −0.0343−0.0746i
0.9099+0.2142i −0.0478−0.0176i − 0.0899+0.0546i −0.1633+0.1070i
0.0264−0.0259i 0.9672−0.1184i $\tilde{\Theta}_{12}$=0.9358−0.2532i −0.1014−0.0219i
0.1076+0.0733i −0.1748−0.0430i
0.1256−0.0429i 0.9536−0.1706i − 0.0178−0.1226i 0.1088+0.1292i − 0.1010+0.0754i 0.0263−0.1256i 0.9458−0.1694i − 0.0916−0.1898i 0.1568−0.0449i − 0.1244−0.1372i 0.0934−0.1890i 0.9453−0.0312i $\tilde{\Theta}_{13}$=0.9277−0.1834i −0.0692−0.1545i
0.0968−0.1443i −0.2054−0.0680i
0.0733−0.1497i 0.9096+0.2966i − 0.0912+0.1197i −0.1626−0.0880i − 0.0764−0.1374i 0.1144+0.1171i 0.8948−0.2648i
0.2745−0.0474i 0.2194−0.0708i 0.1470−0.0870i − 0.2759−0.0120i 0.9097+0.1177i $\tilde{\Theta}_{14}$=0.9253+0.2602i −0.0574+0.0386i
0.1237−0.1280i 0.1886−0.0637i 0.0149+0.0552i
0.8952+0.3898i 0.1637−0.0714i − 0.1049+0.0230i −0.1275−0.1510i − 0.1314−0.0951i 0.9394−0.2237i 0.0461+0.0024i − 0.1802−0.0363i 0.1230+0.0214i − 0.0442+0.0444i 0.9097−0.3451i $\tilde{\Theta}_{15}$=0.9521+0.1766i −0.1279+0.0989i
0.0017+0.0373i −0.1862−0.0105i
0.1385+0.0688i 0.9324+0.0192i − 0.1272−0.0699i 0.1422−0.2550i 0.0075+0.0532i
0.1441−0.0799i 0.9763−0.1024i − 0.0666+0.0431i 0.1804−0.0545i − 0.1887−0.2033i 0.0911+0.0747i 0.9180−0.1760i $\tilde{\Theta}_{16}$=0.9092+0.1200i 0.1142−0.2590i − 0.1887+0.1724i −0.0803+0.0835i − 0.1246−0.2538i 0.9032−0.1846i 0.0217+0.0853i − 0.0352−0.2474i 0.1948+0.1622i − 0.0179+0.0913i 0.9052+0.0541i − 0.1697−0.2755i 0.0884+0.0829i 0.0230−0.2467i
0.1549−0.2838i 0.9021−0.0744i (6) Second Codebook in Which the Number of Transmission Antennas of the Base Station is 4, the Time Correlation Coefficient is 0.95, a Size of the Second Codebook Having the Identity Matrix is 3 Bits $\tilde{\Theta}_{1}$=1.0000−0.0000i 0.0000+0.0000i −0.0000−0.0000i
0.0000+0.0000i 0.0000−0.0000i 1.0000−0.0000i − 0.0000−0.0000i 0+0.0000i −0.0000
0.0000+0.0000i 1.0000−0.0000i −0.0000 − 0.0000−0.0000i 0.0000−0.0000i − 0.0000−0.0000i 1.0000+0.0000i $\tilde{\Theta}_{2}$=0.9656+0.0846i −0.1289+0.0589i 0.1202+0.0738i
0.0639−0.1280i 0.1203+0.0711i 0.9534+0.1880i
0.0198−0.0052i 0.1114+0.1526i − 0.1121+0.0781i −0.0259−0.0087i 0.9487−0.2640i
0.1022+0.0178i − 0.0670−0.1332i − 0.1208+0.1422i −0.0952+0.0281i 0.9660−0.0025i $\tilde{\Theta}_{3}$=0.9937−0.0179i 0.0361+0.0005i 0.0410−0.0759i
0.0436+0.0387i −0.0346−0.0064i
0.9864+0.0894i −0.0698−0.0341i
0.1082−0.0106i −0.0493−0.0806i
0.0848+0.0221i 0.9727−0.0851i − 0.1373+0.1053i −0.0372+0.0245i − 0.1005−0.0035i 0.1583+0.0895i 0.9766−0.0337i $\tilde{\Theta}_{4}$=0.9844+0.0408i 0.1420+0.0546i 0.0131−0.0192i − 0.0718−0.0189i −0.1452+0.0549i
0.9730−0.0673i 0.0432−0.1364i − 0.0269−0.0589i −0.0025−0.0104i − 0.0401−0.1411i 0.9683+0.1521i − 0.0593−0.1190i 0.0690−0.0149i 0.0064−0.0636i
0.0549−0.1236i 0.9782−0.1258i $\tilde{\Theta}_{5}$=0.9766+0.0185i −0.0603−0.1161i − 0.0544+0.0931i −0.1311−0.0045i
0.0741−0.1088i 0.9653+0.1954i − 0.0724−0.0373i −0.0768+0.0087i
0.0478+0.1056i 0.0713−0.0273i 0.9565−0.0952i − 0.1089+0.2121i 0.1231+0.0049i
0.0821+0.0164i 0.1300+0.2023i 0.9573−0.0596i $\tilde{\Theta}_{6}$=0.9632−0.2317i −0.0157−0.0535i − 0.0586+0.0059i −0.0494−0.0974i
0.0147−0.0602i 0.9621+0.2553i 0.0339−0.0351i
0.0313−0.0454i 0.0312+0.0025i − 0.0316−0.0315i 0.9694−0.0383i − 0.1453−0.1865i 0.0323−0.1125i − 0.0341−0.0547i 0.1408−0.1822i 0.9632+0.0378i $\tilde{\Theta}_{7}$=0.9519+0.2216i 0.0232−0.0572i −0.0560+0.1191i
0.1322+0.0791i −0.0095−0.0540i
0.9523−0.1644i 0.2039−0.0098i − 0.0629+0.1319i 0.0510+0.1329i − 0.2051+0.0023i 0.9571+0.0042i − 0.1469−0.0075i −0.1268+0.0741i
0.0661+0.1257i 0.1574−0.0143i 0.9623−0.0850i $\tilde{\Theta}_{8}$=0.9911−0.0395i −0.0262+0.0362i − 0.0648−0.0945i −0.0078+0.0317i
0.0166+0.0154i 0.9698+0.1326i 0.1302−0.1189i − 0.0938+0.0375i 0.0392−0.1138i − 0.1361−0.1070i 0.9549−0.2078i 0.0097−0.0220i
0.0055+0.0339i 0.0816+0.0564i 0.0067−0.0279i
0.9930+0.0464i (7) Second Codebook in Which the Number of Transmission Antennas of the Base Station is 4, the Time Correlation Coefficient is 0.9, and a Size of the Second Codebook Having the Identity Matrix is 3 Bits $\tilde{\Theta}_{1}$=1.0000−0.0000i 0.0000+0.0000i 0.0000+0.0000i − 0.0000−0.0000i 0.0000−0.0000i
1.0000+0.0000i −0.0000−0.0000i − 0.0000+0.0000i −0.0000+0.0000i
0.0000+0.0000i 1.0000+0.0000i 0.0000−0.0000i − 0.0000+0.0000i −0.0000−0.0000i
0.0000−0.0000i 1.0000+0.0000i $\tilde{\Theta}_{2}$=0.9316+0.1186i −0.1920+0.0814i 0.1742+0.1059i
0.0795−0.1631i 0.1657+0.1171i 0.8934+0.2916i
0.0262−0.0072i 0.1559+0.2247i − 0.1518+0.1188i −0.0432−0.0180i
0.8847−0.3931i 0.1509+0.0246i − 0.0919−0.1767i −0.1831+0.1937i − 0.1323+0.0540i 0.9321+0.0069i $\tilde{\Theta}_{3}$=0.9849−0.0156i 0.0738−0.0072i 0.0577−0.1130i
0.0620+0.0650i −0.0645+0.0012i
0.9648+0.1484i −0.1067+0.0836i
0.1565−0.0102i −0.0821−0.1263i
0.1351+0.0501i 0.9312−0.1389i − 0.1925+0.1819i −0.0430+0.0309i − 0.1435+0.0171i 0.2485+0.1318i 0.9448−0.0681i $\tilde{\Theta}_{4}$=0.9678+0.0591i 0.2051+0.0802i 0.0246−0.0509i − 0.0864−0.0278i −0.2160+0.0811i
0.9290−0.1061i 0.0789−0.2276i − 0.0684−0.0988i 0.0116−0.0210i −

0.0677−0.2438i 0.9129+0.2436i −
0.0959−0.1832i 0.0769−0.0149i −
0.0007−0.1147i 0.0811−0.1989i 0.9466−0.1963i $\tilde{\Theta}_5$=0.9443+0.0557i −0.0926−0.1753i −
0.0920+0.1254i −0.2025−0.0251i
0.1266−0.1441i 0.9275+0.2835i −
0.0919−0.0427i −0.1068+0.0296i
0.0721+0.1650i 0.0813−0.0324i 0.9057−
0.1296i − 0.1579+0.3129i 0.1891+0.0121i
0.1034+0.0413i 0.2000+0.2974i 0.9045−0.0719i $\tilde{\Theta}_6$=0.9187−0.3339i −0.0181−0.0758i −
0.1002−0.0018i −0.0919−0.1411i
0.0183−0.0974i 0.9076+0.3899i 0.0439−0.0737i
0.0674−0.0507i 0.0297−0.0114i −
0.0265−0.0558i 0.9348−0.0513i −
0.2135−0.2705i 0.0480−0.1770i −
0.0756−0.0932i 0.2000−0.2572i 0.9180+0.0547i $\tilde{\Theta}_7$=0.8981+0.3207i 0.0426−0.0853i −0.0907+0.1616i
0.1886+0.1073i −0.0052−0.0761i
0.8948−0.2475i 0.2947−0.0320i −
0.0973−0.1868i 0.0773+0.1971i −
0.3012−0.0055i 0.9097−0.0016i −
0.1919−0.0027i −0.1766+0.0932i
0.1040+0.1654i 0.2232−0.0191i 0.9260−0.1195i $\tilde{\Theta}_8$=0.9807−0.0605i −0.0428+0.0566i −
0.1048−0.1283i −0.0103+0.0453i
0.0245+0.0127i 0.9412+0.1759i 0.1798−
0.1752i − 0.1316+0.0466i 0.0466−0.1709i −
0.1978−0.1439i 0.9018−0.3075i 0.0178−0.0271i
0.0072+0.0495i 0.1088+0.0812i 0.0147−0.0393i
0.9867+0.0607i (8) Second Codebook in Which the Number of Transmission Antennas of the Base Station is 4, the Time Correlation Coefficient is 0.95, and a Size of the Second Codebook Having the Identity Matrix is 4 Bits $\tilde{\Theta}_1$=1.0000−0.0000i −0.0000−0.0000i −
0.0000−0.0000i −0.0000+0.0000i
0.0000−0.0000i 1.0000−0.0000i 0.0000+
0.0000i − 0.0000+0.0000i 0.0000−0.0000i −
0.0000−0.0000i 1.0000+0.0000i 0.0000+
0.0000i − 0.0000−0.0000i 0.0000−0.0000i −
0.0000+0.0000i 1.0000−0.0000

$\tilde{\Theta}_2$=0.9723+0.1460i 0.0077−0.0690i −0.1430−0.0594i
0.0133−0.0660i 0.0306−0.0804i 0.9763−0.0431i
0.1815−0.0255i 0.0052+0.0631i 0.1406−
0.0472i − 0.1900+0.0014i 0.9599−0.1313i
0.0567−0.0061i −0.0104−0.0618i
0.0075+0.0634i −0.0554+0.0269i
0.9923−0.0592i $\tilde{\Theta}_3$=0.9829+0.0891i −0.0680−0.0983i 0.0488+
0.0791i − 0.0406−0.0364i 0.0769−0.1066i
0.9722−0.0273i −0.0460+0.0726i
0.1701−0.0213i −0.0391+0.0746i
0.0396+0.0483i 0.9804+0.0057i 0.1228+0.1129i
0.0232−0.0315i −0.1891−0.0090i −
0.1042+0.1092i 0.9679−0.0547i $\tilde{\Theta}_4$=0.9704+0.1232i −0.1665+0.0631i −
0.0623+0.0680i −0.0024−0.0546i
0.1508+0.0697i 0.9598−0.1159i −
0.0208+0.0427i −0.1258−0.1399i
0.0614+0.0721i 0.0221+0.0184i 0.9885−0.0695i
0.0900−0.0107i 0.0362−0.0728i 0.1130−
0.1413i − 0.0850+0.0049i 0.9759+0.0316i $\tilde{\Theta}_5$=0.9804−0.0063i 0.0476+0.0066i −0.1150+
0.0432i − 0.1189+0.0845i −0.0389+0.0122i
0.9730−0.2147i 0.0091+0.0219i 0.0058−0.0699i
0.1363+0.0451i −0.0125+0.0196i
0.9683+0.0931i 0.1171−0.1375i 0.1051+
0.0731i − 0.0055−0.0653i −0.1045−0.1649i
0.9656+0.0938i $\tilde{\Theta}_6$=0.9649+0.0375i −0.0135+0.1191i 0.1737−
0.0177i − 0.1462−0.0374i −0.0021+0.1315i
0.9722−0.0272i 0.1317−0.1114i 0.0821−
0.0163i − 0.1754−0.0267i −0.1384−0.1063i
0.9559−0.1247i −0.0723−0.0594i
0.1355−0.0222i −0.0960−0.0032i
0.0808−0.0626i 0.9771+0.0823i $\tilde{\Theta}_7$=0.9507−0.2185i −0.1763−0.0433i −
0.0950+0.0157i 0.0690+0.0381i 0.1740−0.0469i
0.9533+0.2164i 0.0493−0.0365i 0.0743+0.0506i
0.0909+0.0071i − 0.0453−0.0518i
0.9810+0.1197i 0.0011−0.1015i −
0.0679+0.0551i − 0.0740+0.0337i
0.0153−0.1005i 0.9876−0.0017i $\tilde{\Theta}_8$=0.9536−0.1681i 0.0987−0.1596i −0.0774−
0.0030i − 0.1409+0.0358i −0.1139−0.1606i
0.9752+0.0624i 0.0475−0.0267i −
0.0067−0.0570i 0.0670+0.0104i −
0.0296−0.0389i 0.9878+0.0865i −
0.0601+0.0787i 0.1359+0.0230i 0.0321−0.0800i
0.0407+0.0785i 0.9827+0.0067i $\tilde{\Theta}_9$=0.9969+0.0133i −0.0077+0.0297i 0.0013+0.0688i
0.0180+0.0106i 0.0180+0.0299i 0.9866−
0.0115i − 0.0043−0.1564i 0.0268−0.0134i −
0.0017+0.0648i 0.0139−0.1573i 0.9786+
0.0684i − 0.0600+0.0698i − 0.0232+0.0125i −
0.0145−0.0225i 0.0497+0.0770i 0.9948+0.0231i $\tilde{\Theta}_{10}$=0.9789+0.0335i −0.0436−0.0524i
0.0701+0.1015i −0.1292+0.0634i
0.0571−0.0387i 0.9804−0.0276i −
0.0119+0.0527i 0.1652+0.0558i −
0.0701+0.1010i 0.0237+0.0497i 0.9908−
0.0124i − 0.0076−0.0046i 0.1140+0.0878i −
0.1700+0.0389i 0.0091+0.0043i 0.9714+0.0722i $\tilde{\Theta}_{11}$=0.9863+0.0246i −0.0364+0.0321i
0.0164−0.0194i −0.1228−0.0926i
0.0487+0.0579i 0.9785+0.0589i −
0.0657−0.0354i −0.0003+0.1668i
0.0127−0.0131i 0.0427−0.0141i 0.9802−0.0649i
0.1274+0.1281i 0.1167−0.0834i −
0.0105+0.1861i −0.1122+0.1272i
0.9567−0.0248i $\tilde{\Theta}_{12}$=0.9789+0.0246i 0.0123−0.0213i 0.0995−
0.1262i − 0.0090+0.1208i −0.0131−0.0350i
0.9880−0.0783i 0.0972+0.0701i 0.0447−
0.0047i − 0.1057−0.1169i −0.1002+0.0690i
0.9653+0.0283i 0.0848+0.1434i 0.0288+
0.1185i − 0.0435−0.0220i −0.0803+0.1441i
0.9770+0.0322i $\tilde{\Theta}_{13}$=0.9746+0.0690i −0.1615+0.0697i − 0.0107+
0.0091i −0.1004+0.0654i 0.1558+0.0797i
0.9677−0.0585i 0.1515+0.0418i 0.0030+
0.0686i − 0.0282−0.0055i − 0.1510+0.0242i
0.9751+0.1134i − 0.1098+0.0032i
0.0983+0.0659i − 0.0251+0.0715i
0.1063+0.0085i 0.9699−0.1677i $\tilde{\Theta}_{14}$=0.9673−0.1361i −0.0663+0.1088i − 0.0214+
0.1448i 0.0737−0.0529i 0.0654+0.1066i 0.9597−
0.0843i 0.0939+0.2068i − 0.0042+0.0686i
0.0197−0.1410i − 0.1023+0.2013i
0.9569+0.0143i − 0.0771+0.0833i − 0.0924−
0.0381i −0.0145+0.0675i 0.0563+0.0890i
0.9761+0.1463i $\tilde{\Theta}_{15}$=0.9777+0.1249i −0.0405−0.0346i − 0.0183+
0.1370i 0.0423−0.0696i 0.0228−0.0204i 0.9549+
0.2259i 0.0293+0.1612i 0.0947−0.0168i 0.0193+
0.1420i − 0.0437+0.1572i 0.9626−0.1493i
0.0393−0.0497i −0.0433−0.0723i −
0.0842−0.0224i −0.0463−0.0553i
0.9730−0.1828i $\tilde{\Theta}_{16}$=0.9632−0.0260$i$ −0.0742−0.1019$i$
0.1738−0.0469$i$ 0.0806−0.1297$i$ 0.0465−0.1094$i$
0.9806−0.1255$i$   0.0652−0.0617$i$   0.0077+
0.0199$i$ − 0.1680−0.0719$i$ −0.0619−0.0410$i$
0.9664+0.1453$i$ 0.0007+0.0779$i$ −
0.0731−0.1369$i$ −0.0096+0.0339$i$ −
0.0325+0.0587$i$ 0.9849+0.0109$i$ (9) Second Codebook in Which the Number of Transmission Antennas of the Base Station is 4, the Time Correlation Coefficient is 0.9, and a Size of the Second Codebook Including the Identity Matrix is 4 Bits $\tilde{\Theta}_1$=1.0000−0.0000$i$ −0.0000−0.0000$i$ −
0.0000−0.0000$i$ −0.0000−0.0000$i$
0.0000−0.0000$i$   1.0000−0.0000$i$   0.0000−
0.0000$i$ − 0.0000+0.0000$i$ 0.0000−0.0000$i$ −
0.0000+0.0000$i$ 1.0000+0.0000$i$ −
0.0000+0.0000$i$ −0.0000−0.0000$i$
0.0000+0.0000$i$ −0.0000+0.0000$i$
1.0000−0.0000$i$ $\tilde{\Theta}_2$=0.9458+0.1964$i$ 0.0206−0.0913$i$ −0.2010−0.0858$i$
0.0168−0.1001$i$ 0.0553−0.1154$i$ 0.9501−0.0706$i$
0.2576−0.0507$i$   0.0096+0.0838$i$   0.1939−
0.0664$i$ − 0.2757+0.0127$i$ 0.9144−0.1960$i$
0.0824−0.0210$i$ −0.0138−0.0911$i$
0.0190+0.0841$i$ −0.0794+0.0494$i$
0.9825−0.1000$i$ $\tilde{\Theta}_3$=0.9548+0.1582$i$    −0.1024−0.1342$i$    0.0840+
0.1483$i$ − 0.0515−0.0566$i$ 0.1186−0.1565$i$
0.9391−0.0538$i$ −0.0762+0.1081$i$
0.2372−0.0540$i$ −0.0736+0.1268$i$
0.0693+0.0481$i$ 0.9503+0.0250$i$ 0.1911+0.1764$i$
0.0085−0.0574$i$ −0.2819−0.0105$i$ −
0.1441+0.1701$i$ 0.9266−0.0934$i$ $\tilde{\Theta}_4$=0.9401+0.1598$i$ −0.2353+0.0952$i$ −
0.1021+0.0985$i$ 0.0101−0.0771$i$ 0.2079+0.1076$i$
0.9192−0.1702$i$ − 0.0131+0.0593$i$ − 0.1800−
0.1878$i$ 0.1013+0.1000$i$ 0.0140+0.0174$i$ 0.9718−
0.1296$i$ 0.1336−0.0147$i$ 0.0553−0.1119$i$ 0.1563−
0.1919$i$ − 0.1208+0.0194$i$ 0.9523+0.0376$i$ $\tilde{\Theta}_5$=0.9566−0.0183$i$    0.0577−0.0173$i$    −0.1634+
0.0562$i$ − 0.1846+0.1308$i$ −0.0559−0.0081$i$
0.9355−0.3304$i$ −0.0042+0.0524$i$ −
0.0149−0.0978$i$ 0.2160+0.0598$i$ 0.0029+0.0295$i$
0.9242+0.1339$i$ 0.1948−0.1972$i$ 0.1449+0.1011$i$
0.0156−0.1048$i$ − 0.1631−0.2622$i$
0.9182+0.1383$i$ $\tilde{\Theta}_6$=0.9201+0.0719$i$    −0.0359+0.1568$i$    0.2672−
0.0209$i$ − 0.2168−0.0599$i$ −0.0134+0.1918$i$
0.9381−0.0418$i$    0.2007−0.1776$i$    0.0929−
0.0270$i$ − 0.2718−0.0429$i$ −0.2227−0.1586$i$
0.8879−0.2018$i$ −0.1050−0.0966$i$
0.1882−0.0138$i$ −0.1323+0.0043$i$
0.1255−0.1068$i$ 0.9518+0.1175$i$ $\tilde{\Theta}_7$=0.8972−0.3030$i$ −0.2504−0.0586$i$ −
0.1497+0.0157$i$ 0.1073+0.0543$i$ 0.2446−0.0662$i$
0.9065+0.3021$i$ 0.0637−0.0438$i$ 0.1061+0.0751$i$
0.1438+0.0089$i$ − 0.0587−0.0720$i$
0.9463+0.2156$i$ 0.0198−0.1678$i$ −
0.1071+0.0827$i$ − 0.1036+0.0391$i$
0.0336−0.1679$i$ 0.9694+0.0202$i$ $\tilde{\Theta}_8$=0.9064−0.2375$i$    0.1330−0.2260$i$    −0.1066−
0.0118$i$ − 0.1965+0.0556$i$ −0.1651−0.2268$i$
0.9496+0.0983$i$ 0.0671−0.0168$i$ −
0.0133−0.0703$i$ 0.0871+0.0132$i$ −
0.0373−0.0406$i$ 0.9738+0.1405$i$ −
0.0995+0.1062$i$ 0.1864+0.0270$i$ 0.0629−0.1134$i$
0.0617+0.1090$i$ 0.9653+0.0166$i$ $\tilde{\Theta}_9$=0.9924+0.0369$i$ −0.0064+0.0377$i$ −
0.0003+0.1063$i$ 0.0255+0.0206$i$ 0.0293+0.0404$i$
0.9674+0.0094$i$    0.0077−0.2405$i$    0.0558−
0.0242$i$ − 0.0084+0.0956$i$ 0.0347−0.2420$i$
0.9431+0.1406$i$ − 0.1041+0.1052$i$ − 0.0394+
0.0241$i$ −0.0234−0.0484$i$ 0.0700+0.1295$i$
0.9855+0.0466$i$ $\tilde{\Theta}_{10}$=0.9434+0.0321$i$ −0.0524−0.0921$i$
0.1122+0.1597$i$ −0.2209+0.1037$i$
0.0891−0.0504$i$ 0.9573−0.0253$i$ −
0.0055+0.0607$i$ 0.2434+0.0978$i$ −
0.1064+0.1614$i$ 0.0295+0.0571$i$ 0.9782−0.0333$i$
0.0012−0.0210$i$ 0.1883+0.1600$i$ −
0.2553+0.0493$i$ 0.0005+0.0120$i$ 0.9271+0.1081$i$ $\tilde{\Theta}_{11}$=0.9724+0.0436$i$ −0.0423+0.0413$i$
0.0326−0.0292$i$ −0.1707−0.1340$i$
0.0661+0.0921$i$ 0.9569+0.0902$i$ −
0.0966−0.0559$i$ −0.0016+0.2257$i$
0.0253−0.0167$i$ 0.0511−0.0135$i$ 0.9611−0.0872$i$
0.1813+0.1793$i$ 0.1596−0.1152$i$ −
0.0208+0.2637$i$ −0.1520+0.1769$i$
0.9143−0.0316$i$ $\tilde{\Theta}_{12}$=0.9492+0.0182$i$    0.0142−0.0212$i$    0.1551−
0.2117$i$ − 0.0001+0.1707$i$ −0.0167−0.0625$i$
0.9719−0.0979$i$    0.1554+0.1151$i$    0.0643+
0.0085$i$ − 0.1702−0.1851$i$ −0.1664+0.1084$i$
0.9035+0.0532$i$    0.1458+0.2386$i$    0.0644+
0.1646$i$ − 0.0614−0.0437$i$ −0.1373+0.2362$i$
0.9416+0.0422$i$ $\tilde{\Theta}_{13}$=0.9447+0.1012$i$ −0.2465+0.0950$i$ − 0.0260+
0.0307$i$ −0.1341+0.0886$i$ 0.2290+0.1183$i$
0.9205−0.1061$i$ 0.2256+0.0693$i$ −
0.0008+0.1390$i$ −0.0620−0.0018$i$ −
0.2253+0.0261$i$ 0.9455+0.1655$i$ −
0.1527−0.0021$i$ 0.1276+0.1033$i$ −
0.0261+0.1397$i$ 0.1445+0.0207$i$ 0.9300−0.2582$i$ $\tilde{\Theta}_{14}$=0.9176−0.2298$i$ −0.1133+0.1737$i$ − 0.0163+
0.2101$i$ 0.0991−0.0894$i$ 0.1187+0.1484$i$ 0.9128−
0.1253$i$ 0.1170+0.2986$i$ − 0.0062+0.1099$i$
0.0191+0.2108$i$ − 0.1391+0.2755$i$
0.9107+0.0247$i$ − 0.1235+0.1210$i$ − 0.1482−
0.0482$i$ −0.0271+0.1098$i$ 0.0762+0.1300$i$
0.9498+0.1949$i$ $\tilde{\Theta}_{15}$=0.9550+0.1665$i$ −0.0740−0.0516$i$ − 0.0201+
0.2007$i$ 0.0651−0.0843$i$ 0.0267−0.0147$i$ 0.8964+
0.3294$i$ 0.0483+0.2503$i$ 0.1476−0.0173$i$ 0.0303+
0.2155$i$ − 0.0753+0.2450$i$ 0.9034−0.2476$i$
0.0399−0.0891$i$ −0.0609−0.0904$i$ −
0.1153−0.0298$i$ −0.0741−0.1067$i$
0.9442−0.2559$i$ $\tilde{\Theta}_{16}$=0.9233−0.0334$i$ −0.1047−0.1296$i$
0.2562−0.0511$i$ 0.1185−0.1905$i$ 0.0550−0.1409$i$
0.9601−0.1892$i$    0.0883−0.1007$i$    0.0028+
0.0403$i$ − 0.2390−0.1106$i$ −0.0831−0.0593$i$
0.9269+0.2085$i$ −0.0092+0.1320$i$ −
0.1024−0.2088$i$ 0.0000+0.0653$i$ −
0.0568+0.0888$i$ 0.9646−0.0047$i$

(10) Second Codebook in Which the Number of Transmission Antennas of the Base Station is 4, the Time Correlation Coefficient is 0.95, and a Size of a Unitary DFT Second Codebook Including the Identity Matrix $\tilde{\Theta}_1$=1.0000+0.0000$i$    0.0000−0.0000$i$    0.0000−
0.0000$i$ − 0.0000−0.0000$i$ −0.0000−0.0000$i$
1.0000−0.0000$i$ −0.0000−0.0000$i$
0.0000−0.0000$i$ −0.0000−0.0000$i$
0.0000−0.0000$i$ 1.0000+0.0000$i$ 0.0000 0.0000−
0.0000$i$ −0.0000−0.0000$i$ −0.0000+0.0000$i$
1.0000+0.0000$i$ $\tilde{\Theta}_2$=0.9777+0.1672$i$ −0.0538−0.0627$i$ −
0.0050+0.0370$i$ 0.0765−0.0454$i$ 0.0765−0.0454$i$ 0.9777+0.1672i −0.0538−0.0627i −
0.0050+0.0370i −0.0050+0.0370i
0.0765−0.0454i 0.9777+0.1672i −
0.0538−0.0627i −0.0538−0.0627i −
0.0050+0.0370i 0.0765−0.0454i 0.9777+0.1672i $\tilde{\Theta}_3$=0.9849+0.1188i −0.0768+0.0356i 0.0064−0.0261i
0.0681+0.0571i  0.0681+0.0571i  0.9849+
0.1188i − 0.0768+0.0356i 0.0064−0.0261i
0.0064−0.0261i  0.0681+0.0571i  0.9849+
0.1188i − 0.0768+0.0356i −0.0768+0.0356i
0.0064−0.0261i 0.0681+0.0571i 0.9849+0.1188i $\tilde{\Theta}_4$=0.9749−0.0574i  0.0483+0.1392i  −0.0171+
0.0315i − 0.0406+0.1472i −0.0406+0.1472i
0.9749−0.0574i 0.0483+0.1392i −
0.0171+0.0315i − 0.0171+0.0315i −
0.0406+0.1472i 0.9749−0.0574i 0.0483+0.1392i
0.0483+0.1392i − 0.0171+0.0315i − 0.0406+
0.1472i 0.9749−0.0574i $\tilde{\Theta}_5$=0.9750−0.0000i  0.0656+0.0656i  0.0000+
0.1561i − 0.0906+0.0906i −0.0906+0.0906i
0.9750−0.0000i 0.0656+0.0656i −
0.0000+0.1561i − 0.0000+0.1561i −
0.0906+0.0906i 0.9750−0.0000i 0.0656+0.0656i
0.0656+0.0656i − 0.0000+0.1561i − 0.0906+
0.0906i 0.9750+0.0000i $\tilde{\Theta}_6$=0.9725+0.1361i  0.0227+0.0028i  −0.0252+
0.1841i − 0.0254+0.0051i −0.0254+0.0051i
0.9725+0.1361i 0.0227+0.0028i −
0.0252+0.1841i −0.0252+0.1841i −
0.0254+0.0051i 0.9725+0.1361i 0.0227+0.0028i
0.0227+0.0028i − 0.0252+0.1841i − 0.0254+
0.0051i 0.9725+0.1361i $\tilde{\Theta}_7$=0.9849+0.1188i −0.0571+0.0681i −
0.0064+0.0261i 0.0356+0.0768i 0.0356+0.0768i
0.9849+0.1188i − 0.0571+0.0681i − 0.0064+
0.0261i −0.0064+0.0261i 0.0356+0.0768i
0.9849+0.1188i − 0.0571+0.0681i − 0.0571+
0.0681i − 0.0064+0.0261i 0.0356+0.0768i
0.9849+0.1188i $\tilde{\Theta}_8$=0.9697+0.0484i −0.0735+0.1087i −
0.0026−0.1157i 0.0905+0.1363i 0.0905+0.1363i
0.9697+0.0484i − 0.0735+0.1087i − 0.0026−
0.1157i −0.0026−0.1157i 0.0905+0.1363i
0.9697+0.0484i − 0.0735+0.1087i − 0.0735+
0.1087i − 0.0026−0.1157i 0.0905+0.1363i
0.9697+0.0484i $\tilde{\Theta}_9$=1.0000−0.0000i −0.0000+0.0000i −
0.0000−0.0000i 0.0000−0.0000i 0.0000 1.0000+
0.0000i −0.0000−0.0000i 0.0000−0.0000i
0.0000−0.0000i  0.0000−0.0000i  1.0000+
0.0000i − 0.0000+0.0000i − 0.0000−0.0000i −
0.0000+0.0000i 0.0000−0.0000i 1.0000−0.0000i $\tilde{\Theta}_{10}$=0.9697−0.0484i 0.0905−0.1363i −
0.0026+0.1157i −0.0735−0.1087i −
0.0735−0.1087i 0.9697−0.0484i 0.0905−
0.1363i − 0.0026+0.1157i − 0.0026+0.1157i −
0.0735−0.1087i 0.9697−0.0484i 0.0905−0.1363i
0.0905−0.1363i − 0.0026+0.1157i − 0.0735−
0.1087i 0.9697−0.0484i $\tilde{\Theta}_{11}$=0.9849−0.1188i 0.0356−0.0768i −
0.0064−0.0261i −0.0571−0.0681i −
0.0571−0.0681i  0.9849−0.1188i  0.0356−
0.0768i − 0.0064−0.0261i − 0.0064−0.0261i −
0.0571−0.0681i 0.9849−0.1188i 0.0356−0.0768i
0.0356−0.0768i − 0.0064−0.0261i − 0.0571−
0.0681i 0.9849−0.1188i $\tilde{\Theta}_{12}$=0.9725−0.1361i −0.0254−0.0051i − 0.0252−
0.1841i 0.0227−0.0028i 0.0227−0.0028i 0.9725−
0.1361i − 0.0254−0.0051i − 0.0252−0.1841i −

0.0252−0.1841i  0.0227−0.0028i  0.9725−
0.1361i − 0.0254−0.0051i − 0.0254−0.0051i −
0.0252−0.1841i 0.0227−0.0028i 0.9725−0.1361i $\tilde{\Theta}_{13}$=0.9750−0.0000i −0.0906−0.0906i
0.0000−0.1561i 0.0656−0.0656i 0.0656−0.0656i
0.9750−0.0000i − 0.0906−0.0906i −
0.0000−0.1561i 0.0000−0.1561i 0.0656−0.0656i
0.9750−0.0000i − 0.0906−0.0906i − 0.0906−
0.0906i 0−0.1561i 0.0656−0.0656i
0.9750−0.0000i $\tilde{\Theta}_{14}$=0.9749+0.0574i −0.0406−0.1472i − 0.0171−
0.0315i 0.0483−0.1392i 0.0483−0.1392i 0.9749+
0.0574i − 0.0406−0.1472i − 0.0171−0.0315i −
0.0171−0.0315i  0.0483−0.1392i  0.9749+
0.0574i − 0.0406−0.1472i − 0.0406−0.1472i −
0.0171−0.0315i 0.0483−0.1392i 0.9749+0.0574i $\tilde{\Theta}_{15}$=0.9849−0.1188i  0.0681−0.0571i  0.0064+
0.0261i − 0.0768−0.0356i −0.0768−0.0356i
0.9849−0.1188i 0.0681−0.0571i 0.0064+0.0261i
0.0064+0.0261i − 0.0768−0.0356i
0.9849−0.1188i 0.0681−0.0571i 0.0681−0.0571i
0.0064+0.0261i − 0.0768−0.0356i
0.9849−0.1188i $\tilde{\Theta}_{16}$=0.9777−0.1672i 0.0765+0.0454i −
0.0050−0.0370i −0.0538+0.0627i −
0.0538+0.0627i  0.9777−0.1672i  0.0765+
0.0454i − 0.0050−0.0370i − 0.0050−0.0370i −
0.0538+0.0627i 0.9777−0.1672i 0.0765+0.0454i
0.0765+0.0454i − 0.0050−0.0370i − 0.0538+
0.0627i 0.9777−0.1672i

(11) Second Codebook in Which the Number of Transmission Antennas of the Base Station is 4, the Time Correlation Coefficient is 0.9, and a Size of the Unitary DFT Second Codebook Including the Identity Matrix is 4 Bits $\tilde{\Theta}_1$=1.0000+0.0000i  0.0000−0.0000i  0.0000−
0.0000i − 0.0000−0.0000i −0.0000−0.0000i
1.0000+0.0000i −0.0000+0.0000i
0.0000−0.0000i −0.0000−0.0000i
0.0000+0.0000i 1.0000−0.0000i 0.0000+0.0000i
0.0000−0.0000i 0.0000+0.0000i 0.0000−0.0000i
1.0000+0.0000i $\tilde{\Theta}_2$=0.9569+0.2290i −0.0653−0.0933i −
0.0109+0.0524i 0.1113−0.0611i 0.1113−0.0611i
0.9569+0.2290i − 0.0653−0.0933i − 0.0109+
0.0524i −0.0109+0.0524i 0.1113−0.0611i
0.9569+0.2290i − 0.0653−0.0933i − 0.0653−
0.0933i − 0.0109+0.0524i 0.1113−0.0611i
0.9569+0.2290i $\tilde{\Theta}_3$=0.9640+0.1773i −0.1232+0.0335i 0.0205−0.0537i
0.1077+0.0901i  0.1077+0.0901i  0.9640+
0.1773i − 0.1232+0.0335i 0.0205−0.0537i
0.0205−0.0537i  0.1077+0.0901i  0.9640+
0.1773i − 0.1232+0.0335i −0.1232+0.0335i
0.0205−0.0537i 0.1077+0.0901i 0.9640+0.1773i $\tilde{\Theta}_4$=0.9459−0.1002i  0.0884+0.1843i  −0.0281+
0.0588i − 0.0706+0.2102i −0.0706+0.2102i
0.9459−0.1002i 0.0884+0.1843i −
0.0281+0.0588i −0.0281+0.0588i −
0.0706+0.2102i 0.9459−0.1002i 0.0884+0.1843i
0.0884+0.1843i − 0.0281+0.0588i − 0.0706+
0.2102i 0.9459−0.1002i $\tilde{\Theta}_5$=0.9500−0.0000i  0.0840+0.0840i  0.0000+
0.2179i − 0.1340+0.1340i −0.1340+0.1340i
0.9500−0.0000i 0.0840+0.0840i 0.0000+0.2179i
0.0000+0.2179i − 0.1340+0.1340i
0.9500−0.0000i 0.0840+0.0840i 0.0840+0.0840i
0.0000+0.2179i − 0.1340+0.1340i
0.9500−0.0000i $\tilde{\Theta}_6$=0.9421+0.1976i  0.0259+0.0094i  −0.0539+
0.2611i − 0.0376+0.0134i −0.0376+0.0134i 0.9421+0.1976$i$ 0.0259+0.0094$i$ –
0.0539+0.2611$i$ –0.0539+0.2611$i$ –
0.0376+0.0134$i$ 0.9421+0.1976$i$ 0.0259+0.0094$i$
0.0259+0.0094$i$ – 0.0539+0.2611$i$ – 0.0376+
0.0134$i$ 0.9421+0.1976$i$ $\tilde{\Theta}_7$=0.9640+0.1773$i$ –0.0901+0.1077$i$ –
0.0205+0.0537$i$ 0.0335+0.1232$i$ 0.0335+0.1232$i$
0.9640+0.1773$i$ – 0.0901+0.1077$i$ – 0.0205+
0.0537$i$ –0.0205+0.0537$i$ 0.0335+0.1232$i$
0.9640+0.1773$i$ – 0.0901+0.1077$i$ – 0.0901+
0.1077$i$ – 0.0205+0.0537$i$ 0.0335+0.1232$i$
0.9640+0.1773$i$ $\tilde{\Theta}_8$=0.9311+0.0909$i$ –0.1083+0.1576$i$ –
0.0071–0.1498$i$ 0.1324+0.2194$i$ 0.1324+0.2194$i$
0.9311+0.0909$i$ – 0.1083+0.1576$i$ – 0.0071–
0.1498$i$ –0.0071–0.1498$i$ 0.1324+0.2194$i$
0.9311+0.0909$i$ – 0.1083+0.1576$i$ – 0.1083+
0.1576$i$ – 0.0071–0.1498$i$ 0.1324+0.2194$i$
0.9311+0.0909$i$ $\tilde{\Theta}_9$=1.0000–0.0000$i$ –0.0000+0.0000$i$ –
0.0000–0.0000$i$ 0.0000–0.0000$i$ 0.0000 1.0000+
0.0000$i$ –0.0000–0.0000$i$ – 0.0000–0.0000$i$
0.0000–0.0000$i$    0.0000–0.0000$i$    1.0000–
0.0000$i$ – 0.0000–0.0000$i$ –0.0000–0.0000$i$
0.0000–0.0000$i$ 0.0000–0.0000$i$ 1.0000+0.0000$i$ $\tilde{\Theta}_{10}$=0.9311–0.0909$i$ 0.1324–0.2194$i$ –
0.0071+0.1498$i$ –0.1083–0.1576$i$ –
0.1083–0.1576$i$    0.9311–0.0909$i$    0.1324–
0.2194$i$ – 0.0071+0.1498$i$ – 0.0071+0.1498$i$ –
0.1083–0.1576$i$ 0.9311–0.0909$i$ 0.1324–0.2194$i$
0.1324–0.2194$i$ – 0.0071+0.1498$i$ – 0.1083–
0.1576$i$ 0.9311–0.0909$i$ $\tilde{\Theta}_{11}$=0.9640–0.1773$i$ 0.0335–0.1232$i$ –
0.0205–0.0537$i$ –0.0901–0.1077$i$ –
0.0901–0.1077$i$    0.9640–0.1773$i$    0.0335–
0.1232$i$ – 0.0205–0.0537$i$ – 0.0205–0.0537$i$ –
0.0901–0.1077$i$ 0.9640–0.1773$i$ 0.0335–0.1232$i$
0.0335–0.1232$i$ – 0.0205–0.0537$i$ – 0.0901–
0.1077$i$ 0.9640–0.1773$i$ $\tilde{\Theta}_{12}$=0.9421–0.1976$i$ –0.0376–0.0134$i$ – 0.0539–
0.2611$i$ 0.0259–0.0094$i$ 0.0259–0.0094$i$ 0.9421–
0.1976$i$ – 0.0376–0.0134$i$ –0.0539–0.2611$i$ –
0.0539–0.2611$i$    0.0259–0.0094$i$    0.9421–
0.1976$i$ – 0.0376–0.0134$i$ – 0.0376–0.0134$i$ –
0.0539–0.2611$i$ 0.0259–0.0094$i$ 0.9421–0.1976$i$ $\tilde{\Theta}_{13}$=0.9500–0.0000$i$ –0.1340–0.1340$i$
0.0000–0.2179$i$ 0.0840–0.0840$i$ 0.0840–0.0840$i$
0.9500–0.0000$i$ –0.1340–0.1340$i$
0.0000–0.2179$i$ 0.0000–0.2179$i$ 0.0840–0.0840$i$
0.9500–0.0000$i$ –0.1340–0.1340$i$ –
0.1340–0.1340$i$ 0.0000–0.2179$i$ 0.0840–0.0840$i$
0.9500+0.0000$i$ $\tilde{\Theta}_{14}$=0.9459+0.1002$i$ –0.0706–0.2102$i$ – 0.0281–
0.0588$i$ 0.0884–0.1843$i$ 0.0884–0.1843$i$ 0.9459+
0.1002$i$ – 0.0706–0.2102$i$ –0.0281–0.0588$i$ –
0.0281–0.0588$i$    0.0884–0.1843$i$    0.9459+
0.1002$i$ – 0.0706–0.2102$i$ – 0.0706–0.2102$i$ –
0.0281–0.0588$i$ 0.0884–0.1843$i$ 0.9459+0.1002$i$ $\tilde{\Theta}_{15}$=0.9640–0.1773$i$    0.1077–0.0901$i$    0.0205+
0.0537$i$ – 0.1232–0.0335$i$ –0.1232–0.0335$i$
0.9640–0.1773$i$ 0.1077–0.0901$i$ 0.0205+0.0537$i$
0.0205+0.0537$i$ –0.1232–0.0335$i$
0.9640–0.1773$i$ 0.1077–0.0901$i$ 0.1077–0.0901$i$
0.0205+0.0537$i$ –0.1232–0.0335$i$
0.9640–0.1773$i$ $\tilde{\Theta}_{16}$=0.9569–0.2290$i$ 0.1113+0.0611$i$ –
0.0109–0.0524$i$ –0.0653+0.0933$i$ –
0.0653+0.0933$i$    0.9569–0.2290$i$    0.1113+
0.0611$i$ – 0.0109–0.0524$i$ – 0.0109–0.0524$i$ –
0.0653+0.0933$i$ 0.9569–0.2290$i$ 0.1113+0.0611$i$
0.1113+0.0611$i$ – 0.0109–0.0524$i$ – 0.0653+
0.0933$i$ 0.9569–0.2290$i$ As a result, a base station and mobile station are provided that may use a codebook updated based on changed patterns or statistical characteristics of channels between the base station and mobile station to thereby improving a sum data rate of a Multiple Input Multiple Output (MIMO) system.

Although a few examples have been shown and described above, the present description is not limited to the examples described above. Instead, it would be appreciated by those skilled in the art that changes may be made based on these examples s without departing from the principles and spirit of the disclosure. As such, the scope of which is defined by the claims and their equivalents.

What is claimed is:

1. A communication method between a base station, comprising a plurality of transmission antennas, and at least one mobile station, the method comprising:
   recognizing a first channel at a first time and a second channel at a second time, between the base station and the at least one mobile station;
   updating a previous codebook of the base station to a new codebook based on a time correlation, the time correlation being generated based on a comparison of the first channel and the second channel; and
   adaptively generating a precoding matrix of the base station based on the new codebook.

2. The communication method of claim 1, wherein the updating of the previous codebook comprises updating the previous codebook to the new codebook based on information corresponding to the time correlation.

3. The communication method of claim 1, wherein the updating of the previous codebook comprises determining a variation of a channel between the base station and the at least one mobile station based on a state of the channel measured from at least two points in time.

4. The communication method of claim 1, wherein the updating of the previous codebook comprises updating the previous codebook to the new codebook based on statistics for a variation of a channel between the base station and the at least one mobile station.

5. The communication method of claim 4, wherein the statistics for the variation of the channel comprise a variation speed of the channel, or a variation quantity of the channel, or a pattern of the variation of the channel, or any combination thereof.

6. The communication method of claim 4, wherein the statistics for the variation of the channel comprise a variation speed of the channel.

7. The communication method of claim 1, wherein the updating of the previous codebook comprises updating the previous codebook to the new codebook based on at least one codeword matrix included in the previous codebook.

8. The communication method of claim 7, further comprising:
   performing precoding based on the at least one codeword matrix.

9. The communication method of claim 1, wherein the updating of the previous codebook comprises selecting any one of a plurality of candidate codebooks stored in a memory as the new codebook, based on a variation of a channel between the base station and the at least one mobile station.

10. The communication method of claim 1, wherein the updating of the previous codebook comprises determining a new sub-set of a universal set of codeword matrices as the new codebook, the previous codebook comprising a previous sub-set of the universal set.

11. The communication method of claim 10, wherein the determining of the new sub-set comprises selecting new codeword matrices based on a similarity to at least one of codeword matrices of the previous sub-set.

12. The communication method of claim 1, wherein the updating of the previous codebook comprises updating the previous codebook to the new codebook that is smaller than or equal to a size of the previous codebook.

13. The communication method of claim 1, wherein the recognizing of the first channel and the second channel comprises recognizing the first channel and the second channel based on feedback information about a state of the first channel and a state of the second channel provided from the at least one mobile station.

14. The communication method of claim 13, wherein a number of bits of the feedback information is adjusted according to the new codebook.

15. The communication method of claim 1, further comprising
generating a transmission signal for the at least one mobile station using the generated precoding matrix.

16. The communication method of claim 1, wherein the generating of the precoding matrix comprises updating a previous precoding matrix based on a variation of a channel between the base station and the at least one mobile station.

17. A base station, comprising:
a plurality of transmission antennas;
a channel recognizing unit configured to recognize a first channel at a first time and a second channel at a second time, between the base station and at least one mobile station;
a codebook updating unit configured to update a previous codebook to a new codebook based on a time correlation, the time correlation being generated based on a comparison of the first channel and the second channel; and
a precoding matrix generation unit configured to adaptively generate a precoding matrix of the base station based on the new codebook updated based on the variation of the channel.

18. The base station of claim 17, wherein the codebook updating unit is configured to update the previous codebook with the new codebook based on information corresponding to the time correlation, or statistics for a variation of a channel between the base station and the at least one mobile station.

19. The base station of claim 17, wherein the codebook updating unit is configured to update the previous codebook to the new codebook based on at least one codeword matrix included in the previous codebook.

20. The base station of claim 17, wherein the codebook updating unit is configured to update the previous codebook to the new codebook by selecting any one of a plurality of candidate codebooks stored in a memory as the new codebook, based on a variation of a channel between the base station and the at least one mobile station.

21. The base station of claim 17, wherein the codebook updating unit is configured to determine a new sub-set of a universal set of codeword matrices as the new codebook, the previous codebook comprising a previous sub-set different from the new sub-set.

22. The base station of claim 17, wherein the codebook updating unit is configured to update the previous codebook to the new codebook comprising a size that is smaller than or equal to a size of the previous codebook.

23. The base station of claim 17 further comprising:
a transmission signal generation unit configured to generate a transmission signal to be transmitted to the at least one mobile station using the generated precoding matrix.

24. The base station of claim 17, wherein the precoding matrix generation unit is configured to update a previous precoding matrix based on a variation of a channel between the base station and the at least one mobile station.

25. The base station of claim 17, wherein the previous codebook comprises at least one of codeword matrices $$\begin{bmatrix} 1.0000 & 0.0000+0.0000i \\ 0.0000-0.0000i & 1.0000 \end{bmatrix},$$

$$\begin{bmatrix} 0.5732+0.1150i & 0.5343+0.6105i \\ -0.7161+0.3814i & 0.5767+0.0958i \end{bmatrix},$$

$$\begin{bmatrix} -0.3396+0.1940i & 0.6153-0.6844i \\ 0.0883-0.9161i & -0.0867-0.3814i \end{bmatrix},$$

$$\begin{bmatrix} -0.0685+0.7437i & -0.4689+0.4715i \\ -0.3493+0.5658i & 0.7073-0.2399i \end{bmatrix},$$

$$\begin{bmatrix} -0.3065-0.4181i & 0.5613+0.6452i \\ -0.7872+0.3341i & -0.4587+0.2415i \end{bmatrix},$$

$$\begin{bmatrix} 0.2983-0.2900i & 0.2784-0.8657i \\ -0.9078-0.0541i & 0.3783-0.1730i \end{bmatrix},$$

$$\begin{bmatrix} -0.6555-0.2242i & 0.4919+0.5274i \\ -0.3710-0.6184i & -0.0344-0.6919i \end{bmatrix} \text{ and}$$

$$\begin{bmatrix} 0.7811-0.1004i & 0.1436-0.5993i \\ -0.1963+0.5842i & -0.6088-0.4996i \end{bmatrix}.$$

26. The base station of claim 17, wherein the previous codebook comprises at least one of codeword matrices $\Theta_1$, $\Theta_2, \Theta_3, \Theta_4, \Theta_5, \Theta_6, \Theta_7, \Theta_8, \Theta_9, \Theta_{10}, \Theta_{11}, \Theta_{12}, \Theta_{13}, \Theta_{14}, \Theta_{15}$ and $\Theta_{16}$ $\Theta_1$=1.000 0.0000−0.0000i −0.0000+0.0000i −0.0000+ 0.0000i 0.0000+0.0000i 1.0000+0.0000i − 0.0000+0.0000i 0.0000+0.0001i − 0.0000−0.0000i −0.0000−0.0000i 1.0000 − 0.0001+0.0000i −0.0000−0.0000i 0.0000−0.0001i −0.0001−0.0000i 1.0000

$\Theta_2$=0.2345+0.5093i   0.0710−0.1613i   −0.5599− 0.3206i − 0.4835−0.0669i 0.1248−0.3603i 0.1195−0.0899i 0.3867−0.4896i − 0.4611+0.4799i 0.3584−0.0083i − 0.7321+0.4322i   0.0416−0.3476i   0.1121− 0.1166i − 0.5598−0.3137i − 0.4676−0.0714i − 0.1958+0.1833i −0.5217−0.1432i $\Theta_3$=−0.2840+0.2036i −0.0482−0.2558i − 0.3197+ 0.6799i −0.4323+0.2426i 0.3537−0.4401i 0.2661−0.0081i   0.0165+0.6220i   0.2938− 0.3699i − 0.5263−0.3729i 0.1497−0.1631i − 0.1030−0.0172i 0.5579+0.4612i − 0.1222−0.3580i − 0.8114+0.3923i − 0.1563+ 0.1146i 0.0200−0.0815i $\Theta_4$=0.0979+0.4428i −0.3465+0.1727i − 0.1084+0.7806i   0.0942−0.1206i   0.6779+ 0.2144i − 0.0967−0.3529i − 0.2463−0.2200i − 0.3461−0.3629i 0.2421−0.3300i − 0.0275+0.4333i − 0.3076−0.1315i 0.5891−0.4301i 0.2546−0.2375i 0.4284−0.5866i 0.0177+0.3971i 0.4157+0.1425i $\Theta_5$=0.3515+0.0167i  −0.1554+0.1117i  0.0386+0.2929i − 0.6705+0.5501i −0.4836+0.1506i − 0.2138−0.6278i 0.2294+0.4721i 0.0464+0.1608i 0.7730+0.0887i 0.0390−0.4240i − 0.0937+0.2664i  0.3482−0.1104i  0.0523−0.1062i − 0.1601−0.5627i − 0.1443−0.7326i − 0.1560+0.2489i $\Theta_6$=0.0157+0.0106i  −0.3825+0.1709i  0.4178+0.0436i − 0.6451−0.4812i −0.3924+0.6839i 0.2337−0.0749i  0.1400−0.4785i  0.0870−0.2489i − 0.4873−0.1883i −0.5361−0.0966i − 0.5783−0.2922i −0.1002−0.0222i 0.2439+0.2134i − 0.6684+0.1438i 0.3365−0.2051i 0.4463+0.2704i $\Theta_7$=−0.1484−0.6909i −0.5976−0.1255i − 0.2197−0.1921i 0.1260+0.1630i 0.4980−0.1609i 0.0538+0.6937i 0.1318−0.0756i 0.2942+0.3638i 0.2783+0.2876i − 0.2132−0.2287i −0.3228+0.2323i 0.7335−0.2141i −0.2306+0.1152i − 0.1937−0.0875i 0.7945−0.3202i 0.3806−0.0997i $\Theta_8$=0.0167−0.5145i  0.3110−0.4278i  −0.1853+0.0053i − 0.5452+0.3516i −0.3835−0.5844i − 0.1035+0.1825i −0.4601−0.0298i 0.1926−0.4666i 0.3207+0.0490i − 0.7369−0.2643i − 0.1650+0.2279i − 0.3629−0.2666i 0.3435−0.1519i 0.2496−0.0338i − 0.0637+0.8185i 0.3485−0.0061i $\Theta_9$=−0.5688−0.0120i −0.3898+0.2975i − 0.3493+0.0604i −0.1820+0.5264i −0.3039−0.0476i 0.1928−0.1487i  0.5434−0.5795i  0.2284+0.4034i − 0.3365+0.3560i 0.6043−0.3477i − 0.1999+0.0494i −0.4809−0.0159i − 0.3121−0.4942i 0.1682−0.4311i − 0.1826+0.4092i 0.4929+0.0219i $\Theta_{10}$=−0.3930+0.1272i 0.1383−0.5915i 0.6426+0.0499i −0.1626+0.1355i 0.4393+0.3725i 0.4381−0.1760i − 0.0303+0.1562i 0.5067+0.4041i 0.2293+0.5314i 0.1544+0.3313i 0.4033+0.0137i − 0.1122−0.5968i 0.3684+0.1638i − 0.5052−0.1390i −0.0042+0.6297i − 0.3747+0.1619i $\Theta_{11}$=−0.2373+0.0490i − 0.6173+0.5692i 0.4226+0.0197i −0.1270−0.2027i − 0.3278−0.2836i −0.2696+0.1643i − 0.4266−0.1075i −0.0345+0.7195i 0.4137−0.1395i − 0.0639−0.0419i 0.5764−0.2381i  0.4628+0.4476i  0.6550−0.3655i − 0.0578+0.4314i −0.3151+0.3732i 0.0127−0.0963i $\Theta_{12}$=0.2417+0.1763i 0.0450+0.2953i 0.2078−0.4861i 0.5801+0.4530i −0.0820−0.4701i 0.5723−0.3346i  0.0930+0.3083i  0.1824+0.4424i − 0.3244−0.0925i − 0.3863+0.0475i − 0.7244+0.0567i  0.1373+0.4336i  0.6554+0.3734i − 0.1363−0.5489i − 0.1929+0.2273i 0.0541+0.1393i $\Theta_{13}$=0.3348+0.2001i −0.5934+0.2450i − 0.5398+0.0970i −0.3558−0.0914i 0.3233+0.2147i − 0.5011−0.1514i  0.4454+0.2845i  0.5079+0.1952i − 0.5250−0.2586i − 0.4139−0.0765i 0.3692+0.3400i − 0.4036−0.2559i 0.3373+0.4909i  0.3681−0.0348i  0.3008+0.2783i − 0.2955−0.5033i $\Theta_{14}$=−0.2795−0.2884i 0.0154+0.6932i 0.0028+0.3217i −0.1104−0.4920i 0.2550−0.0730i −0.0510−0.2703i 0.2359+0.8828i −0.0799+0.1121i 0.2400+0.5271i −0.4736+0.4282i 0.0362−0.0025i − 0.4443+0.2416i − 0.6298+0.1907i −0.0845+0.1692i − 0.0729+0.2342i 0.4251+0.5390i $\Theta_{15}$=0.4995+0.4688i −0.3954−0.3825i 0.1135+0.2966i 0.2189−0.2817i − 0.2746+0.0992i −0.2530+0.6514i 0.0345+0.3733i  0.5337−0.0295i  0.2411+0.5303i − 0.0982+0.4310i −0.5151−0.3534i − 0.2623+0.0790i −0.0352−0.3240i − 0.0016−0.1165i − 0.5692−0.2106i 0.3326−0.6335i $\Theta_{16}$=−0.0246−0.1239i −0.1148−0.4967i 0.7805+0.0955i −0.0974−0.3103i 0.3017−0.2799i 0.0232−0.3740i − 0.0315−0.3722i 0.6925+0.2666i − 0.2235−0.4672i −0.4954+0.0779i 0.0580+0.4264i −0.0101+0.5430i − 0.5613−0.4811i 0.5716−0.1464i − 0.0689−0.2284i −0.2050+0.0803i.

27. A communication method between a mobile station and a base station comprising a plurality of transmission antennas, the method comprising:

estimating a first channel at a first time and a second channel at a second time, between the mobile station and the base station;

generating a time correlation based on a comparison of the first channel and the second channel;

updating a previous codebook of the mobile station to a new codebook based on the time correlation; and receiving, from the base station, a transmission signal that is precoded by a precoding matrix, which is generated by the base station based on the new codebook updated based on the time correlation.

28. The communication method of claim 27, wherein the updating of the previous codebook comprises updating the previous codebook to the new codebook based on information corresponding to the time correlation.

29. The communication method of claim 27, wherein the updating of the previous codebook comprises updating the previous codebook to the new codebook based on statistics for a variation of a channel between the mobile station and the base station.

30. The communication method of claim 27, wherein the updating of the previous codebook comprises updating the previous codebook to the new codebook based on at least one codeword matrix included in the previous codebook.

31. The communication method of claim 27, wherein the updating of the previous codebook comprises selecting any one of a plurality of candidate codebooks stored in a memory as the new codebook, based on a variation of a channel between the mobile station and the base station.

32. The communication method of claim 27, wherein the updating of the previous codebook comprises determining a new sub-set of a universal set of codeword matrices as the new codebook, the previous codebook comprising a previous sub-set of the universal set that is different from the new sub-set.

33. The communication method of claim 27, further comprising:

decoding the transmission signal using the new codebook.

34. A mobile station, comprising:

a channel estimating unit configured to estimate a first channel at a first time and a second channel at a second time, between a base station, comprising a plurality of transmission antennas, and the mobile station;

a time correlation generation unit configured to generate a time correlation based on a comparison of the first channel and the second channel;

a codebook updating unit configured to update a previous codebook to a new codebook based on the time correlation; and a receiving unit configured to receive a transmission signal that is precoded by a precoding matrix, which is generated by the base station based on the new codebook updated based on the time correlation.

35. The mobile station of claim 34, wherein the codebook updating unit is configured to update the previous codebook to the new codebook based on information corresponding to the time correlation, or statistics for a variation of a channel between the base station and the and the mobile station.

36. The mobile station of claim 34, wherein the previous codebook comprises at least one of codeword matrices $$\begin{bmatrix} 1.0000 & 0.0000+0.0000i \\ 0.0000-0.0000i & 1.0000 \end{bmatrix},$$

$$\begin{bmatrix} 0.5732+0.1150i & 0.5343+0.6105i \\ -0.7161+0.3814i & 0.5767+0.0958i \end{bmatrix},$$

$$\begin{bmatrix} -0.3396+0.1940i & 0.6153-0.6844i \\ 0.0883-0.9161i & -0.0867-0.3814i \end{bmatrix},$$

$$\begin{bmatrix} -0.0685+0.7437i & -0.4689+0.4715i \\ -0.3493+0.5658i & 0.7073-0.2399i \end{bmatrix},$$

$$\begin{bmatrix} -0.3065-0.4181i & 0.5613+0.6452i \\ -0.7872+0.3341i & -0.4587+0.2415i \end{bmatrix},$$

$$\begin{bmatrix} 0.2983-0.2900i & 0.2784-0.8657i \\ -0.9078-0.0541i & 0.3783-0.1730i \end{bmatrix},$$

$$\begin{bmatrix} -0.6555-0.2242i & 0.4919+0.5274i \\ -0.3710-0.6184i & -0.0344-0.6919i \end{bmatrix} \text{ and}$$

$$\begin{bmatrix} 0.7811-0.1004i & 0.1436-0.5993i \\ -0.1963+0.5842i & -0.6088-0.4996i \end{bmatrix}.$$

37. The mobile station of claim 34, wherein the previous codebook comprises at least one of codeword matrices $\Theta_1$, $\Theta_2$, $\Theta_3$, $\Theta_4$, $\Theta_5$, $\Theta_6$, $\Theta_7$, $\Theta_8$, $\Theta_9$, $\Theta_{10}$, $\Theta_{11}$, $\Theta_{12}$, $\Theta_{13}$, $\Theta_{14}$, $\Theta_{15}$ and $\Theta_{16}$ $\Theta_1$=1.000 0.0000−0.0000i −0.0000+0.0000i −0.0000+0.0000i 0.0000+0.0000i 1.0000+0.0000i −0.0000+0.0000i 0.0000+0.0001i −0.0000−0.0000i −0.0000−0.0000i 1.0000 −0.0001+0.0000i −0.0000−0.0000i 0.0000−0.0001i −0.0001−0.0000i 1.0000

$\Theta_2$=0.2345+0.5093i 0.0710−0.1613i −0.5599−0.3206i −0.4835−0.0669i 0.1248−0.3603i 0.1195−0.0899i 0.3867−0.4896i −0.4611+0.4799i 0.3584−0.0083i −0.7321+0.4322i 0.0416−0.3476i 0.1121−0.1166i −0.5598−0.3137i −0.4676−0.0714i −0.1958+0.1833i −0.5217−0.1432i $\Theta_3$=−0.2840+0.2036i −0.0482−0.2558i −0.3197+0.6799i −0.4323+0.2426i 0.3537−0.4401i 0.2661−0.0081i 0.0165+0.6220i 0.2938−0.3699i −0.5263−0.3729i 0.1497−0.1631i −0.1030−0.0172i 0.5579−0.4612i −0.1222−0.3580i −0.8114+0.3923i −0.1563+0.1146i 0.0200−0.0815i $\Theta_4$=0.0979+0.4428i −0.3465+0.1727i −0.1084+0.7806i 0.0942−0.1206i 0.6779+0.2144i −0.0967−0.3529i −0.2463−0.2200i −0.3461−0.3629i 0.2421−0.3300i −0.0275+0.4333i −0.3076−0.1315i 0.5891−0.4301i 0.2546−0.2375i 0.4284−0.5866i 0.0177+0.3971i 0.4157+0.1425i $\Theta_5$=0.3515+0.0167i −0.1554+0.1117i 0.0386+0.2929i −0.6705+0.5501i −0.4836+0.1506i −0.2138−0.6278i 0.2294+0.4721i 0.0464+0.1608i 0.7730+0.0887i 0.0390−0.4240i −0.0937+0.2664i 0.3482−0.1104i 0.0523−0.1062i −0.1601−0.5627i −0.1443−0.7326i −0.1560+0.2489i $\Theta_6$=0.0157+0.0106i −0.3825+0.1709i 0.4178+0.0436i −0.6451−0.4812i −0.3924+0.6839i 0.2337−0.0749i 0.1400−0.4785i 0.0870−0.2489i −0.4873−0.1883i −0.5361−0.0966i −0.5783−0.2922i −0.1002−0.0222i 0.2439+0.2134i −0.6684+0.1438i 0.3365−0.2051i 0.4463+0.2704i $\Theta_7$=−0.1484−0.6909i −0.5976−0.1255i −0.2197−0.1921i 0.1260+0.1630i 0.4980−0.1609i 0.0538+0.6937i 0.1318−0.0756i 0.2942+0.3638i 0.2783+0.2876i −0.2132−0.2287i −0.3228+0.2323i 0.7335−0.2141i −0.2306+0.1152i −0.1937−0.0875i 0.7945−0.3202i 0.3806−0.0997i $\Theta_8$=0.0167−0.5145i 0.3110−0.4278i −0.1853+0.0053i −0.5452+0.3516i −0.3835−0.5844i −0.1035+0.1825i −0.4601−0.0298i 0.1926−0.4666i 0.3207+0.0490i −0.7369−0.2643i −0.1650+0.2279i −0.3629−0.2666i 0.3435−0.1519i 0.2496−0.0338i −0.0637+0.8185i 0.3485−0.0061i $\Theta_9$=−0.5688−0.0120i −0.3898+0.2975i −0.3493+0.0604i −0.1820+0.5264i −0.3039−0.0476i 0.1928−0.1487i 0.5434−0.5795i 0.2284+0.4034i −0.3365+0.3560i 0.6043−0.3477i −0.1999+0.0494i −0.4809−0.0159i −0.3121−0.4942i 0.1682−0.4311i −0.1826+0.4092i 0.4929+0.0219i $\Theta_{10}$=−0.3930+0.1272i 0.1383−0.5915i 0.6426+0.0499i −0.1626+0.1355i 0.4393+0.3725i 0.4381−0.1760i −0.0303+0.1562i 0.5067+0.4041i 0.2293+0.5314i 0.1544+0.3313i 0.4033+0.0137i −0.1122−0.5968i 0.3684+0.1638i −0.5052−0.1390i −0.0042+0.6297i −0.3747+0.1619i $\Theta_{11}$=−0.2373+0.0490i −0.6173+0.5692i 0.4226+0.0197i −0.1270−0.2027i −0.3278−0.2836i −0.2696+0.1643i −0.4266−0.1075i −0.0345+0.7195i 0.4137−0.1395i −0.0639−0.0419i 0.5764−0.2381i 0.4628+0.4476i 0.6550−0.3655i −0.0578+0.4314i −0.3151+0.3732i 0.0127−0.0963i $\Theta_{12}$=0.2417+0.1763i 0.0450+0.2953i 0.2078−0.4861i 0.5801+0.4530i −0.0820−0.4701i 0.5723−0.3346i 0.0930+0.3083i 0.1824+0.4424i −0.3244−0.0925i −0.3863+0.0475i −0.7244+0.0567i 0.1373+0.4336i 0.6554+0.3734i −0.1363−0.5489i −0.1929+0.2273i 0.0541+0.1393i $\Theta_{13}$=0.3348+0.2001i −0.5934+0.2450i −0.5398+0.0970i −0.3558−0.0914i 0.3233+0.2147i −0.5011−0.1514i 0.4454+0.2845i 0.5079+0.1952i −0.5250−0.2586i −0.4139−0.0765i 0.3692+0.3400i −0.4036−0.2559i 0.3373+0.4909i 0.3681−0.0348i 0.3008+0.2783i −0.2955−0.5033i $\Theta_{14}$=−0.2795−0.2884i 0.0154+0.6932i
0.0028+0.3217i −0.1104−0.4920i
0.2550−0.0730i −0.0510−0.2703i
0.2359+0.8828i −0.0799+0.1121i
0.2400+0.5271i −0.4736+0.4282i
0.0362−0.0025i −0.4443+0.2416i −
0.6298+0.1907i −0.0845+0.1692i −
0.0729+0.2342i 0.4251+0.5390i $\Theta_{15}$=0.4995+0.4688i −0.3954−0.3825i
0.1135+0.2966i 0.2189−0.2817i −
0.2746+0.0992i −0.2530+0.6514i
0.0345+0.3733i  0.5337−0.0295i  0.2411+
0.5303i − 0.0982+0.4310i −0.5151−0.3534i −
0.2623+0.0790i −0.0352−0.3240i −
0.0016−0.1165i − 0.5692−0.2106i
0.3326−0.6335i $\Theta_{16}$=−0.0246−0.1239i −0.1148−0.4967i
0.7805+0.0955i −0.0974−0.3103i
0.3017−0.2799i 0.0232−0.3740i −
0.0315−0.3722i 0.6925+0.2666i −
0.2235−0.4672i −0.4954+0.0779i
0.0580+0.4264i −0.0101+0.5430i −
0.5613−0.4811i 0.5716−0.1464i −
0.0689−0.2284i −0.2050+0.0803i.

38. The mobile station of claim 34, wherein the time correlation generation unit is configured to generate information corresponding to the time correlation, the information corresponding to the time correlation comprising a Doppler coefficient.

39. The mobile station of claim 38, further comprising:
a transmission unit configured to transmit, to the base station, the time correlation and the information corresponding to the time correlation.

40. The mobile station of claim 39, wherein the receiving unit is configured to receive the time correlation from the base station in response to the transmission, to the base station, of the information corresponding to the time correlation, and the codebook updating unit is configured to update the previous codebook to the new codebook based on the received time correlation.

41. The mobile station of claim 34, wherein the time correlation generation unit is configured to generate the time correlation based on a division of the second channel by the first channel.

42. A non-transitory computer readable medium storing instructions configured to cause a processor to:
recognize a first channel at a first time and a second channel at a second time, between a base station, comprising a plurality of transmission antennas, and at least one mobile station;
update a previous codebook of the base station to a new codebook based on a time correlation, the time correlation being generated based on a comparison of the first channel and the second channel; and
adaptively generating a precoding matrix of the base station based on the new codebook.

43. A non-transitory computer readable medium storing instructions configured to cause a processor to:
estimate a first channel at a first time and a second channel at a second time, between a mobile station and a base station comprising a plurality of transmission antennas;
generate a time correlation based on a comparison of the first channel and the second channel;
update a previous codebook of the mobile station to a new codebook based on the time correlation; and
receive a transmission signal that is precoded by a precoding matrix, which is generated by the base station based on the new codebook updated based on the time correlation.

44. A base station, comprising:
a plurality of transmission antennas;
a codebook updating unit configured to update a first codebook, comprising a plurality of first codeword matrices, with a second codebook, comprising a plurality of second codeword matrices, based on a time correlation, the time correlation being generated based on a comparison of a first channel matrix at a first time with respect to a first channel, and a second channel matrix at a second time with respect to a second channel, between the base station and a mobile station;
a receiving unit configured to receive an index of at least one codeword matrix of the second codeword matrices from the mobile station;
a precoding matrix generation unit configured to generate a precoding matrix based on the at least one codeword matrix corresponding to the received index; and
a transmission unit configured to generate a transmission signal using the generated precoding matrix, and to transmit the generated transmission signal to the mobile station.

45. The base station of claim 44, wherein the transmission unit is configured to transmit a pilot signal to the mobile station, and a channel matrix with respect to a channel between the base station and the mobile station is generated based on the pilot signal.

46. The base station of claim 44, wherein the receiving unit is configured to receive the time correlation from the mobile station.

47. The base station of claim 44, further comprising:
a codebook change unit configured to generate a third codeword matrix with respect to each of the first codeword matrices based on the time correlation,
wherein the codebook updating unit is configured to apply a singular value decomposition (SVD) to the third codeword matrix, and to update the first codebook with the second codebook based on an applied result of the SVD.

48. The base station of claim 44, further comprising:
a codebook change unit configured to generate a third codeword matrix with respect to each of the first codeword matrices based on the time correlation,
wherein the codebook updating unit is configured to update the first codebook with the second codebook based on an inverse matrix of the third codeword matrix.

49. The base station of claim 44, further comprising:
a channel matrix updating unit configured to multiply the at least one codeword matrix corresponding to the received index, by a channel matrix with respect to a channel between the base station and the mobile station, to update the channel matrix.

* * * * *